(12) United States Patent
Ausubel et al.

(10) Patent No.: US 8,224,743 B2
(45) Date of Patent: *Jul. 17, 2012

(54) SYSTEM AND METHOD FOR A HYBRID CLOCK AND PROXY AUCTION

(75) Inventors: Lawrence M. Ausubel, Washington, DC (US); Peter C. Cramton, Bethesda, MD (US); Paul R. Milgrom, Stanford, CA (US)

(73) Assignee: Efficient Auctions, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/789,145

(22) Filed: May 27, 2010

(65) Prior Publication Data

US 2011/0082762 A1 Apr. 7, 2011

Related U.S. Application Data

(63) Continuation of application No. 10/578,473, filed as application No. PCT/US2004/037037 on Nov. 8, 2004, now Pat. No. 7,729,975.

(60) Provisional application No. 60/517,380, filed on Nov. 6, 2003.

(51) Int. Cl.
*G06Q 40/00* (2006.01)

(52) U.S. Cl. .......................................... 705/37; 705/38

(58) Field of Classification Search ............... 705/37–40
See application file for complete search history.

(56) References Cited

U.S. PATENT DOCUMENTS

| | | | | |
|---|---|---|---|---|
| 6,023,685 A * | 2/2000 | Brett et al. | ...................... | 705/37 |
| 6,272,473 B1 * | 8/2001 | Sandholm | ...................... | 705/37 |
| 7,729,975 B2 * | 6/2010 | Ausubel et al. | ................. | 705/37 |

* cited by examiner

*Primary Examiner* — Thu Thao Havan
(74) *Attorney, Agent, or Firm* — Manatt, Phelps & Phillips LLP

(57) ABSTRACT

This invention defines a computer system for conducting an auction of a plurality of items including receiving bids and determining an allocation of at least one of the items, the auction including a dynamic auction phase followed by a later phase.

111 Claims, 24 Drawing Sheets

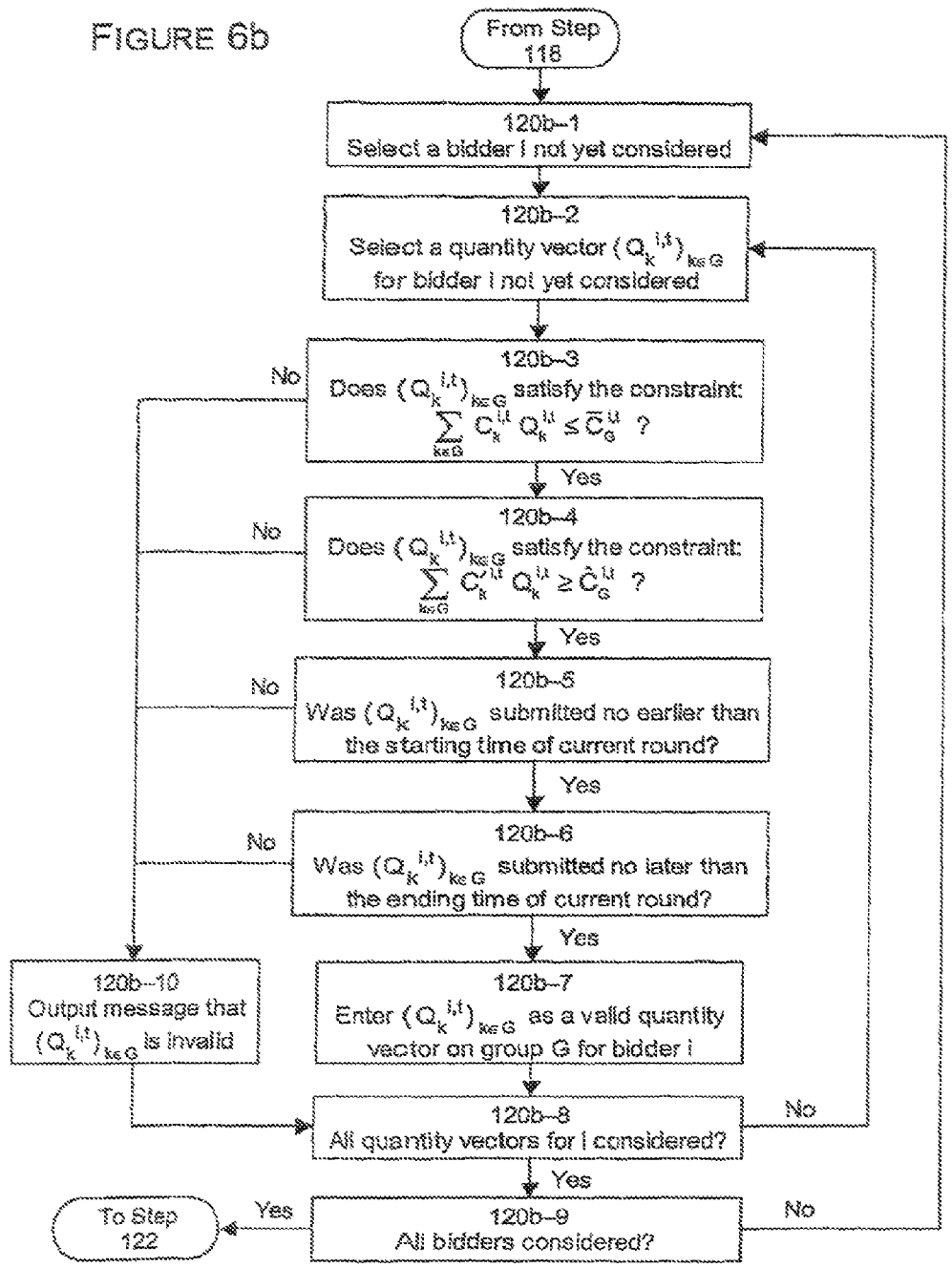

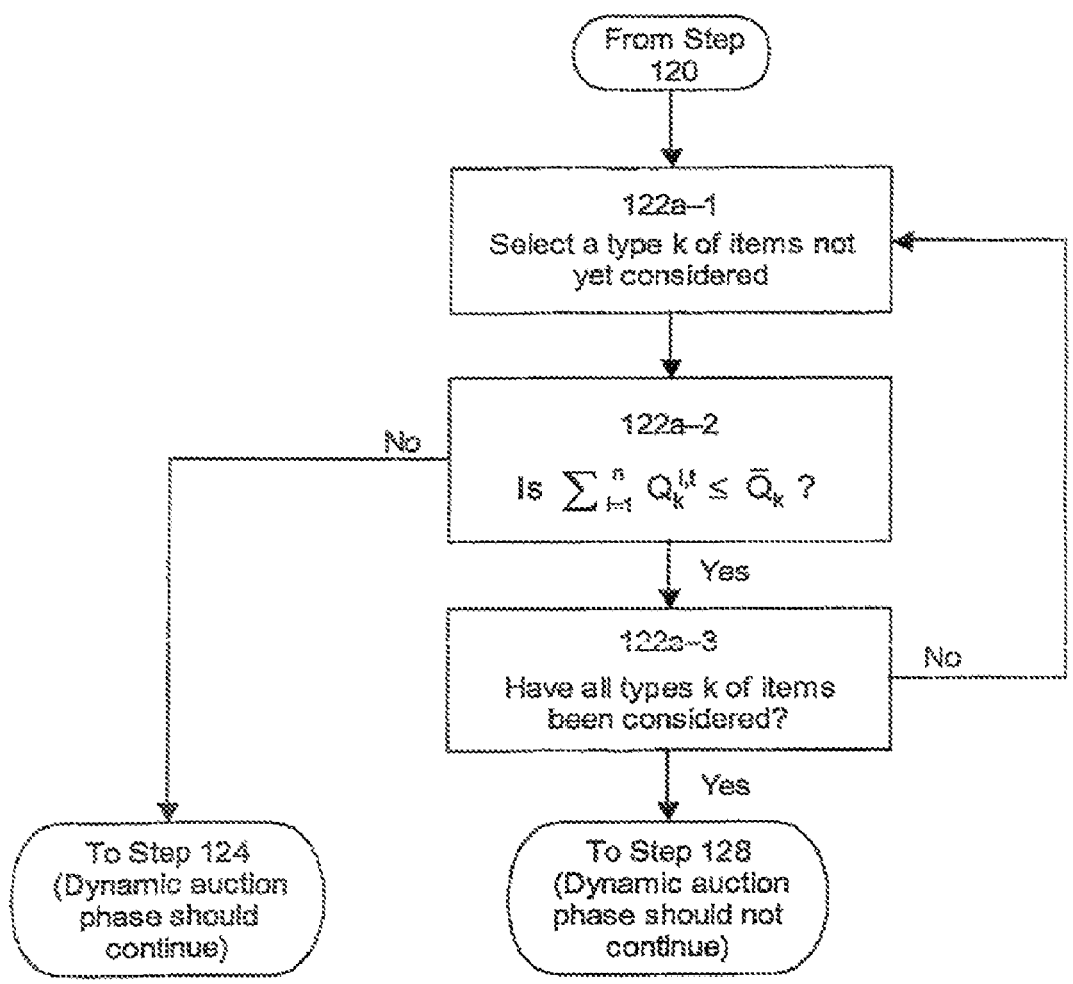

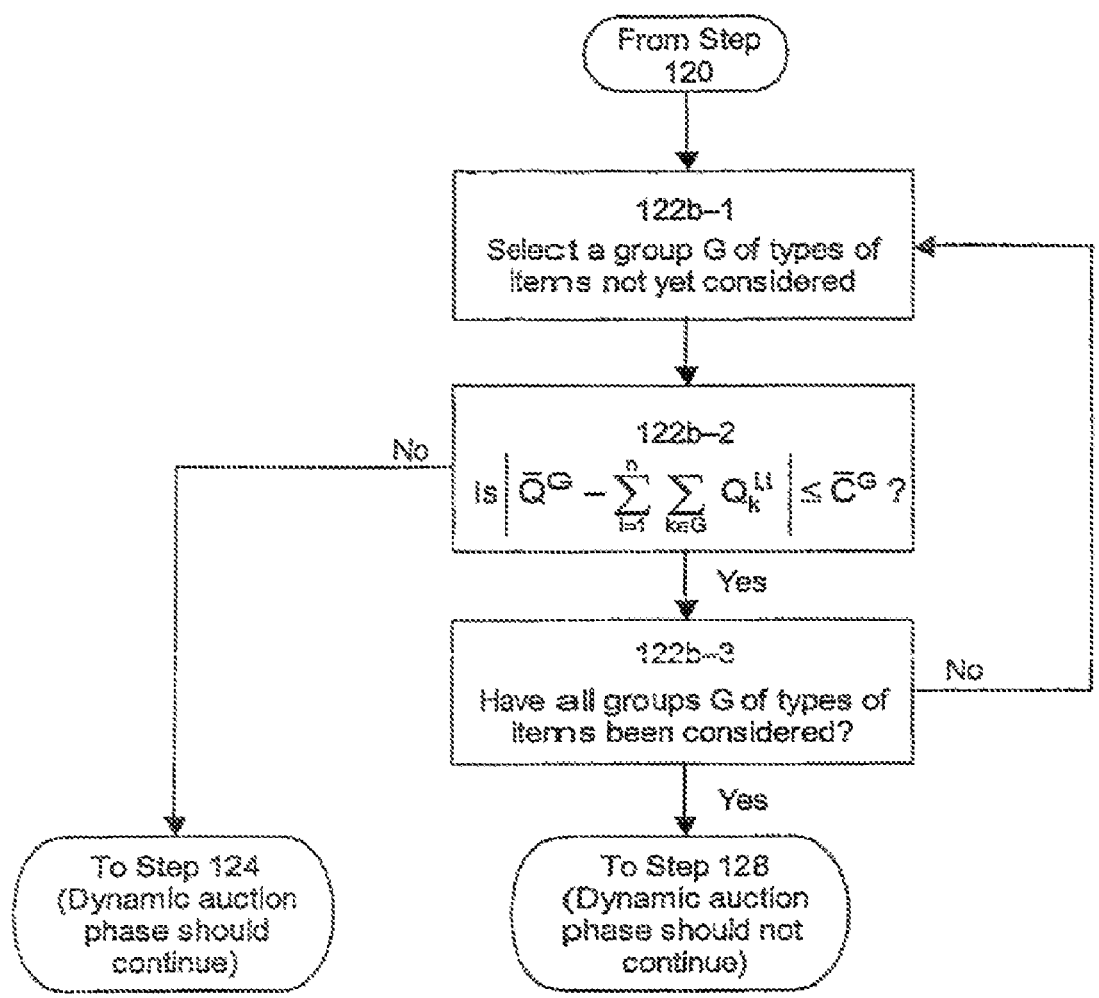

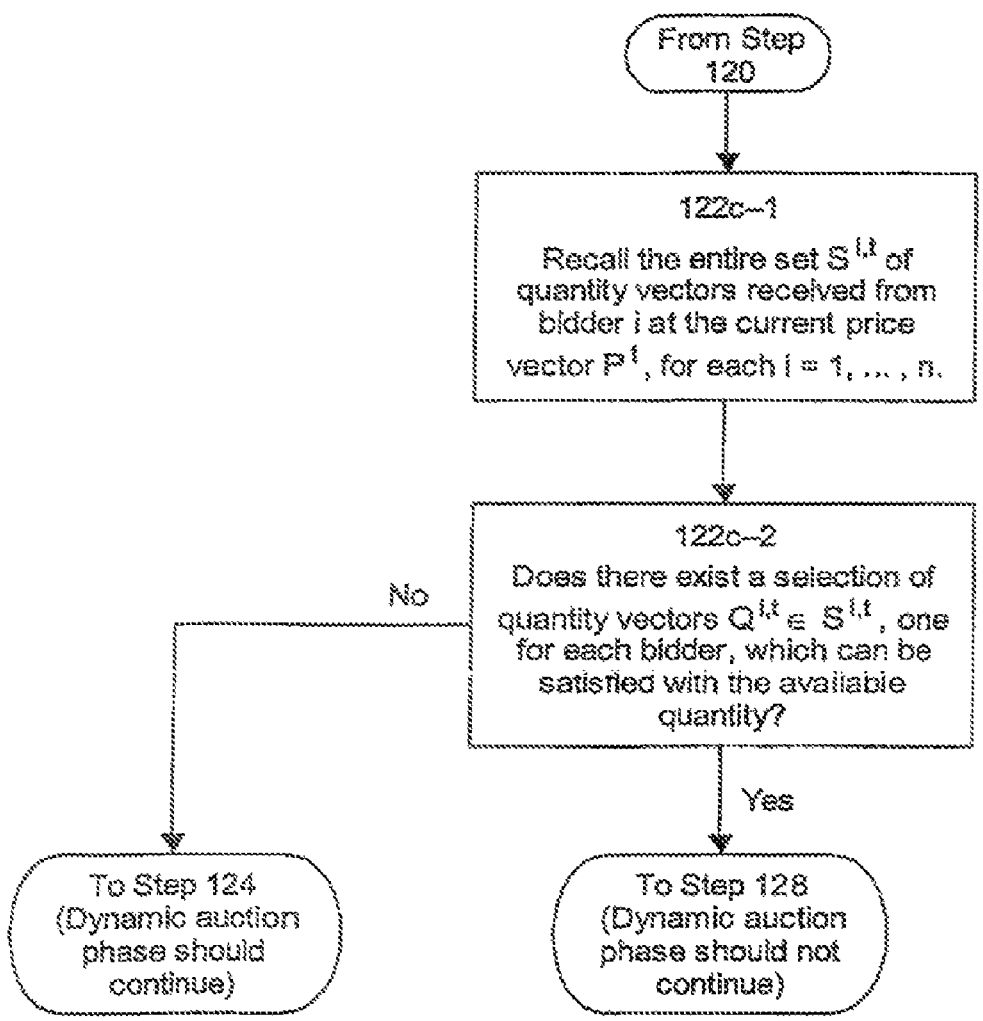

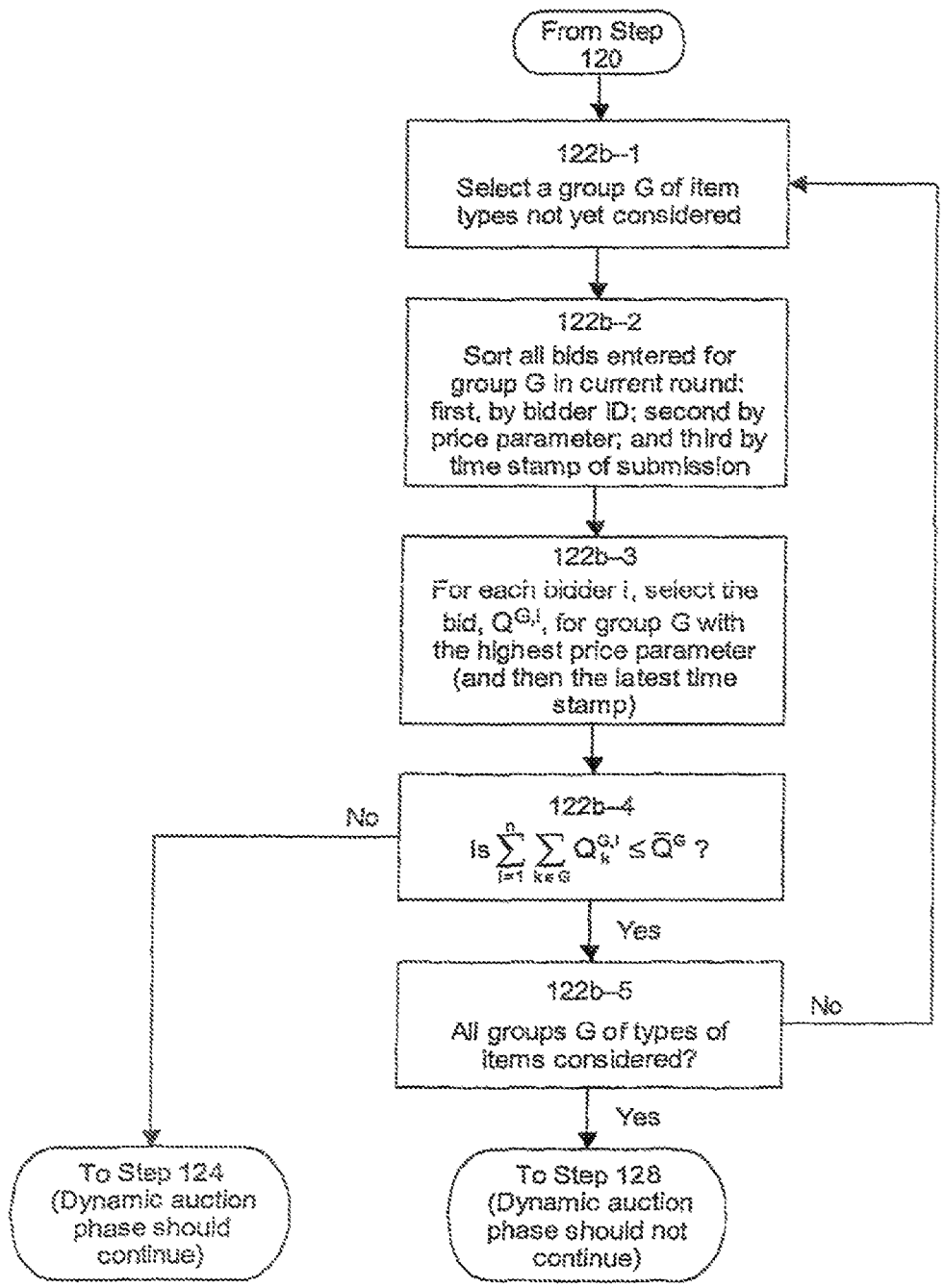

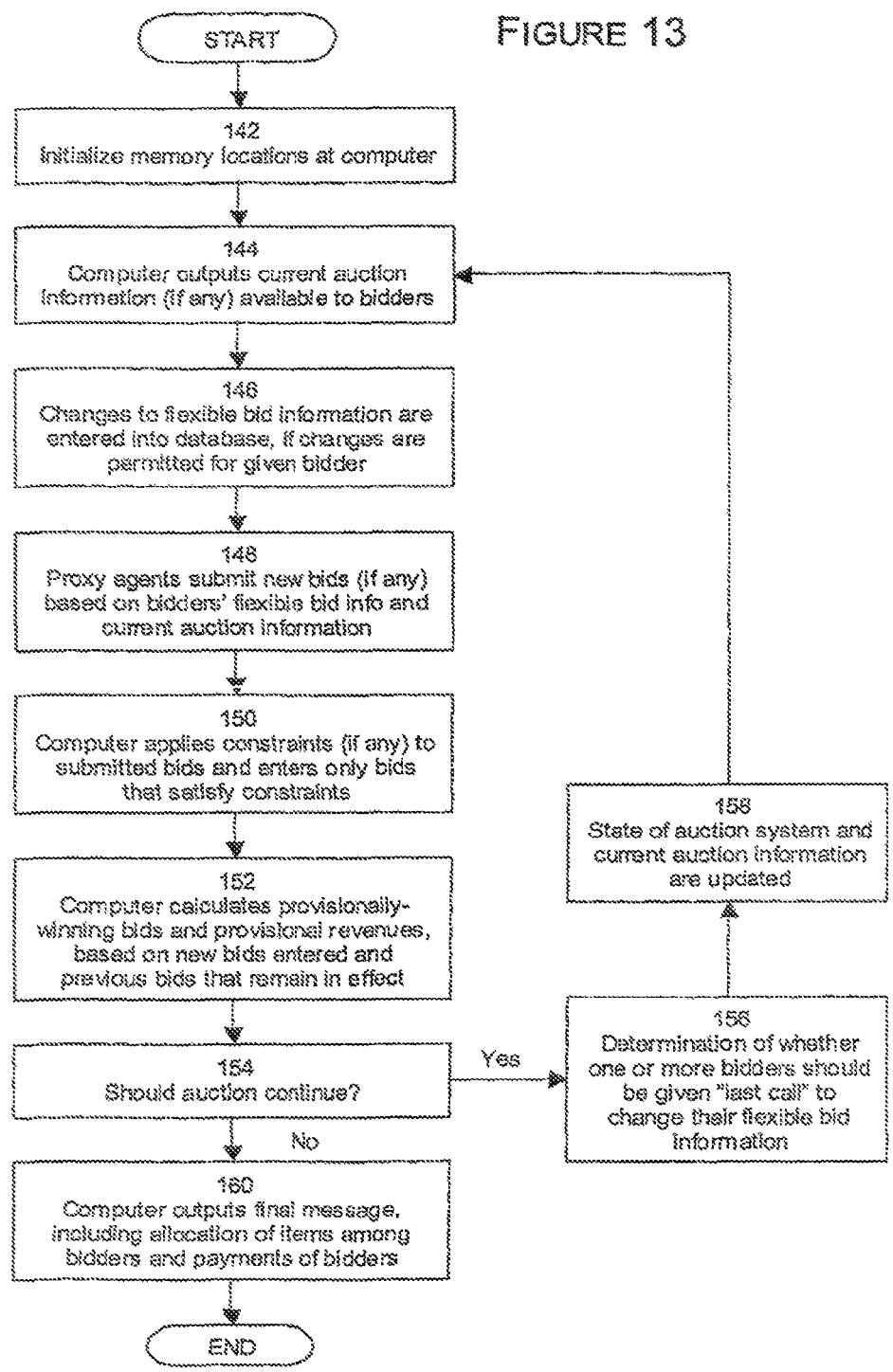

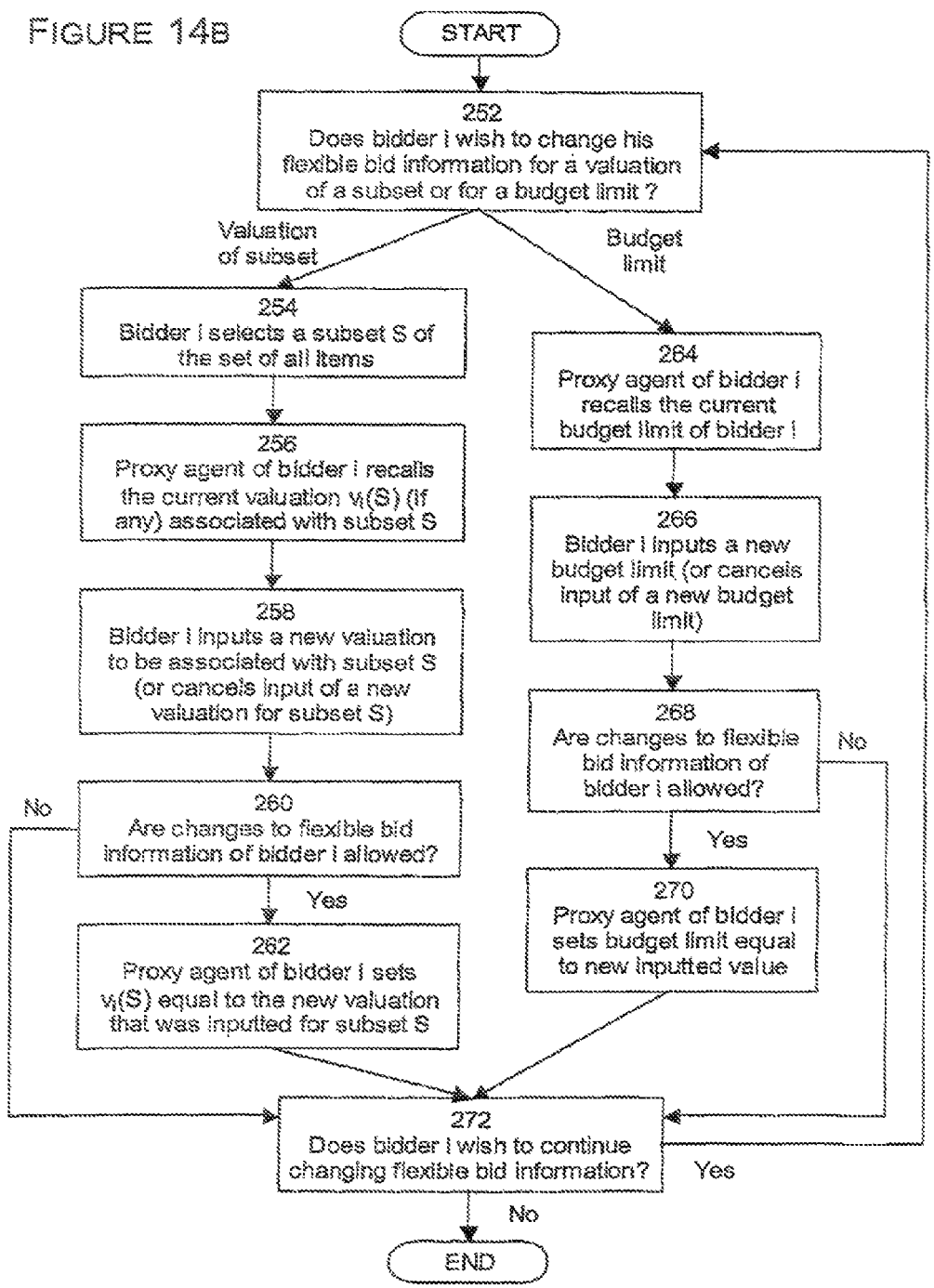

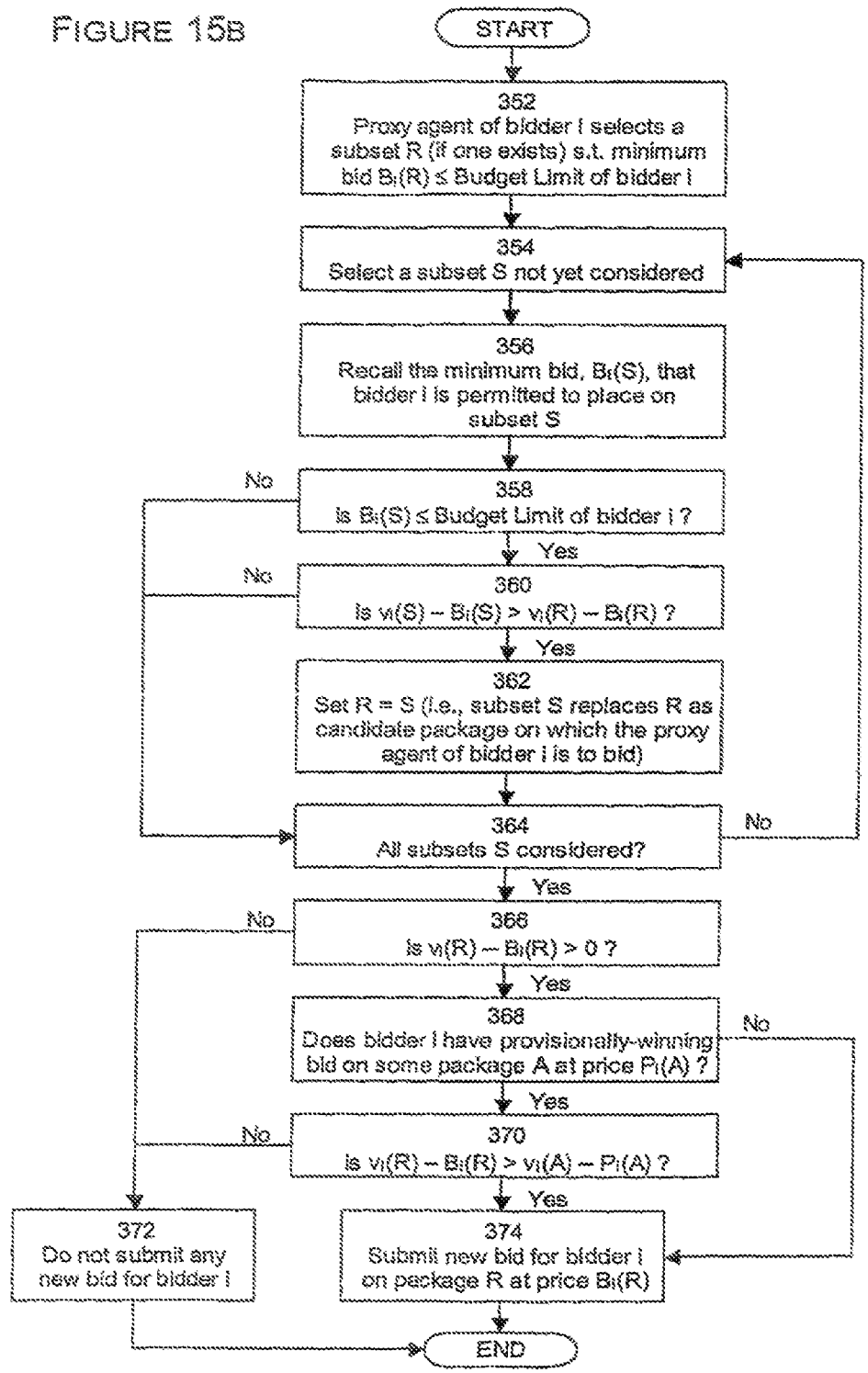

SYSTEM AND METHOD FOR A HYBRID CLOCK AND PROXY AUCTION

RELATED APPLICATIONS

This application claims the benefit of the filing dates of the following co-pending patent applications:

Ausubel, Cramton and Milgrom, "System And Method For A Hybrid Clock And Proxy Auction", U.S. application Ser. No. 10/578,473, filed on May 8, 2006. Ausubel, Cramtom and Milgrom, "System And Method For Hybrid Clock And Proxy Auction", U.S. Provisional Appln. Ser. No. 60/517,380, filed Nov. 6, 2003. Ausubel and Milgrom, "System And Method For A Dynamic Auction With Package Bidding", U.S. patent application Ser. No. 10/432,250, filed May 22, 2003, which is the U.S. National Stage Entry of International Appln. No. PCT/US01/43838, filed Nov. 23, 2001. Ausubel, Cramtom and Jones, "System And Method For An Auction Of Multiple Types Of Items", U.S. patent application Ser. No. 10/467,868, filed Aug. 13, 2003, which is the U.S. National Stage Entry of International Appln. No.: PCT/US02/16937, filed May 31, 2002.

FIELD OF THE INVENTION

The present invention relates to improving computer-implemented auctions and, more particularly, to computer implementation of a hybrid auction combining elements of a clock auction and a proxy auction.

BACKGROUND OF THE INVENTION

There are many situations where items need to be allocated among two or more parties. Often, the items are related, so that a party's value for a package of items is different from the sum of the party's values for the separate items. Auctions (or auction-like processes) are often used to allocate items among two or more parties, but the design of an efficient auction is a technically difficult problem when the items are related.

When items are related, they are often related so as to be complements or substitutes. Two items are said to be complements when they are used together; more precisely, items A and B are complements when reducing the price of item A causes the demand for item B to increase. Two items are said to be substitutes when one is used in place of the other; more precisely, items A and B are substitutes when reducing the price of item A causes the demand for item B to fall.

One example of allocating complementary items may be the case of allocating licenses for telecommunications spectrum. A government may offer a variety of spectrum licenses, each covering a specified bandwidth in a specified geographic area. A wireless telephone company seeking spectrum rights may find that it requires a minimum of 20 MHz of bandwidth in a given geographic area, in order to be able to provide a useful service. Thus, two 10 MHz licenses covering the same geographic area may be complements. At the same time, a wireless telephone company may realize synergies from serving two geographically adjacent markets, so licenses for two adjacent markets may also be complements.

One example of allocating substitute items may be the case of allocating financial instruments. A government may offer three-month, six-month, one-year, two-year and five-year debt securities. For a buyer of government securities, these different durations are likely to be substitutes to at least a certain extent, since they each provide a safe investment opportunity for the next three months. For the government, too, these different durations are likely to be substitutes to at least a certain extent, since they each provide a vehicle for financing the government's debt for the next three months.

In some of the most difficult situations some items are complements and other items are substitutes within the same allocation problem. For example, consider the case of allocating capacity at one or more capacity-constrained airport. The airport authority may offer a variety of landing slots and takeoff slots at different times of the day. Various slots may be complementary goods: for example, an airline is likely to desire a takeoff slot about one hour after each landing slot, and an airline may desire several takeoff and landing slots bunched together in order to be able to maintain a "hub-and-spoke" operation. Also, various slots may be substitute goods: for example, an airline may be able to use a 10:00 am landing slot in place of a 9:00 am landing slot, although the former slot may not be anywhere as valuable as the latter slot. The slots at two airports serving the same city are likely to be substitutes for one another, while the slots at two ends of a heavily trafficked route are likely to be complementary goods.

In the last few years, there has been growing interest in auction processes that allow bidders much greater freedom to name the packages on which they bid during the auction. Such auctions, which may determine the packaging, pricing and allocation decisions, can be called "package auctions," "combinatorial auctions," or "auctions with package bidding." Typically, bidders in these auctions describe the packages that they wish to acquire and make bids for the named packages.

One especially promising version of a package auction is a clock auction. It is an iterative auction process in which the auctioneer announces prices, bidders respond with quantities, the prices are adjusted according to the relation between the quantities bid and the quantities being auctioned, and the process is allowed to repeat. Such auction processes are particularly effective in allocating multiple units of multiple types of goods. (For a longer discussion, see "System and Method for an Auction of Multiple Types of Items," International Patent Application No. US02/16937.)

A second especially promising version of a package auction is a proxy auction. It is effectively a sealed-bid auction. The bidder inputs valuation information into a proxy agent, so that the proxy agent possesses information concerning the valuation of some or all of the possible packages. The proxy agent then submits package bids on behalf of the bidder, selecting one or more packages that optimize the difference between the bidder's value and the amount that can be bid for the package. The auctioneer then selects provisionally-winning bids by solving the optimization problem of selecting bids, at most one from each bidder, that optimize revenues subject to a feasibility constraint. Proxy agents for bidders who are not selected as provisional winners then submit new bids, and the process continues until the bidders who are not provisional winners have no profitable bids remaining to be placed. (For a longer discussion, see "System and Method for a Dynamic Auction with Package Bidding," International Patent Application No. US01/43838.)

SUMMARY OF THE INVENTION

The present invention primarily concerns hybrid auctions that may, for example, combine a clock auction with a proxy auction. Hybrid auctions include multi-item auctions that comprise at least two phases of package auctions: an earlier phase in which bidders participate in a clock auction (or other dynamic auction); and a later phase in which bidders participate in a proxy auction (or some other package auction). By combining the earlier phase and the later phase as in some of the embodiments described herein, it is possible to combine the advantages of the dynamic auction and the advantages of the sealed-bid package auction. In particular, if the earlier phase is a clock auction and the later phase is a proxy auction, then the resulting hybrid auction will combine the transparency and simplicity of the clock auction with the efficient outcome and competitive revenues of the proxy auction.

In a first preferred embodiment, the present invention is a computer-implemented method for a hybrid auction that includes an earlier phase, in which bidders have two or more opportunities to submit package bids where the price associated with a given package is determined by linear pricing, and a later phase, in which bidders submit package bids and the outcome is determined to be a bidder-optimal core outcome (relative to the submitted package bids).

In a second preferred embodiment, the present invention is a computer system for conducting an auction according to the method of the first preferred embodiment. The system includes means for receiving bids, means for determining an outcome, and means for outputting.

In a third preferred embodiment, the present invention is: A computer implemented method for conducting an auction of a plurality of items wherein at least one computer receives bids and determines an allocation of at least one of the items, the auction including a dynamic auction phase followed by a later phase, the later phase comprising a package auction, the method comprising:

a) implementing the dynamic auction phase on a computer, said dynamic auction phase comprising:
  a1) receiving bids from at least one bidder, said bids including at least an indicator of at least one of the items;
  a2) determining whether the dynamic auction phase of the auction should continue, based on received bids;
  a3) outputting auction information; and
  a4) repeating a1)-a3) if the dynamic auction phase of the auction is determined to continue;
b) changing from the dynamic auction phase to the later phase, following a determination not to continue the dynamic auction phase; and
c) implementing the later phase of the auction on a computer, the later phase comprising a package auction, said later phase comprising:
  c1) receiving bids from at least one bidder, said bids including at least an indicator of a package of items and an associated price for the package; and
  c2) determining an allocation of at least one of the items to one of the bidders based on received bids.

In a fourth preferred embodiment, the present invention is:
A computer implemented system for conducting an auction of a plurality of items wherein at least one computer receives bids and determines an allocation of at least one of the items, the auction including a dynamic auction phase followed by a later phase, the later phase comprising a package auction, the system comprising:

a) means for implementing the dynamic auction phase on a computer, said means for implementing the dynamic auction phase comprising:
  a1) means for receiving bids from at least one bidder, said bids including at least an indicator of at least one of the items;
  a2) means for determining whether the dynamic auction phase of the auction should continue, based on received bids;
  a3) means for outputting auction information; and
  a4) means for repeating a1)-a3) if the dynamic auction phase of the auction is determined to continue;
b) means for changing from the dynamic auction phase to the later phase, following a determination not to continue the dynamic auction phase; and
c) means for implementing the later phase of the auction on a computer, the later phase comprising a package auction, said means for implementing said later phase comprising:
  c1) means for receiving bids from at least one bidder, said bids including at least an indicator of a package of items and an associated price for the package; and
  c2) means for determining an allocation of at least one of the items to one of the bidders based on received bids.

Various systems and methods in the art facilitate the operation of computer-implemented auctions. The implementation of auctions on computers holds numerous advantages over the earlier art. It facilitates the simultaneous auctioning—in a single, combined auction process—of a plurality of items that are related, for example, in the sense that bidders may value the items as substitutes or complements. It permits a dynamic bidding process for such a plurality of items, in which bidders in diverse locations across the continent or the globe are able to actively participate and to receive feedback in real time about their opponents' bids. It enables the practical introduction of clock auctions, proxy auctions, and other forms of package bidding. And in accomplishing the above, it encourages bidders to bid aggressively and straightforwardly for the packages they want, incorporating all available information, and resulting in items being allocated to the bidders who value them the most, while also ensuring a competitive price for the seller or sellers.

The present invention is useful for "reverse auctions" or "procurement auctions" conducted by or for buyers to acquire various kinds of items or resources, "standard auctions" conducted by or for sellers in which items are offered for sale, and "exchanges" in which both buyers and sellers place bids. Although terms such as "items or quantities demanded" (by a bidder) and "demand curve" (of a bidder) are used to describe the present invention, the terms "items or quantities offered" (by a bidder) and "supply curve" (of a bidder) are equally applicable. In some cases, this is made explicit by the use of both terms, or by the use of the terms "items or quantities transacted" (by a bidder) and "transaction curve" (of a bidder). The term "items or quantities transacted" includes both "items or quantities demanded" and "items or quantities offered". The term "bid" includes both offers to sell and offers to buy. The term "transaction curve" includes both "demand curve" and "supply curve". Moreover, any references to "items or quantities being offered" includes both "items or quantities being sold" by the auctioneer, in the case this is a standard auction for selling items, as well as "items or quantities being bought or procured" by the auctioneer, in the case this is a procurement auction or reverse auction for buying or acquiring items.

Moreover, while standard auctions to sell typically involve ascending prices, the present invention may utilize descending prices, and more generally, prices that ascend and/or descend.

Throughout this document, the terms "objects", "items", "units" and "goods" are used essentially interchangeably. The inventive system and method may be used both for tangible objects, such as real or personal property, and intangible items, such as telecommunications licenses or electric power. The inventive system and method may be used in auctions where the auctioneer is a seller, buyer or broker, the bidders are buyers, sellers or brokers, and for auction-like activities which cannot be interpreted as selling or buying. The inventive system and method may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing and take-off rights or other transportation rights; emission allowances and pollution permits; and other goods, services, objects, items or other property, tangible or intangible. It may also be used for option contracts on any of the above. It may be used in initial public offerings, secondary offerings, and in secondary or resale markets.

The network used, if any, can be any system capable of providing the necessary communication to/from a Bidding Information Processor (BIP), a Bidding Terminal (BT), and an Auctioneer's Terminal (AT). The network may be a local or wide area network such as, for example, Ethernet, token ring, the Internet, the World Wide Web, the information superhighway, an intranet or a virtual private network, or alternatively a telephone system, either private or public, a facsimile system, an electronic mail system, or a wireless communications system, or combinations of the foregoing.

The following patents are related to the present invention:

Ausubel, Lawrence M., U.S. Pat. No. 5,905,975, May 1999.
Ausubel, Lawrence M., U.S. Pat. No. 6,021,398, February 2000.
Ausubel, Lawrence M., U.S. Pat. No. 6,026,383, February 2000.
McAfee, R. Preston and Paul Milgrom, U.S. Pat. No. 6,718,312, April 2004.

The following other references may be related to the present invention:

Arrow, Kenneth, H. D. Block and Leonid Hurwicz (1959), "On the Stability of Competitive Equilibrium, II," *Econometrica* 27: 82-109.
Ausubel, Lawrence M. (1997a), "An Efficient Ascending-Bid Auction for Multiple Objects," forthcoming, *American Economic Review*.
Ausubel, Lawrence M. (1997b), "On Generalizing the English Auction," working paper, downloadable at www-ausubel-com.
Ausubel, Lawrence M. (2000), "An Efficient Dynamic Auction for Heterogeneous Commodities," working paper, University of Maryland, downloadable at www-ausubel-com.
Ausubel, Lawrence M. and Peter Cramton (1996), "Demand Reduction and Inefficiency in Multi-Unit Auctions," Working Paper No. 96-07, downloadable at www-ausubel-com.
Ausubel, Lawrence M. and Peter C. Cramton (1999), "The Optimality of Being Efficient," mimeo, University of Maryland, June 1999, downloadable at www-ausubel-com.
Ausubel, Lawrence M. and Peter C. Cramton (2004), "Auctioning Many Divisible Goods," *Journal of the European Economic Association*, 2, 480-493, April-May.
Ausubel, Lawrence M., Peter Cramton, R. Preston McAfee, and John McMillan (1997), "Synergies in Wireless Telephony: Evidence from the Broadband PCS Auctions," *Journal of Economics and Management Strategy*, 6:3, 497-527.
Ausubel, Lawrence M. and Jesse Schwartz (1999), "The Ascending Auction Paradox," Mimeo, University of Maryland and Vanderbilt University, July 1999.
Banks, Jeffrey S., John O. Ledyard and David P. Porter, "Allocating Uncertain and Unresponsive Resources: An Experimental Approach," *Rand Journal of Economics*, 20: 1-25.
Bernheim, B. Douglas and Michael Whinston (1986), "Menu Auctions, Resource Allocation and Economic Influence," *Quarterly Journal of Economics*, 101: 1-31.
Bikhchandani, Sushil, "Auctions of Heterogeneous Objects." Mimeo, UCLA, March 1996.
Bikhchandani, Sushil and John W. Mamer (1997), "Competitive Equilibrium in an Exchange Economy with Indivisibilities," *Journal of Economic Theory*, June, 74(2), pp. 385-413.
Bikhchandani, Sushil and Joseph M. Ostroy (1999), "The Package Assignment Problem," working paper, UCLA.
Bulow, Jeremy, Ming Huang and Paul Klemperer (1999), "Toeholds and Takeovers," *Journal of Political Economy*, 107(3): 427-454.
Cassady, Ralph (1967). *Auctions and Auctioneering*. Berkeley: University of California Press.
Charles River Associates and Market Design Inc. (1997), "Package Bidding for Spectrum Licenses," Report to the Federal Communications Commission.
Che, Yeon-Koo and Ian Gale (1998), "Standard Auctions with Financially Constrained Bidders," *Review of Economic Studies*, 65: 1-21.
Clarke, E. H. (1971), "Multipart Pricing of Public Goods," *Public Choice, XI*, 17-33.
Compte, Olivier and Philippe Jehiel (2000), "On the Virtues of the Ascending Price Auction." Working paper, CERAS-ENPC.
Computer Reseller News, "Onsale Joins Fray as Online Shopping Picks Up Speed: Internet Booms," Jun. 5, 1995, p. 73; Dialog: File 16, Acc #05649796.
Cramton, Peter C., "Money Out of Thin Air: The Nationwide Narrowband PCS Auction." *Journal of Economics and Management Strategy*, Summer 1995, 4(2), pp. 267-343.
Cramton, Peter (1997), "The FCC Spectrum Auctions: An Early Assessment," *Journal of Economics and Management Strategy*, 6:3, 431-495.
Cramton, Peter, Evan Kwerel, and John Williams (1998), "Efficient Relocation of Spectrum Incumbents," *Journal of Law and Economics*, 41, 647-675.
Cybernomics (2000), "An Experimental Comparison of the Simultaneous Multiple Round Auction and the CRA Combinatorial Auction." Report to the Federal Communications Commission, downloadable at www-fcc-gov.
Dasgupta, Partha and Eric S. Maskin (2000), "Efficient Auctions," *Quarterly Journal of Economics*, May, 115(2), pp. 341-388.
DasVarma, Gopal (2000), "The Pareto Optimality of Disclosing Bidder Identities," working paper, Duke University.
Demange, Gabrielle, David Gale, and Marilda Sotomayor, "Multi-Item Auctions." *Journal of Political Economy*, August 1986, 94(4), pp. 863-872.
DeMartini, Christine, Anthony Kwasnica, John Ledyard, and David Porter (1999), "A New and Improved Design for Multi-Object Iterative Auctions," Cal Tech working paper.
DeVries, Sven and Rakesh Vohra (2001), "Combinatorial Auctions: A Survey." Working paper. Available at www-m9.ma.tum-de.
Engelbrecht-Wiggans, Richard and Charles M. Kahn, "Protecting the Winner: Second-Price versus Oral Auctions." *Economics Letters*, March 1991, 35(3), pp. 243-248.
Engelbrecht-Wiggans, Richard and Charles M. Kahn (1998), "Multi-Unit Auctions with Uniform Prices," *Economic Theory*, September, 12(2), pp. 227-258.

Federal Communications Commission (1995), "Bidder Information Packet for FCC Auction Scheduled for Aug. 2, 1995."

Federal Communications Commission (1995), "Bidder Information Packet for FCC Auction Scheduled for Dec. 11, 1995."

Federal Communications Commission (2001), "Bidder Information Packet for FCC Auction No. 31."

Groves, Theodore (1973), "Incentives in Teams," *Econometrica* 61: 617-31.

Gul, Faruk and Ennio Stacchetti (1999), "Walrasian Equilibrium with Gross Substitutes," *Journal of Economic Theory*, 87, 9-124.

Gul, Faruk and Ennio Stacchetti (2000), "The English Auction with Differentiated Commodities," *Journal of Economic Theory*, May, 92(1), pp. 66-95.

Hahn, Frank H. (1982), "Stability," in Kenneth J. Arrow and Michael D. Intriligator, eds., *Handbook of Mathematical Economics, Volume II*, Amsterdam: North-Holland, pp. 745-793.

Holmstrom, Bengt (1979), "Groves Schemes on Restricted Domains," *Econometrica* 47: 1137-1144.

Jehiel, Philippe and Benny Moldovanu (1999), "Efficient Auctions with Interdependent Valuations," Working Paper No. 99-74, University of Mannheim, July.

Jehiel, Philippe and Benny Moldovanu (2000), "A Critique of the Planned Rules for the German UMTS/IMT-2000 License Auction," mimeo, University of Mannheim, March.

Jehiel, Philippe and Benny Moldovanu (2001), "The European UMTS/IMT-2000 License Auctions," working paper.

Kagel, John H., Ronald M. Harstad, and Dan Levin, "Information Impact and Allocation Rules in Auctions with Affiliated Private Values: A Laboratory Study." *Econometrica*, November 1987, 55(6), pp. 1275-1304.

Kagel, John H., Scott Kinross, and Dan Levin (2001), "Comparing Efficient Multi-Object Auction Institutions," mimeo, Ohio State University.

Kagel, John H. and Dan Levin (2001), "Behavior in Multi_Unit Demand Auctions: Experiments with Uniform Price and Dynamic Vickrey Auctions," *Econometrica*, pp 413-454.

Kelso, Alexander S. and Vincent P. Crawford (1982), "Job Matching, Coalition Formation, and Gross Substitutes," *Econometrica* 50: 1483-1504.

Kelso, Alexander S. and Vincent P. Crawford (1982), "Job Matching, Coalition Formation, and Gross Substitutes," *Econometrica* 50: 1483-1504.

Klemperer, Paul (2002), "What Really Matters in Auction Design," *Journal of Economic Perspectives*, 16:1, 169-189.

Ledyard, John, David Porter and Antonio Rangel (1997), "Experiments Testing Multi-object Allocation Mechanisms," *Journal of Economics and Management Strategy*, 6: 639-675.

Manelli, Alejandro M., Martin Sefton and Benjamin S. Wilner, "Multi-Unit Auctions: A Comparison of Static and Dynamic Mechanisms." Mimeo, Arizona State University, University of Newcastle and LECG/Navigant Consulting, October 1999.

Maskin, Eric S. (1992), "Auctions and Privatization," in Horst Siebert, ed., *Privatization: Symposium in Honor of Herbert Giersch*, Tubingen: Mohr (Siebeck), pp. 115-136.

Maskin, Eric S. and John G. Riley, "Optimal Multi-unit Auctions," in Frank Hahn, ed., *The Economics of Missing Markets, Information, and Games*. Oxford: Oxford University Press, 1989, pp. 312-35.

McAfee, R. Preston and John McMillan, "Auctions and Bidding." *Journal of Economic Literature*, June 1987, 25(2), pp. 699-738.

McAfee, R. Preston and John McMillan (1996), "Analyzing the Airwaves Auction," *Journal of Economic Perspectives*, 10, 159-176.

McCabe, Kevin A., Stephen J. Rassenti, and Vernon L. Smith, "Auction Institutional Design: Theory and Behavior of Simultaneous Multiple-Unit Generalizations of the Dutch and English Auctions." *American Economic Review*, December 1990, 80(5), pp. 1276-1283.

K. A. McCabe, S. J. Rassenti and V. L. Smith, "Testing Vickrey's and Other Simultaneous Multiple Unit Versions of the English Auction," Research in Experimental Economics, vol. 4, Greenwich, Conn.: JAI Press, 1991, pp. 45-79.

McMillan, John (1994), "Selling Spectrum Rights," *Journal of Economics Perspectives*, 8: 145-162.

F. M. Menezes, *Four Essays on Auction Theory*, University of Illinois doctoral dissertation, February 1993, pp. 1-97 and 143-152.

Milgrom, Paul (1981), "Rational Expectations, Information Acquisition, and Competitive Bidding," *Econometrica*, 49: 921-43.

Milgrom, Paul (1987), "Auction Theory," in Truman F. Bewley, ed., *Advances in Economic Theory Fifth World Congress*. Cambridge: Cambridge University Press, 1987, pp. 1-32.

Milgrom, Paul (1996), "Auctioning the Radio Spectrum," downloadable at www-market-design.com.

Milgrom, Paul (2000). "Putting Auction Theory to Work: The Simultaneous Ascending Auction," *Journal of Political Economy*, 108:2, 245-272.

Milgrom, Paul and John Roberts (1991), "Adaptive and Sophisticated Learning in Repeated Normal Form Games," *Games and Economic Behavior*, 3: 82-100.

Milgrom, Paul and Robert Weber (1982), "A Theory of Auctions and Competitive Bidding," *Econometrica* 50: 1089-1122.

Milgrom, Paul R. and Robert J. Weber, "A Theory of Auctions and Competitive Bidding, II." Unpublished manuscript, Northwestern University, 1982.

Nisan, Noam (1999), "Bidding and Allocation in Combinatorial Auctions," working paper, www-cs-huji-ac-il.

Onsale release, "Onsale Brings Thrill of Auctions and Bargain Hunting Online; Unique Internet retail service debuts with week-long charity auction for The Computer Museum in Boston"; Dialog Abstract File 610, Acc#0489267; May 24, 1995.

Palfrey, Thomas (1983), "Bundling Decisions by a Multiproduct Monopolist with Incomplete Information," *Econometrica*, 51: 463-483.

Parkes, David C. (1999), "iBundle: An Efficient Ascending Price Bundle Auction", *Proceedings ACM Conference on Electronic Commerce* (EC-99), Denver, 148-157.

Parkes, David C. and Lyle H. Ungar (2000), "Iterative Combinatorial Auctions: Theory and Practice," *Proceedings of the 17th National Conference on Artificial Intelligence* (*AAAI*-00), 74-81.

Perry, Motty and Philip J. Reny (1999*a*), "An Ex-Post Efficient Auction," Working Paper, Hebrew University and University of Chicago, September.

Perry, Motty and Philip J. Reny (1999*b*), "An Ex-Post Efficient Multi-Unit Ascending Auction," Working Paper, Hebrew University and University of Chicago, September.

Plott, Charles (1997), "Laboratory Experimental Testbeds: Application to the PCS Auction," *Journal of Economics and Management Strategy*, 6: 605-638.

Porter, David (1997), "The Effect of Bid Withdrawal in a Multi-Object Auction," working paper, University of Arizona.

Porter, David, Stephen Rassenti, Anil Roopnarine, and Vernon Smith (2003), "Combinatorial Auction Design," *Proceedings of the National Academy of Sciences*, 100, 11153-11157.

Rassenti, S. J., V. L. Smith, and R. L. Bulfin (1982), "A Combinatorial Auction Mechanism for Airport Time Slot Allocation," *Bell Journal of Economics* 13: 402-417.

Roth, Alvin E. and Elliott Peranson (1999), "The Redesign of the Matching Market for American Physicians: Some Engineering Aspects of Economic Design," *American Economic Review*, 89: 748-780.

Roth, Alvin E. and Marilda A. Oliveira Sotomayor (1990), *Two-Sided Matching: A Study in Game-Theoretic Modeling and Analysis*, Cambridge: Cambridge University Press.

M. H. Rothkopf, A. Pekec and R. M. Harstad (1998), "Computationally Manageable Combinatorial Auctions", *Management Science*, Vol. 44, No. 8, 1131-1147.

Rothkopf, Michael, Thomas Teisberg and Edward Kahn (1990), "Why Are Vickrey Auctions Rare?" *Journal of Political Economy*, 98: 94-109.

Sholtz & Associates, LLC, "ACE Market Operations Guide," Jan. 3, 1996, pp. 1-5.

Siegmann, "Nowhere to Go But Up. (Onsale CEO Jerry Kaplan) (PC Week Inside) (Inside People)"; PC Week; v12 n42; pA5 (1); Oct. 23, 1995; Dialog: File 148, Acc #08222496.

U.S. Department of the Treasury, U.S. Securities and Exchange Commission, and Board of Governors of the Federal Reserve System, *Joint Report on the Government Securities Market*, Washington, D.C.: U.S.G.P.O., January 1992.

Vickrey, William (1961), "Counterspeculation, Auctions and Competitive Sealed Tenders," *Journal of Finance*, March, 16(1), pp. 8-37.

Vickrey, William (1962), "Auctions and Bidding Games," Recent Advances in Game Theory, Princeton: Princeton University Conference, 1962, pp. 15-29.

Vickrey, William (1976), "Auctions, Markets, and Optimal Allocation," Bidding and Auctioning for Procurement and Allocation, New York: New York University Press 1976, pp. 13-20.

Weber, Robert J. (1983), "Multiple-Object Auctions," Auctions, Bidding, and Contracting: Uses and Theory, New York: New York University Press, 1983, pp. 165-191.

Weber, Robert J. (1997), "Making More from Less: Strategic Demand Reduction in the FCC Spectrum Auctions," *Journal of Economics and Management Strategy*, 6:529-548.

Williams, Steven (1999), "A Characterization of Efficient, Bayesian Incentive Compatible Mechanisms," *Economic Theory* 14: 155-180.

Wilson, Robert (1979), "Auctions of Shares," *Quarterly Journal of Economics*, vol. 94, 1979, pp. 675-689.

BRIEF DESCRIPTION OF THE DRAWINGS

FIGS. 6a and 6b are flow diagrams illustrating, in greater detail, elements of the flow diagram of FIG. 5;

FIGS. 7a, 7b and 7c are flow diagrams illustrating, in greater detail, elements of the flow diagram of FIG. 5;

FIGS. 9a, 9b and 9c are flow diagrams illustrating, in greater detail, elements of the flow diagram of FIG. 5;

FIG. 13 is a flow diagram of an exemplary proxy auction phase, in accordance with an embodiment of the invention;

FIGS. 14a and 14b are flow diagrams illustrating, in greater detail, elements of the flow diagram of FIG. 13;

FIGS. 15a and 15b are flow diagrams illustrating, in greater detail, elements of the flow diagram of FIG. 13.

DETAILED DESCRIPTION OF PREFERRED EMBODIMENTS

Overall Structure of Auction System

Earlier auction methods and systems are described in U.S. Pat. Nos. 5,905,975, 6,021,398 and 6,026,383. The following description will detail the flow of the novel features of the preferred embodiments of the present method and system for a hybrid auction combining a clock auction (or other dynamic auction) with a proxy auction (or other auction allowing package bidding).

Figure 1:
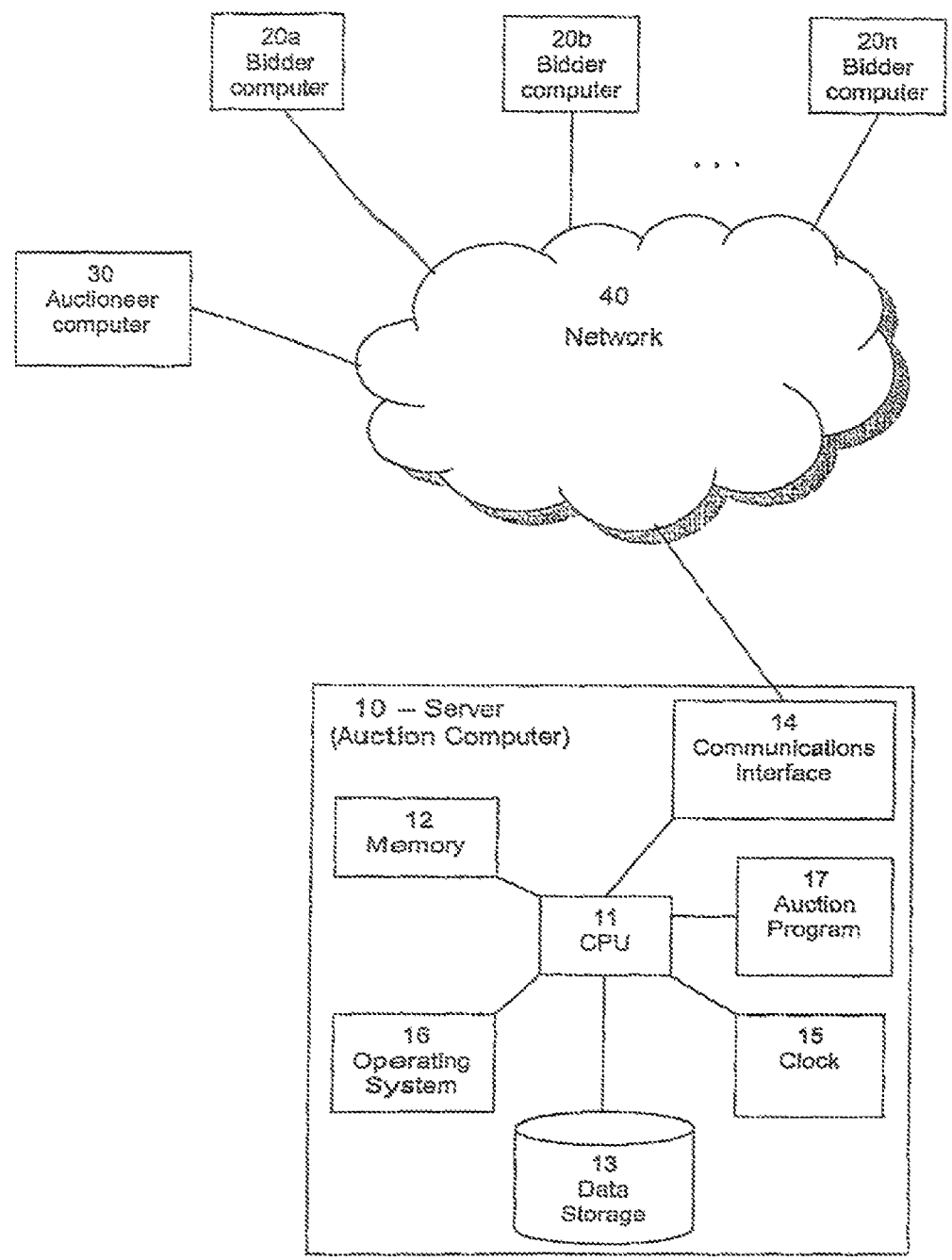
FIG. 1 is a graphical depiction of the architecture of an exemplary computer system in accordance with an embodiment of the invention.

Before describing the auction process in detail, reference is made to FIG. 1 to describe the architecture of an exemplary computer system in accordance with an embodiment of the present invention. In the graphical depiction of FIG. 1, the computer system consists of multiple bidder and auctioneer computers or terminals 20a-n and 30 communicating with the server (or auction computer) 10 over a network 40. The computers or terminals 20a-n are employed by bidders, the computer or terminal 30 is employed by the auctioneer, and the server 10 is the auction computer. The server 10 consists of a CPU 11, memory 12, a data storage device 13, a communications interface 14, a clock 15, an operating system 16, and an auction program 17. In one embodiment, the system architecture is as a client-server system: the auction computer is a server; and the bidder and auctioneer computers are clients.

Figure 2:
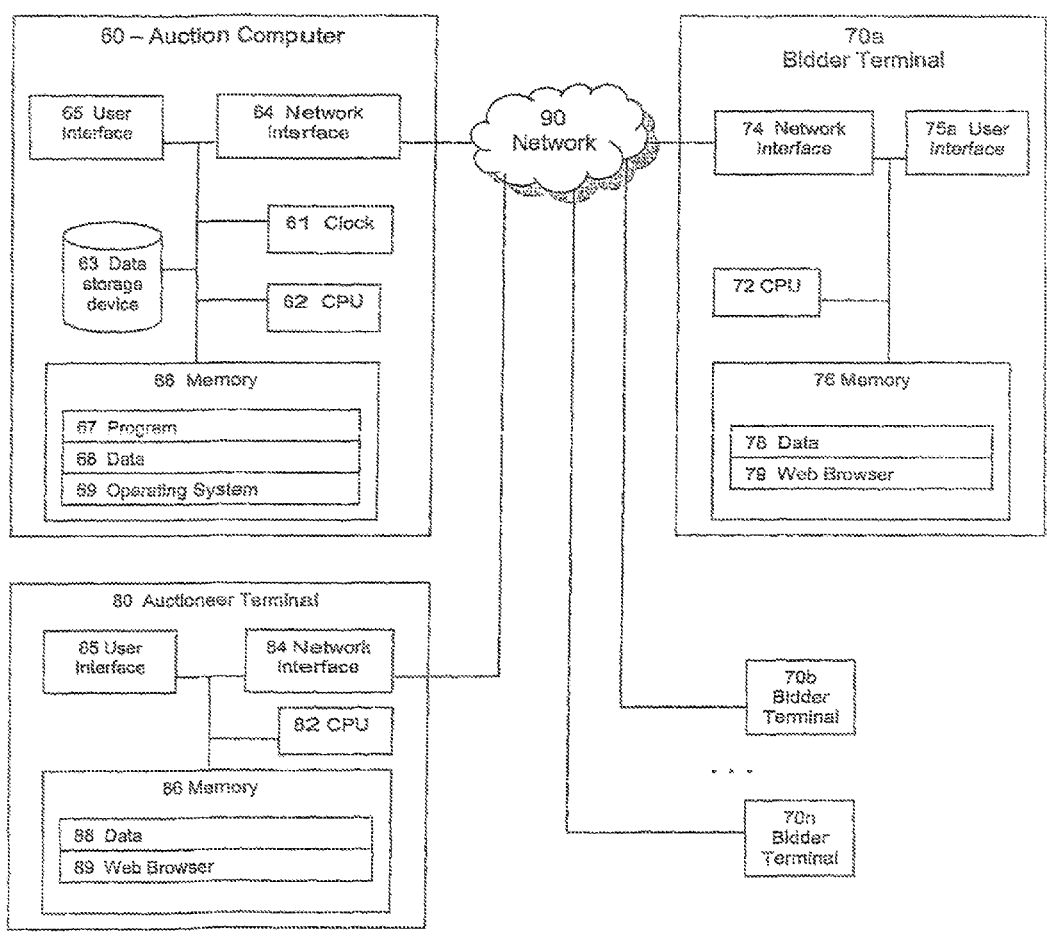
FIG. 2 is a graphical depiction of another exemplary computer system in accordance with an embodiment of the invention.

FIG. 2 is another graphical depiction of an exemplary computer system in accordance with an embodiment of the present invention. The auction system of FIG. 2 includes an auction computer 60 (sometimes also referred to as a Bidding Information Processor or BIP), a plurality of user systems 70a, 70b and so on (sometimes also referred to as Bidder Terminal or BT), each user system 70a-n representing an individual bidder, and a user system 80 (sometimes also referred to as an Auctioneer Terminal or AT). The systems 60, 70a-n, and 80 communicate over a network 90. The network represents any system capable of providing the necessary communication to/from BIP, BT, and AT. The network may be a local or wide area network such as, for example, Ethernet, token ring, the Internet, the World Wide Web, the information superhighway, an intranet or a virtual private network, or alternatively a telephone system, either private or public, a facsimile system, an electronic mail system, or a wireless communications system. Each of the systems 60, 70*a-n*, and 80 may include a typical user interface 65, 75*a-n*, 85 for input/output which may include a conventional keyboard, display, and other input/output devices. Within each of the systems, the user interface (65, 75*a-n*, 85) is coupled to a network interface (64, 74*a-n*, 84), which in turn communicates via the network 90. Both the user interface and network interface connect, at each system, to a CPU (62, 72*a-n*, 82). Each system includes a memory (66, 76*a-n*, 86). The BIP 60 also includes a clock 61 and a data storage device 63, which will ordinarily contain a database. (However, in some embodiments the database might instead be stored in memory 66.) The memory 66 of the BIP 60 can further be broken down into a program 67, data 68 and an operating system 69. The memory (76*a-n*, 86) of the BT's 70*a-n* and the AT 80 may include a web browser (for example, Internet Explorer or Netscape) (79, 89) or other general-purpose software, but not necessarily any computer program specific to the auction process. In each system the CPU (62, 72*a-n*, 82) represents a source of intelligence when executing instructions from the memory (66, 76*a-n*, 86) so that appropriate input/output operations via the user interface and the network interface take place as is conventional in the art. The particular steps used in implementing the inventive auction system and method are described in more detail below. In one embodiment, each of the user systems is a personal computer or workstation.

Figure 3:
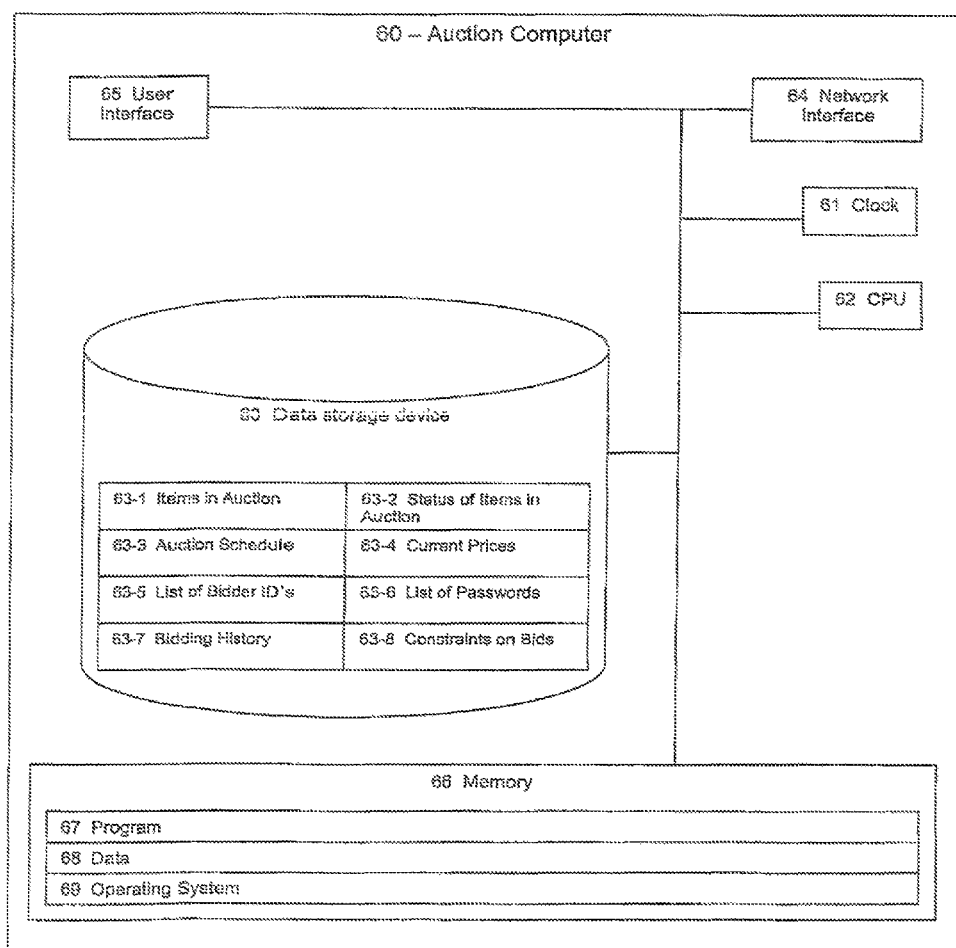
FIG. 3 is a detail of one element of the computer system of FIG. 2.

FIG. 3 is a more detailed illustration of an exemplary BIP 60 showing details of the database. As discussed for FIG. 2, the database is ordinarily stored on a data storage device 63, although in some embodiments it might instead be stored in memory 66. As depicted in FIG. 3, the database includes provision for creating, storing, and retrieving records representing Items in the Auction 63-1, Status of the Items in the Auction 63-2, Auction Timetable 63-3, Current Price(s) 63-4, List of Bidder ID's 63-5, List of Passwords 63-6, Bidding History 63-7, and Constraints on Bids 63-8. The particular set of data required for any particular auction and the format of that datum or data (such as scalar, vector, list, etc.) is more particularly specified by the detailed description of that auction.

Bidders, Items, Types and Groups

There are n bidders ($n \geq 1$), often superscripted or subscripted by i (i=1, ..., n), participating in the auction. Let $\Omega$ denote the set of items that are included in the auction. The aim of the auction is to allocate, among the bidders, the elements of the set $\Omega$.

Some of the most useful embodiments of the present invention apply in situations where some of the elements of the set $\Omega$ are identical or close substitutes to one another. A type of item comprises a (nonempty) subset of $\Omega$ such that any two items within the same type are identical items or close substitutes. Meanwhile, types are defined so that any two items of different types exhibit significant differences in time, location or any other product characteristics. There may be a single unit or multiple units within a given type. Whenever we state that there are "unique goods," we are referring to the case where there is only a single unit within every type.

In what follows, we will assume that there are m types of items ($m \geq 1$) included in the auction. Whenever we state that there is a "plurality of types of items," we are referring to the case where $m \geq 2$. There are often said to be "heterogeneous" goods or "dissimilar items" in the case where $m \geq 2$. Whenever we state that there are "homogeneous" goods or "identical objects," we are referring to the case where m=1. Whenever we state that there is a "plurality of bidders," we are referring to the case where the number, n, of bidders participating in the auction satisfies $n \geq 2$.

Some of the useful embodiments of the present invention apply in situations where two or more of the types of items can be usefully grouped together. A group G of types comprises a (nonempty) subset of {1, ..., m}, the set of all types of items. Typically, the reason that two types of items are included in the same group is that they are related, for example, they may be contracts for provision of the same commodity, covering different but overlapping time periods.

If types of items are classified into groups, then our notation will be that there are h ($h \geq 1$) groups. There is no requirement that each group contains the same number of types of items, but this often happens to be the case. Whenever we need notation indicating the number of types of items contained in the exemplary group G, our notation will be that there are g ($g \geq 1$) types of items in group G.

Some examples of "types" and "groups," in situations where there may be significant commercial possibilities for embodiments of the present invention, include the following:

Treasury bills or other securities: A government or central bank may wish to auction 3-month, 6-month and 12-month Treasury securities (for example, with the same starting date) together. Thus, there is one group of types of items (h=1), and it contains three types of items (g=3). In total, there are three types of items (m=3).

Electricity contracts: An electric generating company may wish to simultaneously auction some forward contracts or options contracts for base-load and peak-load electricity generation, with durations of 2 months, 3 months, 6 months, 12 months, 24 months and 36 months, respectively. Thus, there are two groups of types of items (h=2), each containing six types of items (g=6). In total there are 2×6=12 types of items (m=12).

Two unrelated, heterogeneous consumer commodities (e.g., apples and oranges). There are two groups of types of items (h=2), each containing just one type of item (g=1), for a total of two types of items (m=2).

Packages and Package Bids

In many preferred embodiments of the present invention, bids comprise pairs, (S, P), where $S \subset \Omega$ is a package, i.e., a subset of the set of all items being auctioned, and P is a price at which the bidder is offering to transact for the entire package S. Stated differently, a bid comprises a package of items and an associated price for the entire package. Such a bid comprising a pair, (S, P), is defined to be a package bid.

In the event that the elements of the set $\Omega$ have been classified into types, a package can be identified by a quantity vector ($Q_1, \ldots, Q_m$) of each of the m ($m \geq 1$) types of items. A package bid for bidder i would then comprise a quantity vector ($Q_1^i, \ldots, Q_m^i$) and a price, P, at which bidder i is offering to transact for the entire set identified by the quantity vector. Such a bid ($Q_1^i, \ldots, Q_m^i$; P) is defined to be a package bid in the "type" notation.

Clock Auctions

A clock auction is an auction process that proceeds as follows. First, a price vector indicating the price of each type of item is transmitted to bidders (i.e., bidder terminals). Second, a bidder responds with a quantity vector indicating the quantity of each respective type of item that the bidder wishes to transact at the current price vector. A computer determines whether the auction should continue or terminate, and if the decision is to continue, the price vector is adjusted and the process is repeated.

More precisely, consider a situation where the items included in the auction have been classified into types. The current price vector comprises a vector, $(P_1, \ldots, P_m)$, whose components represent the prices (per unit) for the m respective types of items. Each bidder i selects one or more package bids by selecting a quantity vector, $(Q_1^i, \ldots, Q_m^i)$, whose components indicate the quantities that bidder i is willing to buy (in the case of an auction to sell) or to sell (in the case of an auction to buy) at the current price vector for the m respective types of items. The quantity vector thus identifies the package of items that bidder i desires to transact. The associated price, $P^i$, at which bidder i is offering to buy or sell the package is implied by:

$$P^i = \sum_{k=1}^{m} p_k Q_k^i.$$

A bid of bidder i in a clock auction comprises a quantity vector, $(Q_1^i, \ldots, Q_m^i)$, together with the implied price, $P^i$, calculated at the current price vector. Depending on the particular embodiment of the present invention, a bidder may be permitted to select a single bid at each current price vector, or a bidder may be permitted to select more than one bid at each current price vector.

The bidding history comprises the current price vector and the bids associated with the current time and all earlier times in the current auction.

The available quantities may, in principle, be specified for each type of item or for each group of types of items. In the text that follows, we will usually specify the available quantity for each type of item. The available quantity for type k of item will be denoted $\overline{Q}_k$, and this refers, in the case of an auction to sell, to the overall quantity of items of type k to be offered for sale in the auction or, in the case of an auction to buy (i.e., a procurement auction or a "reverse auction"), to the overall quantity of items of type k to be bought in the auction. The vector of available quantities for all types will be denoted $(\overline{Q}_1, \ldots, \overline{Q}_m)$. (If, instead, we wish to indicate the available quantity for group G of types of items, this will be denoted by $\overline{Q}^G$, and the vector of available quantities for all groups will be denoted $(\overline{Q}^1, \ldots, \overline{Q}^h)$.) Optionally, the available quantities may be allowed to depend on the prices, or otherwise be contingent on the progress of the auction.

With this terminology defined, a clock auction is a dynamic auction procedure whereby: the current price vector is announced to bidders; the bidders each respond with quantity vectors indicating their bids; the auctioneer determines whether the auction should continue based on the bidding history and the available quantities; the auctioneer updates the current price vector based on the bidding history and the available quantities, and the process repeats, if it is determined that the auction should continue; and the auctioneer allocates the items among the bidders and assesses payments among the bidders based on the bidding history and the available quantities, if it is determined that the auction should not continue.

Observe that a "clock auction" differs from a standard ascending-bid electronic auction in the following important sense. In standard ascending-bid electronic auctions—such as in the Federal Communications Commission auctions for radio communications spectrum or in eBay auctions—the bidders name prices (and, perhaps also, quantities) that they propose to pay for the items being auctioned, in an iterative process. In a clock auction, the auctioneer sets the pace for price increases, and bidders respond only with quantity vectors—the associated payments being implied by the current price vector.

Flexible Bid Information and Proxy Agents

Flexible bid information is data that a bidder selects for present or future use by entering into a computer (e.g., a bidder computer or a BT), but at least some of such data is stored in a database rather than being directly and immediately submitted as a bid in an auction. Flexible bid information can include a scalar value, a vector value, or a function. The flexible bid information may be an expression of which (or how many units of) item(s) a bidder is willing to purchase at a given price(s), how much money a bidder is willing to pay for the purchase of a given item(s), or any other expression of the value which a bidder places on item(s) or a stopping price that a bidder places on item(s). It may also include an expression of how much money or other consideration a bidder is willing to spend in aggregate for all of the items purchased. Optionally, flexible bid information may include a bidding rule that contains a limitation (e.g., "I desire up to a quantity of x at a price P, but I do not want any positive quantity at all unless I receive a minimum quantity of y"). Thus, flexible bid information may include one or more bidding rules that may comprise unconditional bids or contingent bids, and may include one or more functions from available information to bid quantities (e.g. a function of the previous bid(s) submitted).

Within the specific context of an auction with package bidding, flexible bid information may include valuation information, budget information, and other information. Valuation information comprises data relating one or more subsets of the set of all items to indices of price or value, often measured in dollars or other monetary units. For example, valuation information in a package auction for the items {A,B,C} may include a measure of the valuation or cost that a bidder attaches to each of the subsets Ø, {A}, {B}, {C}, {A,B}, {A,C}, {B,C} and {A,B,C}. Alternatively, this may include a stopping price at which the bidder wishes to stop bidding for each of the respective subsets. Budget information comprises data relating to an aggregate index of price or payment, often measured in dollars or other monetary units. For example, budget information in a package auction for the items {A,B, C} may include a measure of the overall budget limit or parameter for whatever items that a given bidder may sell or buy. Other information comprises data relating to the auction that is neither valuation information nor budget information.

The state of the auction system refers to the full history of bids and messages submitted by or on behalf of bidders in the auction process, the full history of messages submitted on behalf of the auctioneer, the full history of constraints imposed by the auction system, an indicator of which phase of the auction the process currently is in, and any other relevant information about the progress of the auction. In some of the preferred embodiments of the inventive system and method, bidders are permitted to change or are not permitted to change their flexible bid information, according to rules based on the state of the auction system. In that event, the state of auction system may itself include a list of the past time or times at which bidders were allowed to change their flexible bid information, as well as information about the progress of the auction since this time or these times. In some embodiments the state of the auction system is limited to information reaching the auction computer. However, in other embodiments it includes inputs from the bidder representing flexible bid information. The "state of the auction system" is sometimes referred to, more compactly, as the "auction state information."

The current auction information refers to the portion of the state of the auction system that is made available to bidders. In some preferred embodiments, the auction is conducted in discrete rounds, and bidders are provided with full information about previous rounds, so that the current auction information in a given auction round may include the history of bids and messages submitted by or on behalf of bidders in the auction process, up until and including the previous auction round. In other preferred embodiments, the auction is conducted in discrete rounds, but bidders are provided with less than full information about previous rounds, and so the current auction information in a given auction round may include only a very abbreviated summary of the history of bids and messages submitted by or on behalf of bidders in the auction process, up until and including the previous auction round. In other preferred embodiments, the auction is conducted in continuous time, and the current auction information at a given time may include the history of bids and messages submitted by or on behalf of bidders in the auction process, with some amount of time lag.

A proxy agent is a computer-implemented system which may submit bids or send messages on behalf of a bidder, based on flexible bid information, current auction information, and/or the state of the auction system. Thus, the inputs of the proxy agent may include flexible bid information; and the outputs of the proxy agent may include bids or messages. Another way to describe this is that a proxy agent may take flexible bid information as instructions and may submit bids or send messages on behalf of a bidder. A proxy agent may be a subsystem of a larger computer-implemented auction system, or it may be a stand-alone, computer-implemented system that is capable of interacting with a computer-implemented auction system.

In some embodiments of the inventive system and method, the bidding may be intermediated by proxy agents. More precisely, a bidder may enter flexible bid information at a bidder computer or a BT, and a proxy agent may submit bids on behalf of the bidder: this process will often be referred to as proxy bidding. In such embodiments of the inventive system and method, proxy bidding may either be voluntary or mandatory. One purpose of voluntary proxy bidding is to facilitate participation by bidders in a dynamic auction. With voluntary proxy bidding, a bidder who expects to be busy during part or all of a dynamic auction can instruct a proxy agent to bid in his (or her) place. One purpose of mandatory proxy bidding is to limit the possibilities for collusion among bidders. For example, it may be believed that bidders can tacitly collude by making use of retaliatory strategies: if bidder ABC raises the high bid on an item of interest to bidder XYZ, an example of a retaliatory strategy would be for bidder XYZ to respond by raising the high bid on an item of interest to bidder ABC. With mandatory proxy bidding, the auctioneer may require bidder XYZ to input his (or her) valuation information into a proxy agent that is incapable of carrying out a retaliatory strategy, effectively limiting the possibilities for collusion among bidders.

Furthermore, in an auction system or method with proxy bidding, a bidder may be allowed to make changes to the flexible bid information that is used by its proxy agent, or a bidder may not be allowed to make such changes. Obviously, a restriction on changes to the flexible bid information has the greatest force in an auction system where proxy bidding is mandatory. Moreover, the setting on an auction system as to whether a bidder is allowed to make changes may itself be changed over time (or status), and may depend on the history of bidding (or on the identity) of the bidder. For example, bidder i may be allowed to change its flexible bid information early in the auction, but the same bidder i may not be allowed to make changes in its flexible bid information beyond a certain time in the auction. The change in setting for bidder i may depend on the course of bidder i's bidding in the auction. For example, the setting that bidder i is not allowed to make further changes to its flexible bid information may be triggered by the fact that bidder i (or its proxy agent) has submitted insufficiently few new bids between time t and time t+1 of the auction.

Proxy Auctions

A proxy auction is an auction process with proxy bidding. Observe that an auction process with mandatory proxy bidding—and in which a bidder is not allowed to make changes to the flexible bid information that is used by its proxy agent—is observationally equivalent to a sealed-bid auction. In addition, it will be described below that the outcome of a proxy auction will always be approximately a core outcome with respect to the valuation information submitted by bidders. Thus, in the text that follows, the term "proxy auction" will also be used to include any sealed-bid package auction that results in approximately a core outcome with respect to the bids submitted by bidders.

Hybrid Auctions

A hybrid auction is an auction for at least two items that includes two phases of auctions: an earlier phase in which bidders participate in a dynamic auction; and a later phase in which bidders participate in a package auction. One exemplary hybrid auction (which is a preferred embodiment of the present invention) comprises an earlier phase in which bidders participate in a clock auction and a later phase in which bidders participate in a proxy auction.

Figure 4:
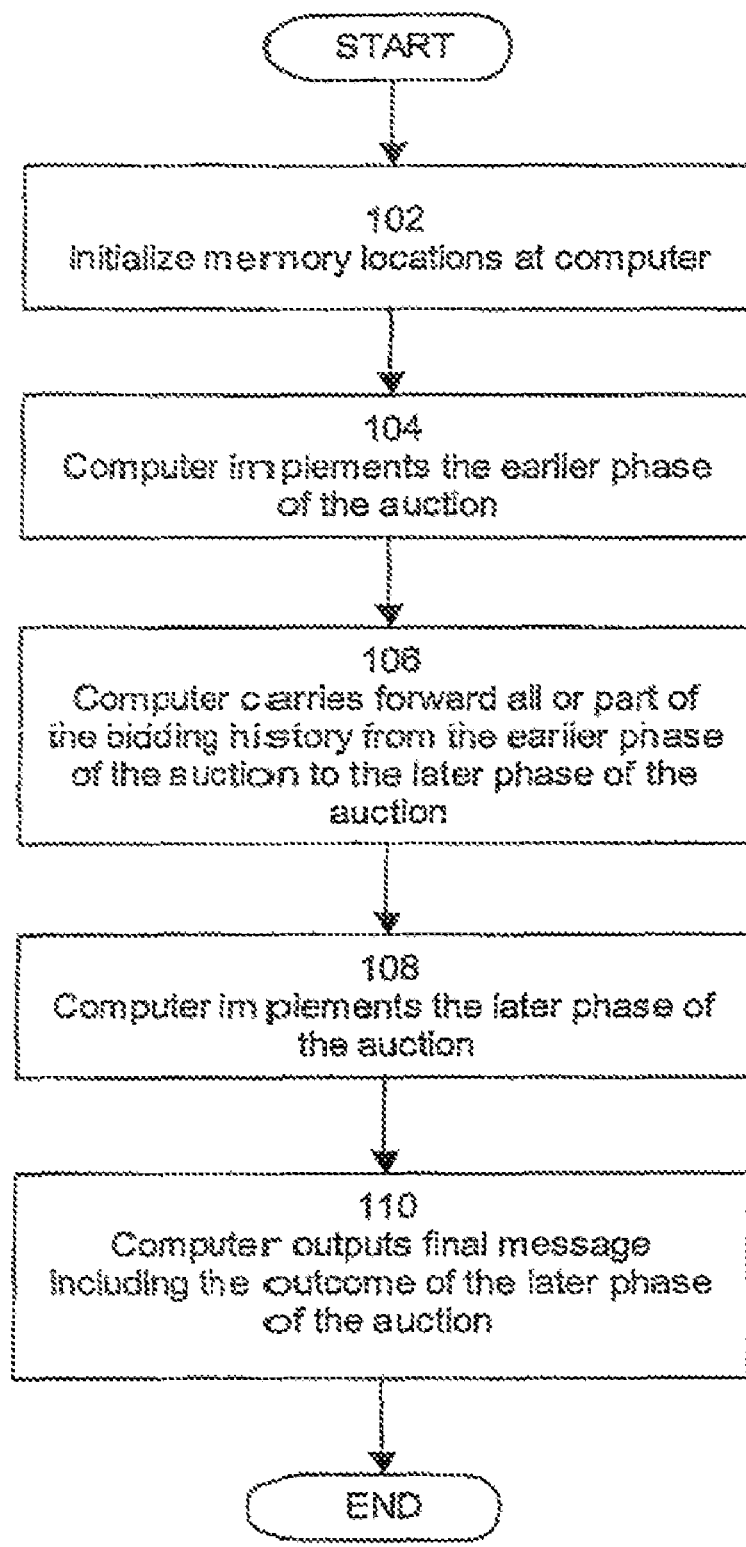
FIG. 4 is a flow diagram of an exemplary hybrid auction in accordance with an embodiment of the invention.

FIG. 4 is a diagram depicting an exemplary hybrid auction. The process starts with step 102, in which memory locations of a computer are initialized. In one preferred embodiment, the appropriate memory locations of the bidding information processor (auction computer) are initialized with information such as the types of items in the auction, the available quantity of each type of item in the auction, an initial price parameter, an auction timetable, a list of bidder ID's, and a list of passwords. In step 104, a computer implements the earlier phase of the auction, which is often a dynamic auction. In one preferred embodiment, the earlier phase of the auction is a clock auction, as shown in greater detail in FIG. 5, below. After the earlier phase of the auction concludes, a computer proceeds to step 106, in which it carries forward all or part of the bidding history from the earlier phase of the auction to the later phase of the auction. In step 108, a computer implements the later phase of the auction, which is a package auction different from the earlier phase of the auction. In one preferred embodiment, the later phase of the auction is a proxy auction, as shown in detail in FIG. 13. In another preferred embodiment, the later phase of the auction is a sealed bid package auction, as shown in greater detail in FIGS. 5, 11 and 16, below. (Observe that an auction process with mandatory proxy bidding—and in which a bidder is not allowed to make changes to the flexible bid information that is used by its proxy agent—fits the description of both a proxy auction and of a sealed bid package auction.) After the later phase of the auction concludes, a computer proceeds to step 110, in which a computer outputs a final message that includes the outcome of the later phase of the auction. In many preferred embodiments, the outcome of the later phase of the auction also serves as the outcome of the overall hybrid auction. The process then concludes.

Figure 5:
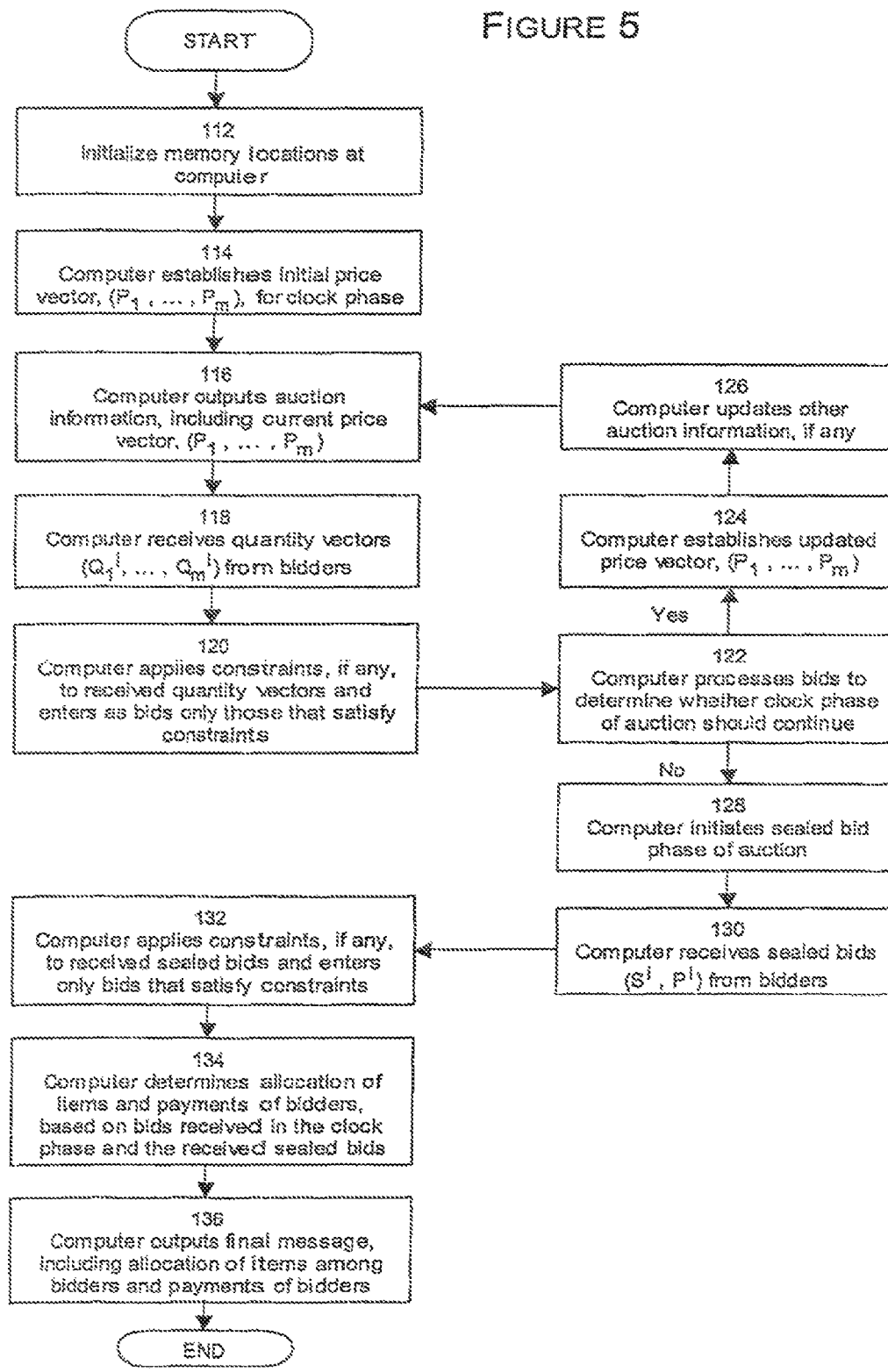
FIG. 5 is a flow diagram in greater detail of an exemplary hybrid auction in accordance with an embodiment of the invention.

FIG. 5 is a flow diagram of a preferred embodiment of the present invention, in which there are two phases to the auction: a clock auction phase; followed by a sealed bid package auction phase. The process starts with step 112, in which memory locations of a computer are initialized. In one preferred embodiment, the appropriate memory locations of the bidding information processor (auction computer) are initialized with information such as the types of items in the auction, the available quantity of each type of item in the auction, an initial price parameter, an auction timetable, a list of bidder ID's, and a list of passwords. In step 114, a computer establishes the initial price vector $(P_1, \ldots, P_m)$. The process proceeds to step 116, in which a computer outputs auction information, including the current price vector $(P_1, \ldots, P_m)$. In one preferred embodiment, the bidding information processor outputs the auction information through its network interface and transmits it via the network. The bidder terminals then receive the auction information through their network interfaces and display the information to bidders through their user interfaces. In step 118, a computer receives quantity vectors $(Q_1^i, \ldots, Q_m^i)$ from bidders. In one preferred embodiment, a bidder inputs his bids through the user interface of the bidder terminal, which then outputs the auction information through its network interface and transmits it via the network. The bidding information processor then receives the bids through its network interface for use in the next step. In step 120, a computer applies constraints, if any, to the received quantity vectors, and enters as bids only those that satisfy said constraints. This process is illustrated in greater detail in FIGS. 6a and 6b. In one preferred embodiment, the constraints are applied at the bidding information processor, although they may also easily be applied at the bidder terminals. In step 122, a computer processes the entered bids and determines whether the clock phase of the auction should continue. Exemplary processes of step 122 are illustrated in greater detail in FIG. 10. In some preferred embodiments, this determination occurs at the bidding information processor.

If the clock phase of the auction should continue, the process goes to step 124, in which a computer establishes an updated price vector $(P_1, \ldots, P_m)$. Then, at step 126, a computer updates other auction information, if any. In one preferred embodiment, the bidding information processor automatically generates a suggested revised price vector, outputs the suggested revised price vector through its network interface, and transmits it via the network. The auctioneer terminal then receives the suggested revised price vector through its network interface and displays it to the auctioneer through its user interface. The auctioneer either approves or modifies the revised price vector through the user interface of the auctioneer terminal, which then outputs the revised price vector through its network interface and transmits it via the network. The bidding information processor then receives the revised price vector through its network interface for use in subsequent steps. The process then loops to step 116.

If the clock phase of the auction should not continue, the process goes to step 128, in which a computer initiates a sealed bid phase of the auction. Then, at step 130, a computer receives sealed bids $(S^i, P^i)$ from bidders. The pair $(S^i, P^i)$ is a package bid, where $S^i \subset \Omega$ is a package, i.e., a subset of the set of all items being auctioned, and $P^i$ is a price at which bidder i is offering to transact for the entire package $S^i$. In step 132, a computer applies constraints, if any, to the received sealed bids, and enters only those sealed bids that satisfy said constraints. This process is illustrated in greater detail in FIG. 10. In one preferred embodiment, the constraints are applied at the bidding information processor, although they may also easily be applied at the bidder terminals. Following the entering of the sealed bids, the process goes to step 134, in which a computer determines an allocation of items and payments of bidders, based on bids received in the clock phase of the auction and on the received sealed bids. Exemplary processes of step 134 are illustrated in greater detail in FIGS. 11 and 16. In some preferred embodiments, this determination occurs at the bidding information processor. In some embodiments, the determination may be based only on the received sealed bids (although the bids received in the clock phase could still have the effect of constraining the sealed bids in step 132). In step 136, a computer outputs a final message, which includes the allocation and payment outcome, through its network interface and transmits it via the network. The bidder terminals and auctioneer terminal then receive the allocation and payment outcome through their network interfaces and display the information to bidders and the auctioneer through their user interfaces. The process then ends.

Elements of the Invention Concerned with Applying Constraints to Bids

In some preferred embodiments of the invention, a revealed-preference activity rule (also known as a "revealed-preference-based constraint") is imposed on bidders in the earlier phase (e.g. dynamic auction) and the later phase (e.g. package auction) of the auction. For a longer discussion of revealed preference, see the nearly last sections of "System and Method for a Dynamic Auction with Package Bidding," International Patent Application No. US01/43838.

Here is how they are imposed, in one preferred embodiment. Suppose that there are m types of items $(1, \ldots, m)$ being auctioned, and let s and t be two times in the auction (s<t) at which bids may be received from bidders. Let price vector $P^s \equiv (P_1^s, \ldots, P_m^s)$ denote the prices (per unit) for the respective types of items at time s, and let $P^t \equiv (P_1^t, \ldots, P_m^t)$ denote the prices (per unit) for the respective types of items at time t. Further, for a given bidder i, let quantity vector $Q^{i,s} \equiv (Q_1^{i,s}, \ldots, Q_m^{i,s})$ denote the quantities of the respective types of items demanded by bidder i at time s, and let $Q^{i,t} \equiv (Q_1^{i,t}, \ldots, Q_m^{i,t})$ denote the quantities of the respective types of items demanded by bidder i at time t.

The revealed-preference activity rule accepts the quantity vector $Q^{i,t}(Q_1^{i,t}, \ldots, Q_m^{i,t})$ as a bid (together with the implied price) only if the following inequality holds:

$$(P^t - P^s) \cdot (Q^{i,t} - Q^{i,s}) \leq 0, \text{ for all } s < t. \quad \text{(RP)}$$

The relaxed revealed-preference activity rule accepts the quantity vector $Q^{i,t} \equiv (Q_1^{i,t}, \ldots, Q_m^{i,t})$ as a bid (together with the implied price) only if the following inequality holds:

$$(P^t - P^s) \cdot (Q^{i,t} - \alpha Q^{i,s}) \leq 0, \text{ for all } s < t. \quad \text{(RRP)}$$

The value $\alpha$ satisfies $\alpha \geq 1$. If $\alpha > 1$, this means that the RRP activity rule is a strictly looser constraint than the RP activity rule. Relaxing the activity rule is particularly useful in the later phase (e.g. package auction), for the purpose of reducing collusion in the hybrid auction.

These inequalities may also be expressed in terms of the price for the entire package. Consider two times s and t (s<t). Suppose the bidder bids for the package S at time s and T at time t. Let $P^s(S)$ and $P^s(T)$ be the package price of S and T at time s; let $P^t(S)$ and $P^t(T)$ be the package price of S and T at time t; and let v(S) and v(T) be the value of package S and T. Revealed preference says that the bidder prefers S to T at time s:

$$v(S) - P^s(S) \geq v(T) - P^s(T),$$

and prefers T to S at time t:

$$v(T) - P^t(T) \geq v(S) - P^t(S).$$

Adding these two inequalities yields the revealed preference activity rule for packages:

$$P^t(S)-P^s(S) \geq P^t(T)-P^s(T). \quad (RP')$$

Intuitively, the package price of S must have increased more than the package price of T from time s to time t, for otherwise, at time t, S would be more profitable than T.

Similarly, a relaxed revealed-preference activity rule can be expressed in terms of the price for the entire package:

$$\alpha[P^t(S)-P^s(S)] \geq P^t(T)-P^s(T) \quad (RRP')$$

As above, the value $\alpha$ satisfies $\alpha \geq 1$. Relaxing the activity rule ($\alpha > 1$) is particularly useful in the later phase of the auction. Either of two views may be taken. First, constraint (RRP') is imposed on the collection of package bids (T, P$^t$(T)) that a given bidder submits in the later phase of the auction, that is, the bidder's submission of package bids is entered only if it satisfies constraint (RRP') relative to all bids entered for the bidder earlier in the auction. Alternatively, the later phase of the auction is a proxy auction, and the bidder may submit any valuations into the proxy agent. However, the proxy agent is bound by constraint (RRP'), and it is permitted to bid on the package T only if (RRP') is satisfied relative to all bids entered for the bidder earlier in the auction.

Figure 6A:
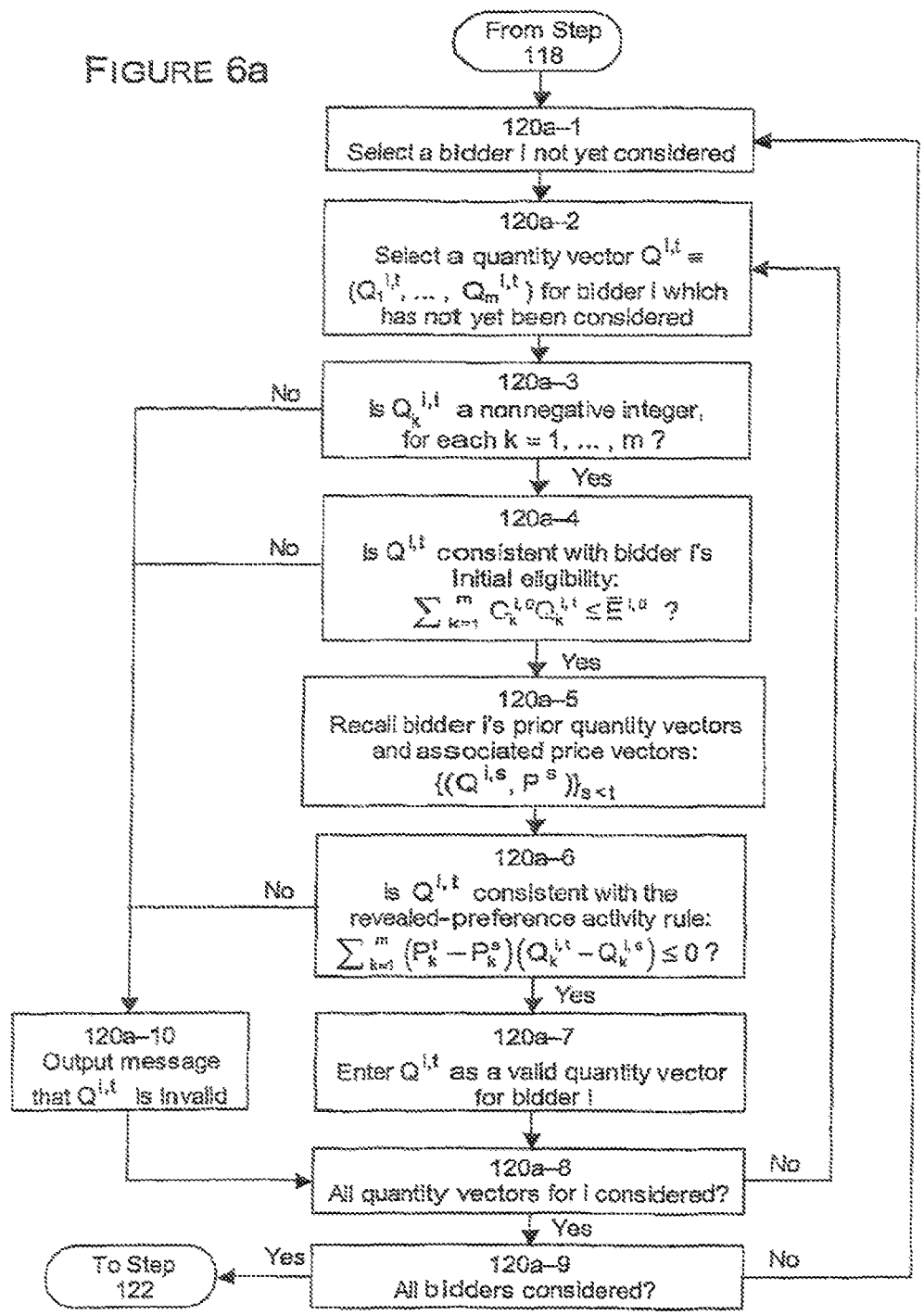

FIGS. 6a and 6b are flow diagrams of two exemplary subprocesses of step 120 of FIG. 5. The process of FIG. 6a begins with step 120a-1, in which a bidder i who has not yet been considered is selected. In step 120a-2, a quantity vector $Q^{i,t} \equiv (Q_1^{i,t}, \ldots, Q_m^{i,t})$ for bidder i which has not yet been considered is selected. The quantity vector $Q^{i,t} \equiv (Q_1^{i,t}, \ldots, Q_m^{i,t})$ was submitted at time t in the auction. In step 120a-3, it is checked whether each quantity $Q_k^{i,t}$ in the selected vector $Q^{i,t}$ is a nonnegative integer. If each component of the vector is a nonnegative integer, the process goes to step 120a-4. In step 120a-4, it is checked whether the selected quantity vector $Q^{i,t}$ is consistent with bidder i's initial eligibility, that is, whether:

$$\sum_{k=1}^{m} C_k^{i,0} Q_k^{i,t} \leq \overline{E}^{i,0},$$

where bidder i's initial eligibility, $\overline{E}^{i,0}$, may, for example, be determined by the level of financial guarantee posted by bidder i. If the selected quantity vector $Q^{i,t}$ is consistent with bidder i's initial eligibility, the process goes to step 120a-5, where bidder i's prior quantity vectors and associated price vectors, $\{(Q^{i,s}, P^s)\}_{s<t}$, are recalled. The time s is any time prior to time t (that is, s<t) in the auction. The price vector $P^s \equiv (P_1^s, \ldots, P_m^s)$ denotes the current price vector that was outputted in step 116 at time s. The quantity vector $Q^{i,s} \equiv (Q_1^{i,s}, \ldots, Q_m^{i,s})$ identifies a package of items that bidder i was offering to transact at price vector $P^s$, and which was entered as a valid quantity vector at time s. The process then goes to step 120a-6, where it is checked whether the selected quantity vector $Q^{i,t}$ is consistent with the revealed-preference activity rule, that is, whether the inequality:

$$\sum_{k=1}^{m} (P_k^t - P_k^s)(Q_k^{i,t} - Q_k^{i,s}) \leq 0,$$

is satisfied for all s<t. [Note that the above inequality is equivalent to inequality (RP), $(P^t-P^s) \cdot (Q^{i,t}-Q^{i,s}) \leq 0$, for all s<t, but inequality (RP) is written in vector notation.] If it is, the process continues to step 120a-7, where the selected quantity vector $Q^{i,t}$ is entered as a valid quantity vector for bidder i at time t. Optionally, bidder i is sent a message confirming to him that the selected quantity vector $Q^{i,t}$ is valid. The process then goes to step 120a-8, where it is determined whether all quantity vectors for bidder i at time t have been considered. If not, the process loops back to step 120a-2. If all quantity vectors for bidder i at time t have been considered, the process continues to step 120a-9, where it is determined whether all bidders have been considered. If not, the process loops back to step 120a-1. If all bidders have been considered, the process goes to step 122 of FIG. 5.

If the selected quantity vector $Q^{i,t}$ fails any of the checks at steps 120a-3, 120a-4 or 120a-6, the process instead goes to step 120a-10, where a message is outputted that the selected quantity vector $Q^{i,t}$ is invalid. The selected quantity vector then is not entered as part of a valid bid. The process then goes to step 120a-8, where it is determined whether all quantity vectors for bidder i have been considered. If not, the process loops back to step 120a-2. If all quantity vectors for bidder i have been considered, the process continues to step 120a-9, where it is determined whether all bidders have been considered. If not, the process loops back to step 120a-1. If all bidders have been considered, the process goes to step 122 of FIG. 5.

FIG. 6b depicts a similar process as FIG. 6a. However, in the process of FIG. 6b, quantity vectors are entered for a group G of types of items (that is, $G \subset \{1, \ldots, m\}$), rather than for all types of items (that is, $\{1, \ldots, m\}$). The process of FIG. 6b begins with step 120b-1, in which a bidder i who has not yet been considered is selected. In step 120b-2, a quantity vector $(Q_k^{i,t})_{k \in G}$ for bidder i which has not yet been considered is selected. The quantity vector $(Q_k^{i,t})_{k \in G}$ is a bid for the types of items contained in group G, that was submitted at time t in the auction. In step 120b-3, it is checked whether the selected quantity vector $(Q_k^{i,t})_{k \in G}$ satisfies the constraint:

$$\sum_{k \in G} C_k^{i,t} Q_k^{i,t} \leq \overline{C}_G^{i,t},$$

where $C_k^{i,t}$ and $\overline{C}_G^{i,t}$ are arbitrary constants. If the constraint of step 120b-3 is satisfied, the process goes to step 120b-4. In step 120b-4, it is checked whether the selected quantity vector $(Q_k^{i,t})_{k \in G}$ satisfies the constraint:

$$\sum_{k \in G} C'^{i,t}_k Q_k^{i,t} \geq \hat{C}_G^{i,t},$$

where $C'^{i,t}_k$ and $\hat{C}_G^{i,t}$ are arbitrary constants. If the constraint of step 120b-4 is satisfied, the process goes to step 120b-5, where it is checked whether the selected quantity vector $(Q_k^{i,t})_{k \in G}$ was submitted at a time no earlier than the starting time of the current round. If it was, the process goes to step 120b-6, where it is checked whether the selected bid was submitted at a time no later than the ending time of the current round. If it was, the process continues to step 120b-7, where the selected quantity vector $(Q_k^{i,t})_{k \in G}$ is entered as a valid quantity vector on group G for bidder i at time t. Optionally, bidder i is sent a message confirming to him that the selected quantity vector is valid. The process then goes to step 120b-8, where it is determined whether all quantity vectors for bidder i have been considered. If not, the process loops back to step 120b-2. If all quantity vectors for bidder i have been considered, the process continues to step 120*b*-9, where it is determined whether all bidders have been considered. If not, the process loops back to step 120*b*-1. If all bidders have been considered, the process goes to step 122 of FIG. 5.

If the selected quantity vector $(Q_k^{i,t})_{k \in G}$ fails any of the checks at steps 120*b*-3, 120*b*-4, 120*b*-5 or 120*b*-6, the process instead goes to step 120*b*-10, where a message is outputted that the selected bid is invalid. The selected quantity vector then is not entered as part of a valid bid. The process then goes to step 120*b*-8, where it is determined whether all quantity vectors by bidder i have been considered. If not, the process loops back to step 120*b*-2. If all quantity vectors by bidder i have been considered, the process continues to step 120*b*-9, where it is determined whether all bidders have been considered. If not, the process loops back to step 120*b*-1. If all bidders have been considered, the process goes to step 122 of FIG. 5.

It is important to note that, in many preferred embodiments of the clock auction phase, bidders are allowed full flexibility in making bids which, if accepted, would cause aggregate demand to be less than supply. After each new price vector is announced, bidders can arbitrarily reduce their previous quantities bid. (However, note that the previous bids will be carried forward to the proxy auction phase in many preferred embodiments, so the bids retain meaning.) For example, it might be the case that supply equals demand for a particular item, but a bidder may wish to reduce his demand on that item, as the price of a complementary item has increased. Or it might be the case that, when demand was greater than supply for a particular item, two bidders simultaneously attempted to reduce their demands, sufficiently to now make demand less than supply. It is tempting to refuse to allow the reduction in the first case, or to ration the bidders in the second case, since otherwise the clock auction phase may yield a significant underselling of the items in the auction. However, to refuse the reduction or to ration the bidders may yield an exposure problem for bidders who have complements preferences. Consequently, in many preferred embodiments of the clock auction phase, the full flexibility to reduce arbitrarily reduce bids is allowed. In any event, observe that the clock auction phase does not conclude the auction, and the underselling can be remedied during the later phase (e.g. package auction phase, including sealed bid auction phase or proxy auction phase) of the auction.

Embodiments of the Invention Concerned with Whether the Dynamic Auction Phase should Continue FIG. 7*a* is a flow diagram of a subprocess of step 122 of FIG. 5. It illustrates a first exemplary process by which a computer may determine whether the dynamic auction phase of a hybrid auction should continue. (In particular, FIG. 7*a* will illustrate an exemplary process by which a computer may determine whether the clock auction phase of a two-phase auction comprising a clock auction phase and a sealed bid phase should continue. Related to this will also be FIG. 9*b*, below, which illustrates an exemplary process by which a computer determines whether the clock auction phase should continue, in a system where bidders are permitted to submit Intra-Round Bids.)

The process of FIG. 7*a* treats a clock auction phase in which each bidder i is permitted to submit only a single quantity vector associated with a current price vector $P^t \equiv (P_1^t, \ldots, P_m^t)$. The quantity vector $Q^{i,t} \equiv (Q_1^{i,t}, \ldots, Q_m^{i,t})$ identifies a package of items that bidder i is offering to transact at price vector $P^t$. FIG. 7*a* begins with step 122*a*-1, in which a type k of items not yet considered is selected. In step 122*a*-2, a computer determines whether the sum of the quantities bid for items of type k (summed over all bidders i=1, . . . , n) is less than or equal to the available quantity of items of type k, that is, whether:

$$\sum_{i=1}^{m} Q_k^{i,t} \le \overline{Q}_k.$$

If this inequality is not satisfied, then type k of items has not yet cleared, and so the dynamic auction phase should continue. The process thus jumps immediately to step 124 of FIG. 5.

If the inequality of step 122*a*-2 is satisfied, the process then goes to step 122*a*-3, where it is determined whether all types k of items (k=1, . . . , m) have been considered. If not, the process loops back to step 122*a*-1. However, if all types k of items have already been considered, then it has been found that all types k of items have cleared, and so the dynamic auction phase should not continue. The process proceeds to step 128 of FIG. 5, where a computer initiates the sealed bid phase of the hybrid auction.

FIG. 7*b* is a flow diagram of a subprocess of step 122 of FIG. 5. It illustrates a second exemplary process by which a computer may determine whether the dynamic auction phase of a hybrid auction should continue. (In particular, FIG. 7*b* will illustrate an exemplary process by which a computer may determine whether the clock auction phase of a two-phase auction comprising a clock auction phase and a sealed bid phase should continue.)

In the process of FIG. 7*b*, market clearing is defined for a group G of types of items (that is, $G \subset \{1, \ldots, m\}$), rather than for every individual type of item. FIG. 7*b* begins with step 122*b*-1, in which a group G of types of items not yet considered is selected. In step 122*b*-2, a computer determines whether the excess demand for group G of types of items is within $\overline{C}^G$ of the available quantity, that is, whether:

$$\left| \overline{Q}^G - \sum_{i=1}^{n} \sum_{k \in G} Q_k^{i,t} \right| \le \overline{C}^G.$$

The nonnegative constant, $\overline{C}^G$, has the interpretation that this is the tolerance to which the auctioneer is allowing oversell or undersell to occur. If the auctioneer needs to sell exactly the available quantity of the group G of item types, then $\overline{C}^G = 0$. If this inequality is not satisfied, then group G of item types has not yet cleared, and so the dynamic auction phase should continue. The process thus jumps immediately to step 124 of FIG. 5.

If the inequality of step 122*b*-2 is satisfied, the process then goes to step 122*b*-3, where it is determined whether all groups G of types of items have been considered. If not, the process loops back to step 122*b*-1. However, if all groups G of types of items have already been considered, then it has been found that all groups G of types of items have cleared within a tolerance of $\overline{C}^G$, and so the dynamic auction phase should not continue. The process proceeds to step 128 of FIG. 5, where a computer initiates the sealed bid phase of the hybrid auction.

FIG. 7*c* is a flow diagram of a subprocess of step 122 of FIG. 5. It illustrates a third exemplary process by which a computer may determine whether the dynamic auction phase of a hybrid auction should continue. (In particular, FIG. 7*c* will illustrate an exemplary process by which a computer may determine whether the clock auction phase of a two-phase auction comprising a clock auction phase and a sealed bid phase should continue.)

The process of FIG. 7c treats a clock auction phase in which each bidder i is permitted to submit multiple quantity vectors associated with a current price vector $P^t \equiv (P_1^t, \ldots, P_m^t)$. The quantity vector $Q^{i,t} \equiv (Q_1^{i,t}, \ldots, Q_m^{i,t})$ identifies a package of items that bidder i is offering to transact at price vector $P^t$. If, in addition, bidder i submitted a second quantity vector $R^{i,t} \equiv (R_1^{i,t}, \ldots, R_m^{i,t})$ at time t, then $R^{i,t}$ identifies a second package of items that bidder i is offering to transact at price vector $P^t$. In many preferred embodiments of the auction process, bidder i may win package $Q^{i,t}$ or package $R^{i,t}$—but not both packages. Described differently, the bids for packages $Q^{i,t}$ and $R^{i,t}$ are treated as mutually exclusive. The "mutually exclusive" interpretation of bids does not prevent bidder i from indicating his willingness to transact both quantity vectors; all that bidder i would need to do is also submit a quantity vector of $Q^{i,t} + R^{i,t}$.

FIG. 7c begins with step 122c-1, in which, for each bidder i (i=1, ..., n), a computer recalls the entire set $S^{i,t}$ of quantity vectors received from bidder i at the current price vector $P^t$. That is, $S^{i,t} \equiv \{Q^{i,t}:$ quantity vector $Q^{i,t}$ was received from bidder i at time t$\}$. In step 122c-2, a computer determines whether there exists a selection of quantity vectors from $S^{i,t}$, one for each bidder, which can be satisfied with the available quantity. More precisely:

Does there exist $\{Q^{i,t}\}_{i=1,\ldots,n}$ such that $$\sum_{i=1}^{n} Q_k^i \leq \overline{Q}_k,$$

for all k=1, ..., m, and $Q^{i,t} \in S^{i,t}$, for all i=1, ..., n?
If there does not exist any selection of quantity vectors from $S^{i,t}$, one for each bidder, which can be satisfied with the available quantity, then the market cannot be cleared at the current price vector $P^t \equiv (P_1^t, \ldots, P_m^t)$, and so the dynamic auction phase should continue. The process thus proceeds to step 124 of FIG. 5.

However, if there does exist a selection of quantity vectors from $S^{i,t}$, one for each bidder, which can be satisfied with the available quantity, then it has been found that the market can be cleared at the current price vector $P^t \equiv (P_1^t, \ldots, P_m^t)$, and so the dynamic auction phase should not continue. The process thus proceeds to step 128 of FIG. 5, where a computer initiates the sealed bid phase of the hybrid auction.

Figure 8A:
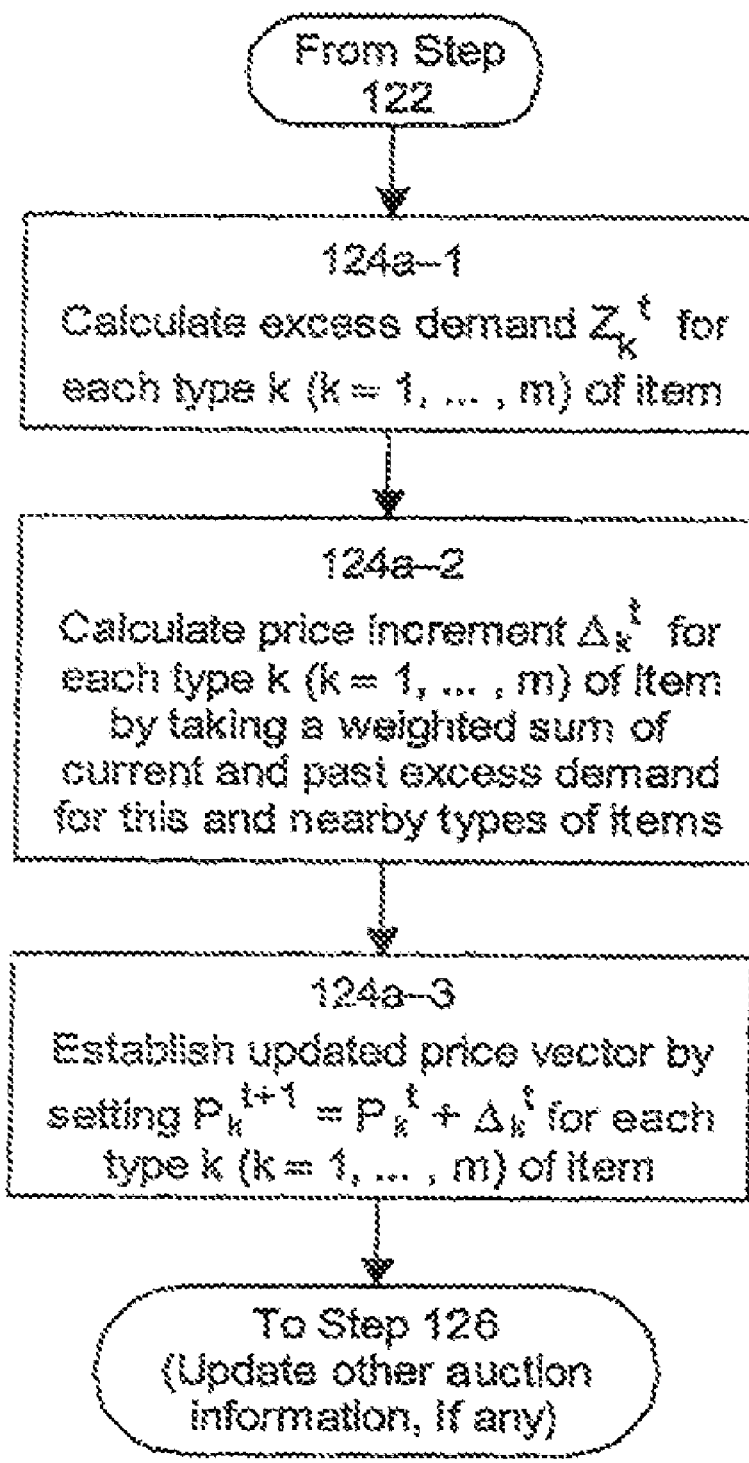
FIGS. 8a and 8b are flow diagrams illustrating, in greater detail, elements of the flow diagram of FIG. 5.

Embodiments of the Invention Concerned with Updating Prices in the Dynamic Auction Phase FIG. 8a is a flow diagram of a subprocess of step 124 of FIG. 5. It illustrates a first exemplary process by which a computer may update prices in the dynamic auction phase. (In particular, FIG. 8a will illustrate an exemplary process by which a computer may establish an updated price vector in the clock auction phase of a two-phase auction comprising a clock auction phase and a sealed bid phase.)

The process of FIG. 8a treats a clock auction phase in which each bidder i is permitted to submit only a single quantity vector associated with a current price vector $P^t \equiv (P_1^t, \ldots, P_m^t)$. The quantity vector $Q^{i,t} \equiv (Q_1^{i,t}, \ldots, Q_m^{i,t})$ identifies a package of items that bidder i is offering to transact at price vector $P^t$. FIG. 8a begins with step 124a-1, in which a computer calculates the excess demand, $Z_k^t$, for all types k of items (k=1, ..., m) at time t in the clock auction phase, and recalls prior excess demands, $Z_k^{t-1}, Z_k^{t-2}, Z_k^{t-3}, \ldots$ as needed. The excess demand, $Z_k^t$, for the type k of item at time t is defined by:

$$Z_k^t = -\overline{Q}_k + \sum_{i=1}^{n} Q_k^{i,t}.$$

That is, the vector of excess demands is the amount by which the sum of the quantity vectors (summed over all bidders i=1, ..., n) exceeds the vector $\overline{Q}$ of available quantities. The process then goes to step 124a-2, in which a computer calculates price increments, $\Delta_k^t$, for all types k of items (k=1, ..., m) at time t in the clock auction phase. In general, the price increments may be any arbitrary function of the state of the auction information. However, in many embodiments of the inventive system, the price increments are calculated from the excess demands. In one preferred embodiment, the price increment for each type of item is calculated by taking a weighted sum of current and past excess demands for this item type and other nearby item types.
For example:

$$\Delta_k^t = C_{00} Z_k^t + C_{10}(Z_{k+1}^t + Z_{k-1}^t) + C_{20}(Z_{k+2}^t + Z_{k-2}^t) + C_{01} Z_k^{t-1} + C_{11}(Z_{k+1}^{t-1} + Z_{k-1}^{t-1}) + C_{21}(Z_{k+2}^{t-1} + Z_{k-2}^{t-1}),$$

where $C_{00}, C_{10}, C_{20}, C_{01}, C_{11}$ and $C_{21}$ are positive constants. One exemplary application of this price increment formula is for airport slots. The types k of items may refer to landing slots in consecutive 15-minute intervals. Thus, landing slots of types k−1 and k+1 are likely to be reasonable substitutes for landing slots of type k, and consequently the price increment for landing slots of type k might depend, in part, on the excess demand for landing slots of types k−1 and k+1. At the same time, the excess demands at preceding times in the clock auction phase are also relevant information for establishing updated prices, so the price increment for landing slots at time t might depend, in part, on the excess demand for landing slots at time t−1.

The process then goes to step 124a-3, where the updated price vector is established by setting $P_k^{t+1} = P_k^t + \Delta_k^t$, for all types k of items (k=1, ..., m). The process then proceeds to step 126 of FIG. 5, where a computer updates other auction information, if any.

Figure 8B:
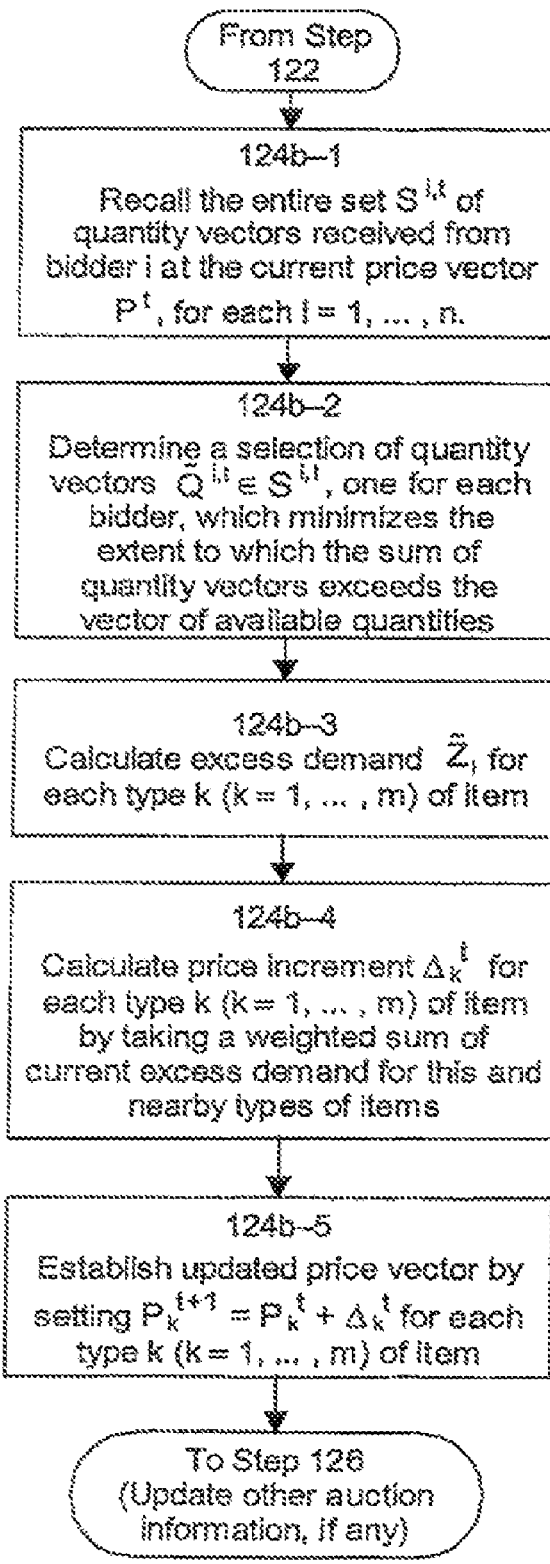

FIG. 8b is a flow diagram of a subprocess of step 124 of FIG. 5. It illustrates a second exemplary process by which a computer may update prices in the dynamic auction phase. (In particular, FIG. 8b will illustrate an exemplary process by which a computer may establish an updated price vector in the clock auction phase of a two-phase auction comprising a clock auction phase and a sealed bid phase.)

The process of FIG. 8b treats a clock auction phase in which each bidder i is permitted to submit multiple quantity vectors associated with a current price vector $P^t \equiv (P_1^t, \ldots, P_m^t)$. The quantity vector $Q^{i,t} \equiv (Q_1^{i,t}, \ldots, Q_m^{i,t})$ identifies a package of items that bidder i is offering to transact at price vector $P^t$. If, in addition, bidder i submitted a second quantity vector $R^{i,t} \equiv (R_1^{i,t}, \ldots, R_m^{i,t})$ at time t, then $R^{i,t}$ identifies a second package of items that bidder i is offering to transact at price vector $P^t$. In many preferred embodiments of the auction process, bidder i may win package $Q^{i,t}$ or package $R^{i,t}$—but not both packages. Described differently, the bids for packages $Q^{i,t}$ and $R^{i,t}$ are treated as mutually exclusive. The "mutually exclusive" interpretation of bids does not prevent bidder i from indicating his willingness to transact both quantity vectors; all that bidder i would need to do is also submit a quantity vector of $Q^{i,t}+R^{i,t}$.

FIG. 8b begins with step 124b-1, in which, for each bidder i (i=1, . . . , n), a computer recalls the entire set $S^{i,t}$ of quantity vectors received from bidder i at the current price vector $P^t$. That is, $S^{i,t} \equiv \{Q^{i,t}:$ quantity vector $Q^{i,t}$ was received from bidder i at time t$\}$. In step 124b-2, a computer determines a selection of quantity vectors for each bidder. In one preferred embodiment, a computer determines a selection of quantity vectors $\tilde{Q}^{i,t}$ from $S^{i,t}$, one for each bidder, which minimizes the extent to which the sum of the quantity vectors (summed over all bidders i=1, . . . , n) exceeds the vector of available quantities. More precisely, a computer determines a solution to the following optimization problem:

Determine $\{\tilde{Q}^{i,t}\}_{i=1,\ldots,n}$ that minimizes $$\sum_{k=1}^{m} \max\left\{0, -\overline{Q}_k + \sum_{i=1}^{n} Q_k^{i,t}\right\},$$

subject to $Q^{i,t} \in S^{i,t}$, for all i=1, . . . , n.

The process then goes to step 124b-3, in which a computer calculates the excess demands $\tilde{Z}_k^t$ for all types k of items (k=1, . . . , m) based on the selection $\tilde{Q}^{i,t}$ from $S^{i,t}$ determined in step 124b-2. The excess demand, $\tilde{Z}_k^t$, for the type k of item at time t is defined by:

$$\tilde{Z}_k^t = -\overline{Q}_k + \sum_{i=1}^{n} \tilde{Q}_k^{i,t}.$$

That is, the vector of excess demands is the amount by which the sum of the quantity vectors $\tilde{Q}^{i,t}$ (summed over all bidders i=1, . . . , n) exceeds the vector $\overline{Q}$ of available quantities. The process then continues to step 124b-4, in which a computer calculates price increments, $\Delta_k^t$, for all types k of items (k=1, . . . , m) at time t in the clock auction phase. In general, the price increments may be any arbitrary function of the state of the auction information. However, in many embodiments of the inventive system, the price increments are calculated from the excess demands. In one preferred embodiment, the price increment for each type of item is calculated by taking a weighted sum of current excess demands for this item type and other nearby item types. For example:

$$\Delta_k^t = C_{00}\tilde{Z}_k^t + C_{10}(\tilde{Z}_{k+1}^t + \tilde{Z}_{k-1}^t) + C_{20}(\tilde{Z}_{k+2}^t + \tilde{Z}_{k-2}^t) + C_{30}(\tilde{Z}_{k+3}^t + \tilde{Z}_{k-3}^t),$$

where $C_{00}$, $C_{10}$, $C_{20}$ and $C_{30}$ are positive constants. As before, one exemplary application of this price increment formula is for airport slots.

The process then goes to step 124b-5, where the updated price vector is established by setting $P_k^{t+1}=P_k^t+\Delta_k^t$, for all types k of items (k=1, . . . , m). The process then proceeds to step 126 of FIG. 5, where a computer updates other auction information, if any.

Embodiments of the Invention Concerned with Intra-Round Bids

In many of the leading dynamic electronic auctions in the prior art, bidders submit bids in a sequence of discrete rounds. For example, in the Federal Communications Commission auctions for radio communications spectrum or in the UMTS (3G) spectrum auctions held by European nations, the following would be a typical bidding schedule for an auction:

Round 1: 9:00-9:45
Round 2: 10:00-10:45
Round 3: 11:00-11:45
Round 4: 12:00-12:45
Round 5: 13:00-13:45
Round 6: 14:00-14:45
Round 7: 15:00-15:45
Round 8: 16:00-16:45

This bidding schedule would have the following interpretation. During the specified time period of each round, a bidder would be required to submit a new bid or new collection of bids (unless this bidder was already the standing high bidder on an item after the bidding of the previous round). If a bidder who was required to submit a new bid failed to submit a new bid, then (except for provisions in the rules concerning automatic waivers) the bidder would be eliminated from the auction.

By contrast, some other electronic auctions in the prior art—for example, online auctions at eBay—allow bidding to occur continuously. Rather than adhering to any rigid round schedule, bidders may submit bids at any times that they like up to a specified closing time. Related to this, there is no sense that a bidder is required to bid a certain amount by any particular time in order to retain eligibility to bid at a later time in the auction.

Many or most electronic auctions for high-valued items utilize a discrete round structure, rather than allowing bidding to occur continuously. There appear to be several reasons for this. First, a discrete round structure has desirable information properties. The auction can be easily structured so that the results of Round t are disseminated to bidders before the bids of Round t+1 need to be submitted. Second, a discrete round structure is especially conducive to enforcing "activity rules," in which a bidder is required to be active (i.e., either be the standing high bidder or place a new high bid) on a given number of items in an earlier round of the auction in order to continue to bid on a given number of items in a later round of the auction. This forces bidders to effectively disclose to their opponents (through their bidding) the values that they attach to the items, helping to mitigate the well-known "Winner's Curse" present in auctions. Third, a discrete round structure requires a bidder to repeatedly affirm, in successive rounds, his willingness to pay a given price for an item in the auction—which may be especially desirable when items such as communications licenses may sell for millions or billions of dollars or euros.

At the same time, the desirable properties of a discrete round structure may come at some considerable cost. It will typically be reasonable to hold only something like 8 to 12 rounds of bidding in a given day. As a result, the auctioneer must accept at least one of several problems:

(1) The auction may be required to last a very long time: in some North American and European spectrum auctions, the bidding extended more than 20 business days. Such a lengthy auction may be rather onerous for bidders and for the seller. In particular, it may discourage bidder participation, causing the seller to forgo substantial revenues.

(2) The bid increment between successive rounds may be required to be rather substantial: in some North American and European spectrum auctions, the bid increment between successive rounds never was allowed to drop below five percent of the previous bid. It can be argued that a seller suffers an expected revenue loss that is directly proportional to the minimum bid increment, so this may cost a seller millions of dollars or euros.

(3) The starting price may be required to be very near to the expected closing price. This may discourage bidder participation, as well as potentially eliminating the possibility of bidders getting caught up in the excitement of the auction and bidding very high prices (which is one of the advantages of conducting a dynamic auction). This also runs the risk that the auction will fail: that is, quantities bid at the starting price being less than the available quantity at the auction.

Moreover, in a clock auction, problem (2) above, a large bid increment, may lead to a heightened risk of "undersell". Consider an auction with an available quantity of 100 units of an item, and suppose a bid increment of five percent. It is quite plausible that, at a price of $1,000,000 per unit, the aggregate quantity bid by all bidders would equal 110 units, but at the next price of $1,050,000 per unit, the aggregate quantity bid by all bidders would decline to only 60 units. The auctioneer then faces the unattractive alternatives of: selling only 60 units out of the available quantity of 100 units at a price of $1,050,000 each; rationing bidders so that only 100 units, out of the 110 demanded, are sold at $1,000,000; or restarting the auction at $1,000,000. Observe however that the "undersell" problem would in all likelihood have been substantially avoided, had a much smaller bid increment been possible.

One embodiment of the present invention is a system and method for "Intra-Round Bids." A discrete round structure—with all of its many advantages—is preserved for a clock auction. However, in each round of the clock auction, a "starting price" and "ending price" is established for each type of item. Bidders are permitted to submit bids at prices between the starting price and the ending price. In a preferred embodiment, a bidder submits a price parameter for group G representing a percentage of the distance from the starting price vector for group G and the ending price vector for group G.

Bidders have every incentive to utilize Intra-Round Bids, and to the extent that bidders utilize them, the seller should be expected to attain higher auction revenues and to reduce the probability of undersell. Thus, a system and method for Intra-Round Bids improves upon the prior art for auction systems and methods, and has immediate practical application for dynamic auctions of radio communications spectrum, securities and other financial products, electric power, etc.

While the previous and following description of Intra-Round Bids is framed largely in terms of regular auctions to sell (where bidders are buyers), the invention is equally applicable for reverse or procurement auctions to buy (where bidders are sellers). For the sake of brevity, this specification will not run through the process a second time with the roles of selling and buying reversed, but it should be clear to anybody skilled in the art that the technology can be equally used in both situations.

Here is an example illustrating the usefulness and exact meaning of Intra-Round Bids. Suppose that, in a clock auction with an available quantity of 100 units, the ending price per unit associated with Round 4 is $1,000,000, and the ending price per unit associated with Round 5 is $1,050,000. In an auction with discrete bidding rounds, Bidder 1 might submit a bid quantity of 55 units for Round 4 and a bid quantity of 30 units for Round 5. If there also exists a Bidder 2 who submits the same bid quantities, then we would have exactly the "undersell" problem described above: an aggregate quantity bid by all bidders of 110 units in Round 4 but only 60 units in Round 5 (with available quantity of 100 units).

With an auction system and method with Intra-Round Bidding, the ending price for Round 4 may be taken to be the starting price for Round 5, i.e., the starting price for Round 5 is $1,000,000. Here is an example of the bids that Bidder 1 might submit for Auction Round 5:

53 units at $1,010,000 per unit;
51 units at $1,020,000 per unit;
49 units at $1,030,000 per unit;
45 units at $1,035,000 per unit;
40 units at $1,040,000 per unit; and
30 units at $1,045,000 per unit.

These bids have the following exact meaning: the parameters corresponding to price indicate the price at which Bidder 1 wishes to change his quantity demanded as compared to his "previous" (that is, next lower price) bid. Thus, in this example:

Bidder 1 is willing to purchase 55 units (his previous bid from Round 4) at prices of $1,000,001-$1,009,999;
Bidder 1 is willing to purchase 53 units at prices of $1,010,000-$1,019,999;
Bidder 1 is willing to purchase 51 units at prices of $1,020,000-$1,029,999;
Bidder 1 is willing to purchase 49 units at prices of $1,030,000-$1,034,999;
Bidder 1 is willing to purchase 45 units at prices of $1,035,000-$1,039,999;
Bidder 1 is willing to purchase 40 units at prices of $1,040,000-$1,044,999; and
Bidder 1 is willing to purchase 30 units at prices of $1,045,000-$1,050,000.

If there also exists a Bidder 2 who submits the same bid quantities, then the auctioneer would be able to declare the auction over at a price between $1,030,000 and $1,034,999, with 98 out of the 100 available units sold. The auction revenues are improved, and the undersell problem is greatly reduced.

Figure 9A:
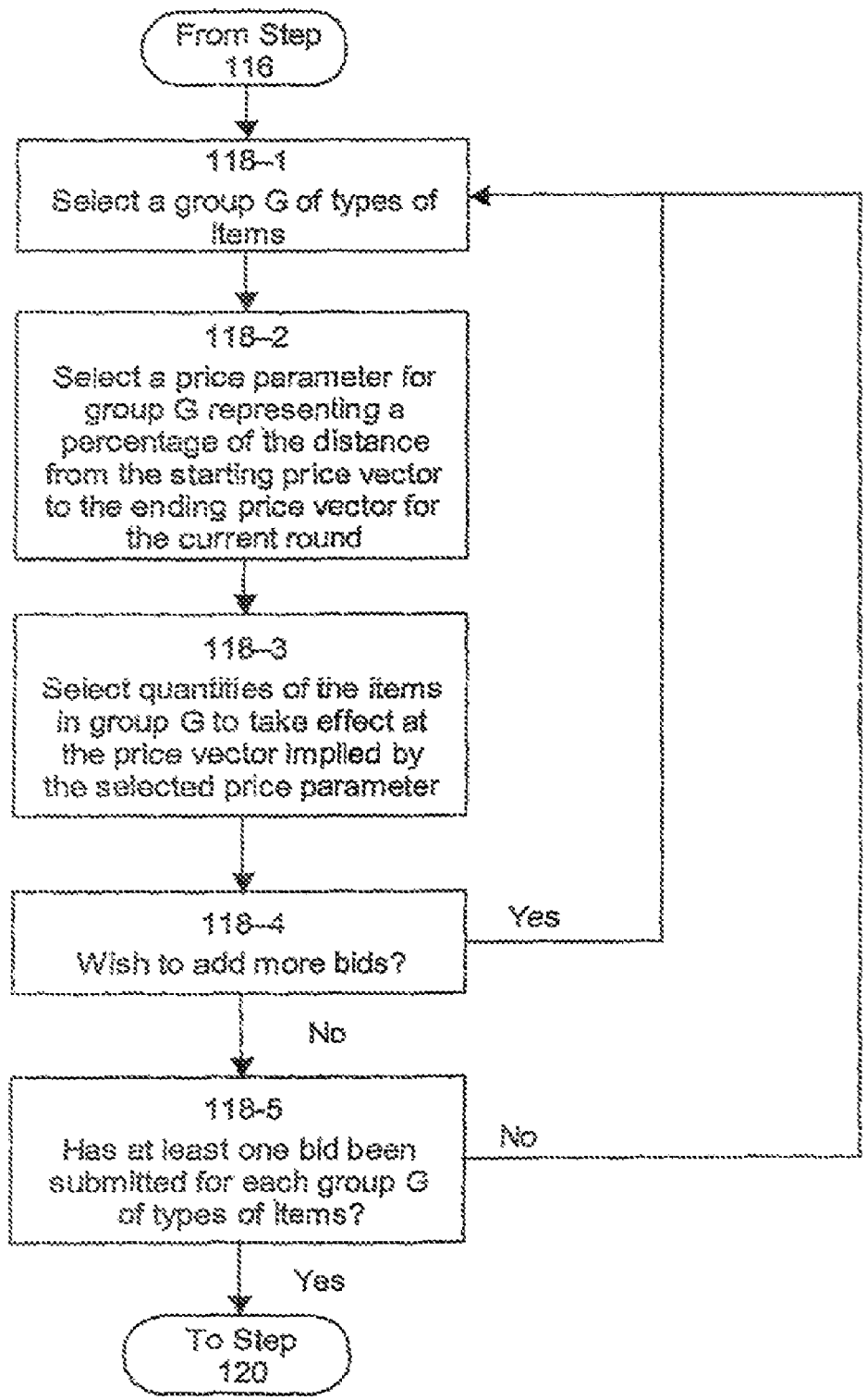

FIG. 9a is a flow diagram of a subprocess of step 118 of FIG. 5. It illustrates an exemplary process by which a particular bidder i may submit Intra-Round Bids. FIG. 9a begins with step 118-1, in which bidder i selects a group, G, of item types on which he wishes to place a bid. In various embodiments of the inventive system, the group, G, may be the entire set of types k of items (G={1, ..., m}), or any subset thereof. In step 118-2, bidder i selects a price parameter for group G representing a percentage of the distance from the starting price vector for group G and the ending price vector for group G in the current round. For example, in a group containing three types of items, if the starting price vector is (4.00, 4.50, 4.75), if the ending price vector is (8.00, 8.50, 8.75), and if a bidder enters a price parameter of 25%, this signifies that the bidder is indicating an implied price vector of (5.00, 5.50, 5.75). In step 118-3, bidder i selects quantities of the item types of group G that he would like to take effect as bids at the price vector implied by the selected price parameter. In step 118-4, bidder i expresses whether he wishes to enter more bids. If so, the process loops back to step 118-1. If not, the process continues to step 118-5. In step 118-5, a computer determines whether bidder i has submitted at least one bid for each group G of item types. If not, the process loops back to step 118-1, and optionally a computer prompts bidder i to submit bids on the groups G of item types on which bidder i has not submitted at least one valid bid in the current round. If so, the process goes to step 120 of FIG. 5.

FIG. 9b is a flow diagram of a subprocess of step 122 of FIG. 5. It illustrates an exemplary process by which a computer determines whether the dynamic auction phase should continue, in a system where bidders are permitted to submit Intra-Round Bids. FIG. 9b begins with step 122b-1, in which a group G of item types not yet considered is selected. In step 122b-2, a computer sorts all bids entered for group G in the current round. The sorting is done: first, by bidder ID; second, by price parameter in the entered bid (in descending order); and third, by time stamp of submission (in descending order). In step **122*b*-3, a computer selects, for each bidder i, the bid, $Q^{G,i}$, for group G with the highest price parameter (and then the latest time stamp). In step 122*b*-4**, a computer determines whether the aggregate quantity bid for group G is no greater than the available quantity, that is, whether:

$$\sum_{i=1}^{n} \sum_{k \in G} Q_k^{G,i} \leq \overline{Q}^G.$$

If this inequality is not satisfied, then group G of item types has not yet cleared, and so the dynamic auction phase should continue. The process thus jumps immediately to step 124 of FIG. 5.

If the inequality of step **122*b*-4 is satisfied, the process then goes to step 122*b*-5, where it is determined whether all groups G of item types have been considered. If not, the process loops back to step 122*b*-1. However, if all groups G of item types have already been considered, then it has been found that all groups G of item types have cleared, and so the dynamic auction phase should not continue. The process proceeds to step 128 of FIG. 5**, where the outcome of the dynamic auction phase may be generated and a computer initiates the sealed bid phase.

Figure 9C:
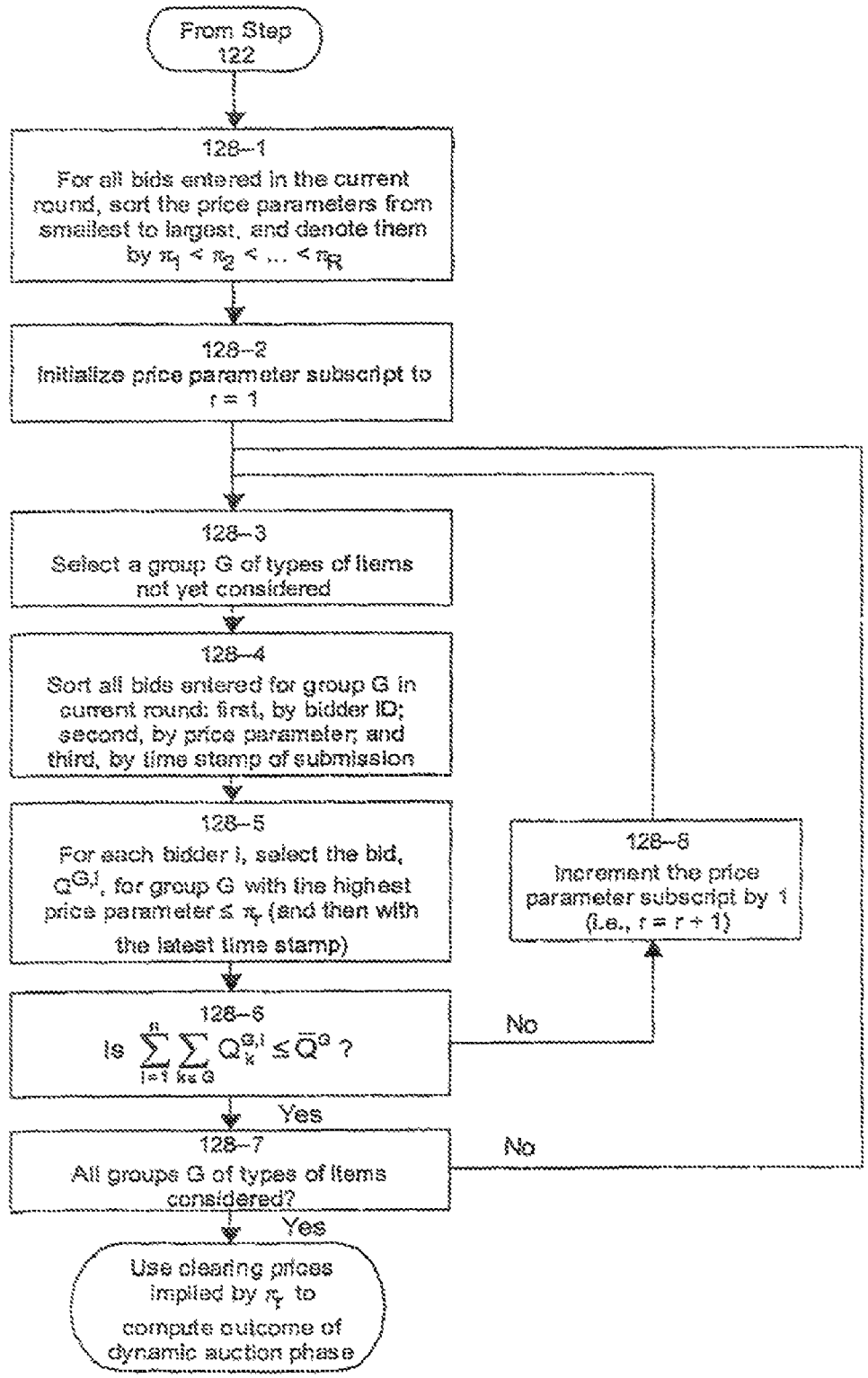

FIG. **9*c* is a flow diagram of a subprocess of step 128 of FIG. 5. It illustrates an exemplary process by which a computer determines the outcome of the dynamic auction phase, in a system where bidders are permitted to submit Intra-Round Bids. FIG. 9*c* begins with step 128-1, in which for all bids entered in the current (i.e., final) round of the dynamic auction phase, a computer sorts the price parameters from smallest to largest, and denotes them $\pi_1 < \pi_2 < \ldots < \pi_R$. In step 128-2, a computer initializes the price parameter subscript to r=1, so that in the first iteration of the remaining steps, the computer considers the smallest value, $\pi_1$. In step 128-3, a group G of item types not yet considered is selected. In step 128-4, a computer sorts all bids entered for group G in the current round. The sorting is done: first, by bidder ID; second, by price parameter in the entered bid (in descending order); and third, by time stamp of submission (in descending order). In step 128-5, a computer selects, for each bidder i, the bid, $Q^{G,i}$, for group G with the highest price parameter that is less than or equal to $\pi_r$ (and then with the latest time stamp). In step 128-6**, a computer determines whether the aggregate quantity bid for group G is no greater than the available quantity, that is, whether:

$$\sum_{i=1}^{n} \sum_{k \in G} Q_k^{G,i} \leq \overline{Q}^G.$$

If this inequality is not satisfied, then group G of item types has not yet cleared at price parameter $\pi_r$, and so r needs to be incremented. The process thus goes to step 128-8, where the price parameter subscript r is advanced by 1, so that in the next iteration of these steps, the computer considers the next price parameter, $\pi_{r+1}$. The process then loops back to step 128-3, using the new higher value of $\pi_{r+1}$ and starting over for groups G of item types.

If the inequality of step 128-6 is satisfied, the process continues to step 128-7, where it is determined whether all groups G of item types have been considered. If not, the process loops back to step 128-3. However, if all groups G of item types have already been considered, then it has been found that all groups G of item types have cleared at price parameter $\pi_r$. Thus, the price parameter $\pi_r$ implies market-clearing prices for the dynamic auction phase. The process proceeds to calculate the price vector implied by price parameter $\pi_r$, to note the quantities bid by all bidders at this price vector, and to incorporate these computations into an outcome of the dynamic auction phase. A computer then initiates the later phase of the auction and proceeds to step 130 of FIG. 5.

Embodiments of the Invention Concerned with the Later Phase of the Auction

Following a determination that the earlier phase of the auction should not continue, the process continues by initiating the later phase of the auction. This is illustrated beginning at step 106 of FIG. 4. For preferred embodiments in which the earlier phase is a clock auction phase and the later phase is a sealed bid auction phase, this is illustrated in greater detail beginning at step 128 of FIG. 5.

Figure 10:
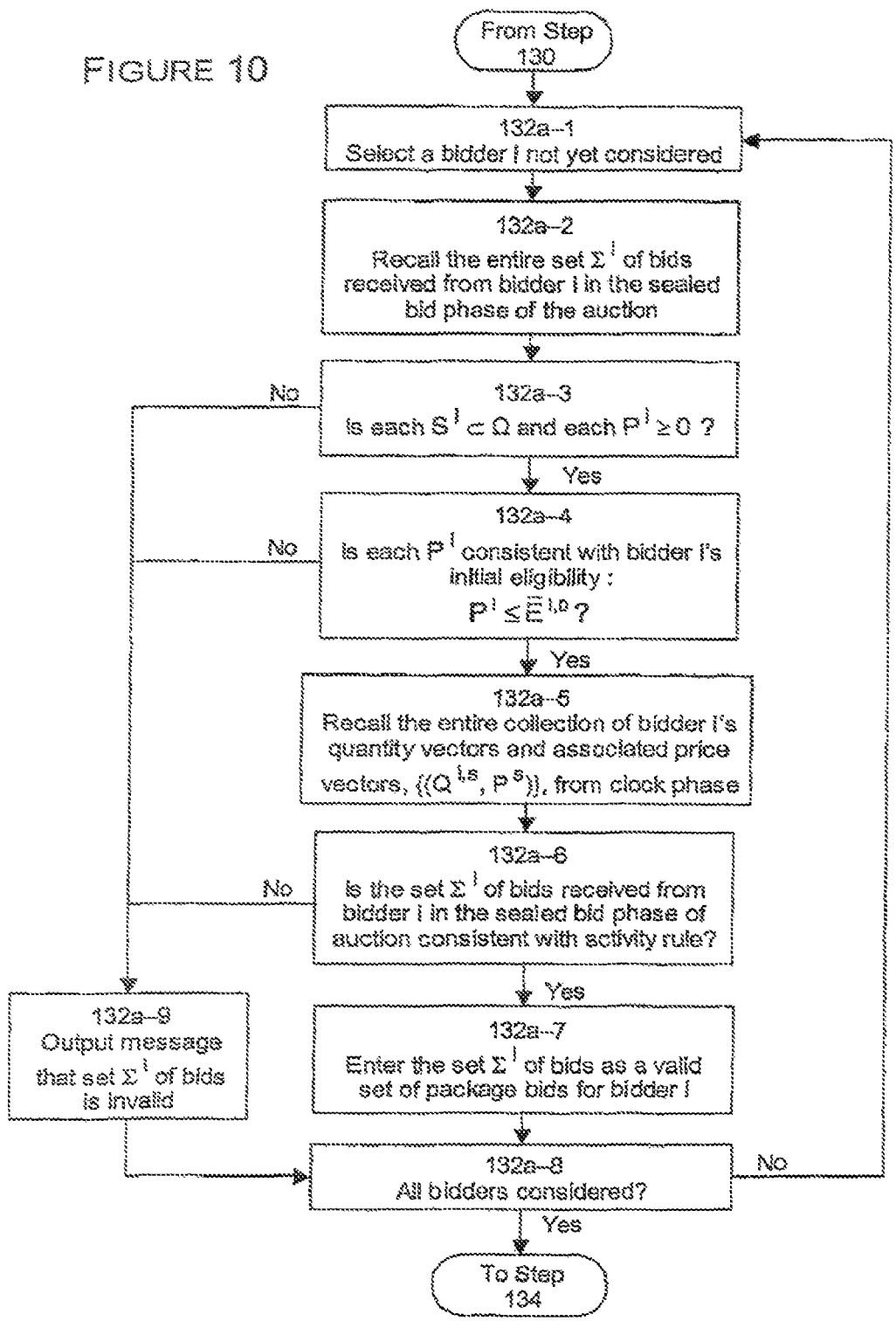
FIG. 10 is a flow diagram illustrating, in greater detail, an element of the flow diagram of FIG. 5.

FIG. 10 is a flow diagram of an exemplary subprocess of step 132 of FIG. 5. The process of FIG. 10 begins with step **132*a*-1, in which a bidder i who has not yet been considered is selected. In step 132*a*-2, a computer recalls the entire set $\Sigma^i$ of bids received from bidder i in the sealed bid phase of the auction. Each bid comprises a pair $(S^i, P^i)$, where $S^i$ identifies a set of items and $P^i$ identifies an associated price. In step 132*a*-3, it is checked whether each $S^i \subset \Omega$ and whether each $P^i \geq 0$, that is, whether each $S^i$ is a subset of the set of all items in the auction and whether each $P^i$ indicates a nonnegative associated price, in other words, whether $(S^i, P^i)$ is a valid package bid. If each $S^i \subset \Omega$ and if each $P^i \geq 0$, the process goes to step 132*a*-4. In step 132*a*-4, it is checked whether each $P^i$ is consistent with bidder i's initial eligibility, that is, whether $P^i \leq E^{i,0}$, where bidder i's initial eligibility, $E^{i,0}$, may, for example, be determined by the level of financial guarantee posted by bidder i. If each $P^i$ is consistent with bidder i's initial eligibility, the process goes to step 132*a*-5**, where the entire collection of bidder i's quantity vectors and associated price vectors, $\{(Q^{i,s}, P^s)\}$, from the earlier phase of the auction are recalled and converted into package bids. Note that $(Q^{i,s}, P^s)$ is converted into a package bid $(Q^{i,s}, \hat{P}^{i,s})$ by calculating:

$$\hat{P}^{i,s} = \sum_{k=1}^{m} P_k^s Q_k^{i,s}.$$

The difference between $P^s$ and $\hat{P}^{i,s}$ is that $\hat{P}^{i,s}$ is a scalar-valued price—as is required for a package bid—while $P^s$ is an m-dimensional vector.

The process then goes to step **132*a*-6**, where it is checked whether the set $\Sigma^i$ of bids received from bidder i in the later phase of the auction is consistent with an activity rule applied relative to the collection of bidder i's quantity vectors and associated price vectors, $\{(Q^{i,s}P^s)\}$, from the earlier phase of the auction. One simple embodiment of such an activity rule is a monotonicity rule that requires whenever $S^i$ from a bid $(S^i, P^i)$ in the later phase represents the same set of items as $Q^{i,s}$ from a bid $(Q^{i,s}, \hat{P}^{i,s})$ in the earlier phase, then $P^i \geq \hat{P}i,s$. That is, each bidder i is permitted to only bid a higher price for each package in the later phase than in the earlier phase. A more complex embodiment of such an activity rule is the relaxed revealed-preference activity rule, which checks whether the set $\Sigma^i$ of bids received from bidder i in the later phase of the auction is consistent with the constraint (RP') that was described above. Recall that revealed preference may be expressed in terms of the price for the entire package. Consider two times s and t (s<t), where s is during the earlier phase and t is during the later phase. Suppose the bidder bids for the package S at time s and T at time t. The implied price for package T at time s can be calculated by writing package T in the quantity vector notation $Q^{i,t}$ and calculating:

$$P^s(T) = \sum_{k=1}^{m} P_k^s Q_k^{i,t}.$$

The relaxed revealed-preference activity rule may be restated in terms of the price for the entire package:

$$\alpha[P^t(S)-P^s(S)] \geq P^t(T)-P^s(T), \quad \text{(RRP')}$$

where, as above, the value $\alpha$ satisfies $\alpha \geq 1$. Relaxing the activity rule ($\alpha > 1$) in the later phase of the auction allows bidders a certain amount of flexibility.

If the set $\Sigma^i$ of bids received from bidder i in the later phase of the auction is consistent with an activity rule applied relative to the collection of bidder i's quantity vectors and associated price vectors from the earlier phase of the auction, the process continues to step 132a-7, where the received set $\Sigma^i$ of bids is entered as a valid set of package bids in the later phase of the auction for bidder i. Optionally, bidder i is sent a message confirming to him that the received set $\Sigma^i$ of bids is valid. The process then continues to step 132a-8, where it is determined whether all bidders have been considered. If not, the process loops back to step 132a-1. If all bidders have been considered, the process goes to step 134 of FIG. 5.

If the set $\Sigma^i$ of bids received from bidder i in the later phase of the auction fails any of the checks at steps 132a-3, 132a-4 or 132a-6, the process instead goes to step 132a-9, where a message is outputted that the received set $\Sigma^i$ of bids is invalid. The received set $\Sigma^i$ of bids then is not entered as a valid set of package bids in the later phase of the auction for bidder i. The process then goes to step 132a-8, where it is determined whether all bidders have been considered. If not, the process loops back to step 132a-1. If all bidders have been considered, the process goes to step 134 of FIG. 5.

Winner Determination Problem

After applying constraints to the received sealed bids and entering only bids that satisfy the constraints, in many preferred embodiments of the present invention, a computer determines the allocation of items and payments of bidders. We define a winner determination problem to be a computational problem of selecting a combination of winning bids that optimizes the revenue, subject to the constraint that the selected combination of winning bids is feasible. In some preferred embodiments, a winner determination problem is solved on a computer.

In a standard auction (i.e., an auction to sell), the revenues would be maximized in a winner determination problem. In a reverse auction (i.e., a procurement auction), the revenues would be minimized in a winner determination problem. In an auction with unique items, the basic feasibility constraint in a winner determination problem is the constraint that each item can be allocated to at most one bidder. In an auction with one or more types of items and an available quantity of each type, the basic feasibility constraint in a winner determination problem is the constraint that the sum of the quantity vectors associated with the winning bids must not exceed the vector of available quantities. The latter constraint subsumes the former constraint, since an auction with m unique items can be represented as an auction with m types of items, with the available quantity being a vector of 1's.

Figure 11:
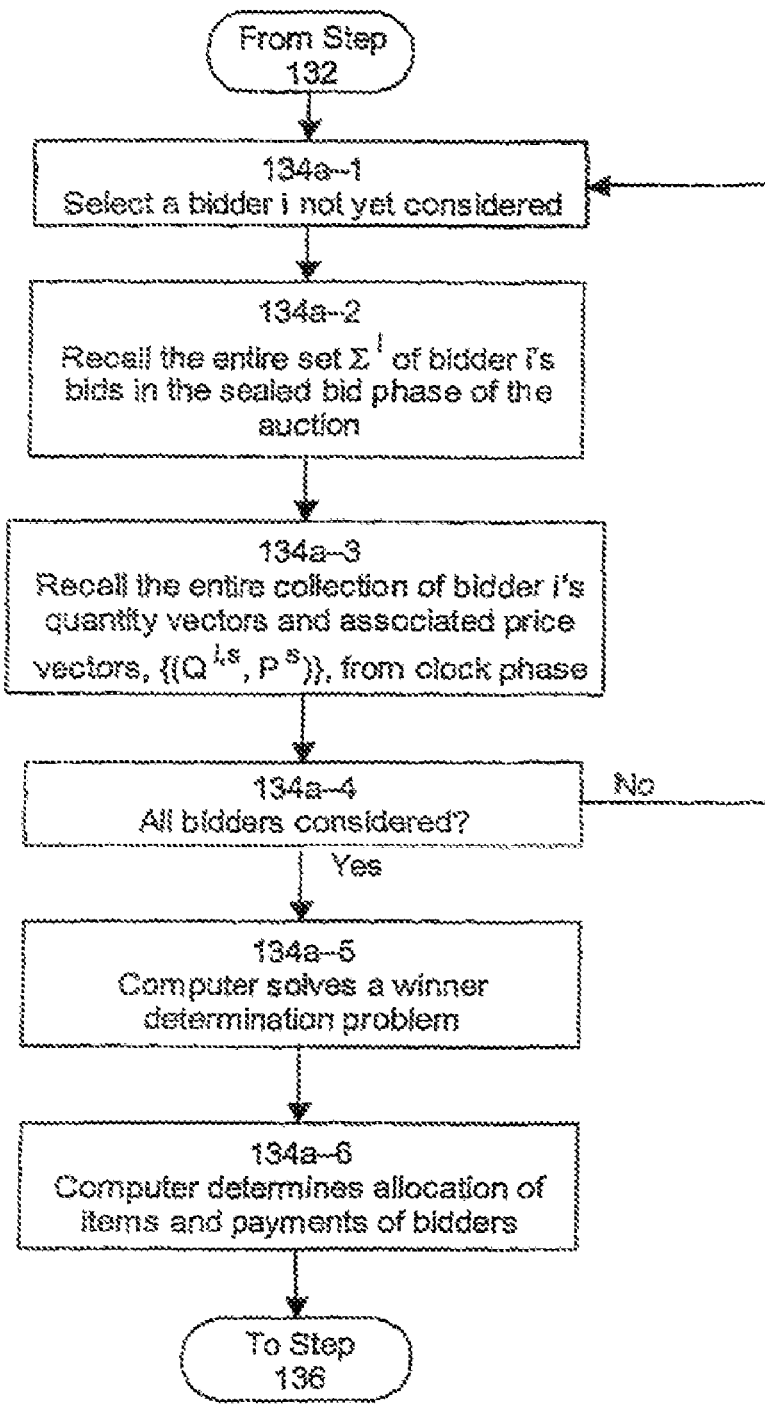
FIG. 11 is a flow diagram illustrating, in greater detail, an element of the flow diagram of FIG. 5.

FIG. 11 is a flow diagram of an exemplary subprocess of step 134 of FIG. 5, for an auction with m types of items. The process of FIG. 11 begins with step 134a-1, in which a bidder i who has not yet been considered is selected. In step 134a-2, a computer recalls the entire set $\Sigma^i$ of bids that were received from bidder i in the sealed bid phase of the auction and entered in step 132 of FIG. 5. If necessary, each bid $(S^i, P^i)$ in $\Sigma^i$ is converted into the quantity vector notation, $(Q^i, P^i)$, where $Q^i \equiv (Q_1^i, \ldots, Q_m^i)$ and $Q_k^i$ denotes the quantity of items of type k in the set $S^i$ of items. Meanwhile, $P^i$ identifies a price for the entire package identified by $Q^i$. The process continues to step 134a-3, where the entire collection of bidder i's quantity vectors and associated price vectors, $\{(Q^{i,s}, P^s)\}$, from the earlier phase of the auction are recalled and converted into package bids. Recall that $(Q^{i,s}, P^s)$ is converted into a package bid $(Q^{i,s}, \hat{P}^{i,s})$ by calculating:

$$\hat{P}^{i,s} = \sum_{k=1}^{m} P_k^s Q_k^{i,s}.$$

The process then continues to step 134a-4, where it is determined whether all bidders have been considered. If not, the process loops back to step 134a-1. If all bidders have been considered, the process goes to step 134a-5, where a computer solves a winner determination problem.

In many preferred embodiments of the present invention, all bids for bidder i in the later phase of the auction and all bids for bidder i in the earlier phase of the auction are treated as mutually exclusive. In that event, and for the case of a standard auction (i.e., an auction to sell), the winner determination problem may be stated:

Maximize $$\sum_{i=1}^{n} \tilde{P}^i$$

subject to:

At most one winning bid $(\tilde{Q}^i, \tilde{P}^i)$ is selected for each bidder i=1, ..., n;

If bidder i is a winning bidder, then $\tilde{P}^i$ is the price in his winning bid;

If bidder i is a losing bidder, then $\tilde{P}^i = 0$; and $$\sum_{i=1}^{n} \tilde{Q}_k^i \leq \overline{Q}_k$$

(the feasibility constraint).

For the case of a reverse auction (i.e., a procurement auction), the word "maximize" in the winner determination problem is replaced by "minimize".

In some other preferred embodiments of the present invention, bidder i's bids are not treated as mutually exclusive. In that event, and for the case of a standard auction (i.e., an auction to sell), the winner determination problem may be stated:

Maximize $$\sum_{i=1}^{n} \sum_{t=1}^{T_i} \tilde{P}^{it}$$

subject to:
Winning bids $(\tilde{Q}^{i1}, \tilde{P}^{i1}), \ldots, (\tilde{Q}^{iT_i}, \tilde{P}^{iT_i})$ are selected for bidder i;
If bidder i is a winning bidder, then $\tilde{P}^{it}$ are the prices in his winning bids;
If bidder i is a losing bidder, then $\tilde{P}^{it}=0$; and $$\sum_{i=1}^{n} \sum_{t=1}^{T_i} \tilde{Q}_k^{it} \leq \overline{Q}_k$$

(the feasibility constraint).
Again, for the case of a reverse auction (i.e., a procurement auction), the word "maximize" in the winner determination problem is replaced by "minimize". In many preferred embodiments in which bidder i's bids are not treated as mutually exclusive, there are nevertheless constraints on when multiple bids from bidder i are taken to be winners.

After solving a winner determination problem, the process continues to step 134a-6, where the allocation of items and payments of bidders is determined. In the above preferred embodiment in which bids were treated as mutually exclusive, it is determined that the allocation to winning bidder i is the items in the package identified by $\tilde{Q}^i$ and that the payment of winning bidder i is the price $\tilde{P}^i$. No items are assigned to a losing bidder and the payment of a losing bidder is zero. In the above preferred embodiment in which bids were not treated as mutually exclusive, it is determined that the allocation to winning bidder i is the items in the package identified by $$\sum_{t=1}^{T_i} \tilde{Q}^{it}$$

and that the payment of winning bidder i is the price $$\sum_{t=1}^{T_i} \tilde{P}^{it}.$$

No items are assigned to a losing bidder and the payment of a losing bidder is zero. After the allocation and payments have been determined, the process goes to step 136 of FIG. 5, where a computer outputs a final message, including the allocation of items and payments of bidders.

Proxy Auction as the Later Phase

Figure 12:
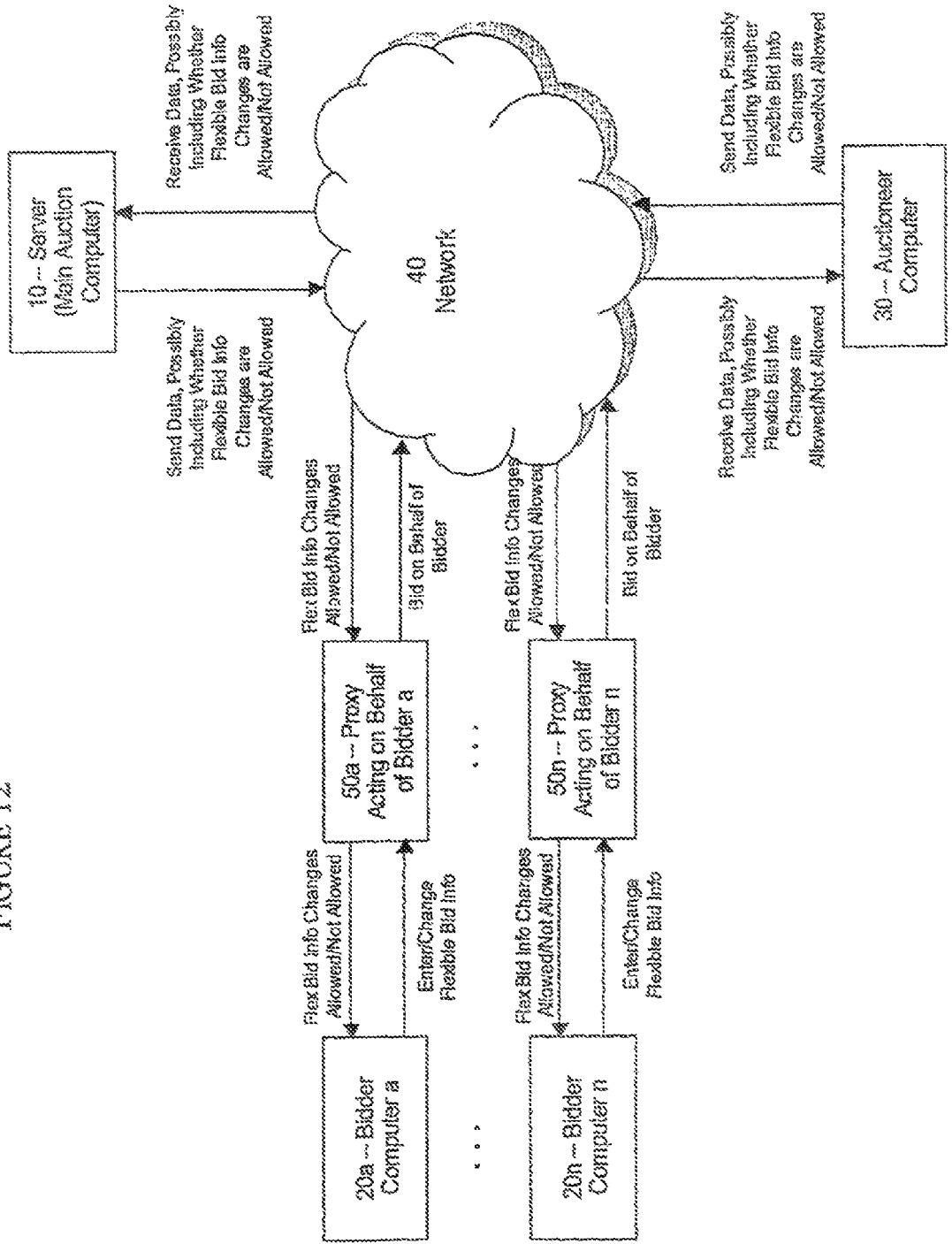
FIG. 12 is a graphical depiction of the architecture of an exemplary auction system in which bidding is intermediated by proxy agents, in accordance with an embodiment of the invention.

In many preferred embodiments of the present invention, the later phase of the hybrid auction is a proxy auction. FIG. 12 is a high-level depiction of the architecture of an exemplary auction system in which bidding is intermediated by proxy agents, and in which changes to the instructions of proxy agents may be allowed or not allowed, in accordance with an embodiment of the present invention. In the exemplary graphical depiction of FIG. 12, the computer system consists of a server and multiple user computers or terminals. User 30 (the auctioneer) communicates with server 10 (the main auction computer) over a network 40. Users 20a-n (the bidders) also communicate with server 10 over a network 40, but all communications from the respective bidders to the auction process are intermediated through the corresponding proxy agents 50a-n. The proxy agents 50a-n are subsystems of the computer system, and they may physically reside on the bidder computers or terminals 20a-n, the server or auction computer 10, or any other computer.

In FIG. 12, bidders a-n participate in the auction by entering flexible bid information or making changes in their flexible bid information at their bidder computers or BT's (20a-n). The bidders can enter or change their flexible bid information at times when the auction system is set to allow changes in the flexible bid information of the respective bidders. The actual bidding on behalf of the respective bidders is performed by the proxy agents 50a-n acting on behalf of the respective bidders. Based on the respective bidder's flexible bid information, the proxy agent may compute a bid and submit it in the auction process by transmitting it via a network interface. Meanwhile, the server 10 or auctioneer computer or AT 30 may receive submitted bids, process submitted bids, and update the auction state. This is described in greater detail elsewhere in this application. The server 10 or auctioneer computer or AT 30 may also change the setting of the auction system so as to allow or to not allow bidders to make changes to their flexible bid information. One exemplary way in which this may be done is that the server 10 will compute, according to a predetermined rule, whether flexible bid information changes should be allowed and will send out data to the proxy agents 50a-n, the bidder computers or BT's 20a-n and the auctioneer computer or AT 30 indicating whether flexible bid information changes are allowed. The proxy agents or bidder computers carry out the server's instructions on whether flexible bid information changes are allowed. Meanwhile, the auctioneer has final authority over whether flexible bid information changes are allowed, and can override the server's determination in this regard, if desired.

The "server" (or auction computer) typically has a central role, especially with regard to communications. In some preferred embodiments, the server also does all of the computations and stores all of the data. In some embodiments the "auctioneer" is a live person who sits down at the auctioneer terminal, logs in, and makes decisions which affect the conduct of the auction. Decisions that the auctioneer makes include initialization decisions necessary to initialize an auction such as setting the size of bid increments that will be used and setting the round schedules. Other decisions include determining the "final call" and calling the end of the auction (both typically based on computations and a recommendation by the server). Finally the auctioneer can make decisions in exceptional circumstances such as sending out messages to bidders and placing bids on behalf of bidders whose Internet connections have failed. Thus aside from the initialization decisions and exceptional events, the auctioneer's decisions can be no more than merely confirming recommendations of other entities. Consequently, in many embodiments, the auctions may be completely automatic, i.e., with no need for human intervention by an auctioneer.

Flow Diagram of Augmented Dynamic Package-Bidding Auction Process

In dynamic package-bidding auction processes in the prior art, a bid comprises a package of items and an associated price for the package. That is, bidders merely submit bids comprising pairs, (S, P), where $S \subset \Omega$ is a subset of the set of all items being auctioned and P is a price at which the bidder is offering to transact for the subset S. There is no scope for bidders to include other information, beyond S and P, in their bids.

Furthermore, the provisional revenues are computed simply by optimizing an objective function comprising the sum of the prices in the selected bids, subject to a selection constraint that the bids are compatible (e.g., at most one bid is selected for each item being auctioned). There is no scope for the auction computer to include, in the objective function being optimized or in the selection constraint being applied, the other information that might be explicitly included in bids. Nor is there scope for the auction computer to include, in the objective function being optimized or in the selection constraint being applied, bidder-specific attributes that might be implicitly included in bids (via the identity of the qualified bidder submitting a given bid).

The limitations in the prior art, as summarized in the previous paragraph, limit the applicability and usefulness of dynamic package-bidding auction processes. Conversely, an "augmented dynamic package-bidding auction process," in which any of the limitations summarized in the previous paragraph (or combinations thereof) are eliminated, offers a myriad of new and useful applications. An augmented dynamic package-bidding auction process is thus defined to be any dynamic auction in which package bids are allowed, which includes one or more of the following features: bidders may include other information, beyond a package of items and an associated price for the package, in their bids; the auction computer may include, in the objective function being optimized or in the selection constraint being applied, the other information that might be explicitly included in bids; and the auction computer may include, in the objective function being optimized or in the selection constraint being applied, bidder-specific attributes that might be implicitly included in bids (via the identity of the qualified bidder submitting a given bid). An augmented dynamic package-bidding auction process may yield efficient outcomes, taking the other information and bidder-specific attributes into account.

The following are some examples of the "other information" that might explicitly be included in bids, to useful effect:
  The terms of payment (e.g., cash-on-delivery versus payment in 30 days)
  The use to which the auctioned items will be put, in a government auction
  The quality of the items being provided, in a procurement auction
  The delivery times of the items being provided, in a procurement auction The following are some examples of the "bidder-specific information" that might implicitly be taken to be included in bids of qualified bidders, to useful effect:
  The length of time that the bidder has been in business
  The credit-rating of the bidder
  The location of the bidder
  The status of the bidder as a minority-owned business or a small business
  The status of the bidder as a domestic or foreign firm The following are some examples of how the "other information" or "bidder-specific information" might be included, in the objective function being optimized, to useful effect:
  A higher rating may be assigned to higher-quality items being provided
  A higher rating may be assigned to a selection of bids which includes at least two provisional winners that are minority-owned businesses or small businesses
  A higher rating may be assigned to a selection of bids for which at least 50% of each type of good is available for delivery within one week The following are some examples of how the "other information" or "bidder-specific information" might be included, in the selection constraint, to useful effect:
  A selection constraint may be applied that at least one-third of each type of good be provided by an alternate supplier (second-sourcing)
  A selection constraint may be applied requiring that at least two provisional winners be minority-owned businesses or small businesses
  A selection constraint may be applied requiring that at least 50% of each type of good be available for delivery within one week An augmented dynamic package-bidding auction process may be implemented on a computer in a system with mandatory proxy bidding, according to FIG. 13.

Flow Diagram of Proxy Auction Phase

FIG. 13 is a flow diagram of the later phase of an auction in accordance with an embodiment of the present invention: a proxy auction, in which it is mandatory that bidding be intermediated by proxy agents. As such, it provides an illustration of step 108 of FIG. 4. The process starts with step 142, in which memory locations of a computer are initialized. In one preferred embodiment, the appropriate memory locations of the auction server are initialized with information such as the items in the auction, the auction schedule, the minimum opening bids or reserve prices, a list of bidder ID's, a list of passwords, a list of constraints on bids, and a list of the bids of each bidder from the clock auction phase. These were carried forward in step 106 of FIG. 4, for use in the proxy auction phase. In step 144, a computer outputs the current auction information (if any) available to bidders, possibly including, for example, the minimum opening bids or current high bids, and whether one or more bidders have been given a "last call" for making changes to their flexible bid information. In one preferred embodiment, the auction server outputs the auction information through its network interface and transmits it via the network. The user computers or terminals then receive the auction information through their network interfaces and display the information to bidders and the auctioneer through their user interfaces. In step 146, changes to the flexible bid information for given bidders are entered into computer databases or memory, provided that changes are permitted for the respective bidders (and provided that the bidders wish to make changes to their flexible bid information). This step is illustrated in greater detail in FIGS. 14a and 14b. In one preferred embodiment, a bidder inputs his (or her) flexible bid information through the user interface of the bidder computer or terminal, which then (if necessary) outputs the auction information through its network interface and transmits it via the network. The proxy agent corresponding to that bidder (if located on another computer) then receives the flexible bid information through its network interface for use in the next step. In step 148, the proxy agents compute new bids, based on the flexible bid information and the current auction information, to submit on behalf of their respective bidders, and the proxy agents submit new bids (if any) in the auction process on behalf of their respective bidders. This step is illustrated in greater detail in FIGS. 15a and 15b. In many preferred embodiments, bids comprise pairs (S,P), where $S \subset \Omega$ is a subset of the set of all items being auctioned and P is a price at which the bidder is offering to transact for the subset S. Stated differently, a bid comprises a package of items and an associated price for the package. As already defined above, such a bid comprising a pair, (S, P), is defined to be a "package bid." In one preferred embodiment, the proxy agents reside on the auction server, so that they can submit new package bids without making use of the network.

In a second preferred embodiment, the proxy agents reside on the bidder computers or terminals, in which case the bidder computers or terminals output the submitted new bids through their network interfaces and transmit them via the network. The auction server then receives the submitted new bids through its network interface for use in the next step. In step 150, a computer applies constraints, if any, to the new bids submitted by the proxy agents, and enters only those bids that satisfy said constraints. In one preferred embodiment, the constraints are applied at the auction server, although they may also easily be applied at the bidder computers or terminals, or at other computers.

In step 152, a computer calculates the provisionally-winning bids and provisional revenues, based on the new bids entered and the previous bids that remain "in effect" (i.e., the previous bids that remain active, or remain subject to being selected as winning bids). In one preferred embodiment, the previous bids that remain "in effect" include all of the bids of each bidder from the clock auction phase. In this preferred embodiment, all bids take the form of package bids, all bids that are entered at any time during the auction remain in effect for the duration of the auction, and all bids that are entered on behalf of a given bidder are treated as being mutually exclusive. Therefore, in this preferred embodiment, a computer (which may be the auction server or some other computer) calculates a solution to the following problem of optimizing bid revenues over compatible bids:

Find an n-tuple, $\{(S_1,P_1), \ldots, (S_n,P_n)\}$ of bids, one from each bidder i (i=1, ..., n), which maximizes the sum $P_1 + \ldots + P_n$, subject to the constraint that the $S_i$ are disjoint subsets of $\Omega$. Stated differently, for every i (i=1, ..., n) and for every j≠i (j=1, ..., n), it is required that $(S_i,P_i)$ be a new or previous bid entered by or on behalf of bidder i, $(S_j,P_j)$ be a new or previous bid entered by or on behalf of bidder j, and $S_i \cap S_j = \emptyset$, i.e. no item of set $S_i$ is a member of the set $S_j$ if i≠j.

In performing the above calculation, the computer may take as implicit the existence of a zero bid, i.e. the pair $(\emptyset,0)$, associated with each bidder. The calculated n-tuple, $\{(S_1, P_1), \ldots, (S_n,P_n)\}$, of bids solving the above optimization problem is defined to be the provisionally-winning bids; and the calculated sum $P_1 + \ldots + P_n$ is defined to be the provisional revenues. However, in other preferred embodiments: (a) only some of the bids that were previously entered into the auction remain in effect for subsequent calculations of the provisionally-winning bids; (b) not all bids that are entered on behalf of a given bidder are treated as being mutually exclusive, so that the optimization problem may allow two or more bids by a single bidder to be selected; and (c) the auction may be an auction to buy, a procurement auction or a reverse auction (rather than an auction to sell), so that the optimization problem for calculating provisionally-winning bids may involve the minimization of payments associated with selected bids, or some other optimization problem, rather than the maximization problem stated above. Also, in many preferred embodiments, a computer stores the calculated provisionally-winning bids and provisional revenues in memory or on a data storage device for future use. In step 154, a computer determines whether the auction should continue. One exemplary way to perform step 154 is for the auction server to compare the current provisional revenues with a function of the provisional revenues obtained in previous iteration(s) of the loop, and to continue the auction if and only if the current provisional revenues exceed the function of the provisional revenues obtained in previous iteration(s). However, this particular stopping rule is only exemplary, and many other embodiments are also possible: for example, the rule applied may be different, it may be performed on a different computer, and the computer may only produce a recommendation of stopping the auction which is then transmitted to the auctioneer computer or terminal for final approval.

If the auction should continue, the process goes to step 156, where it is determined whether one or more bidders should be given a "last call" to change their flexible bid information. The auction server recommends a decision on whether bidders should be given a "last call" and transmits this recommendation via the network to the auctioneer computer or terminal. The auctioneer computer or terminal then receives the recommendation through its network interface and displays it to the auctioneer through its user interface. The auctioneer either approves or modifies the recommendation through the user interface of the auctioneer terminal, which then outputs the final decision through its network interface and transmits it via the network. The auction server then receives the final decision through its network interface for use in subsequent steps. The process then goes to step 158, in which the state of the auction system and the current auction information are updated. In one preferred embodiment, the auction server: adds the newly-submitted bids that were entered in step 150 to the list of previous bids that remain in effect; replaces the previous provisionally-winning bids with the provisionally-winning bids that were calculated in the most recent execution of step 152; and replaces the previous provisional revenues with the provisional revenues that were calculated in the most recent execution of step 152. In a second preferred embodiment, the auction server additionally deletes some of the bids from the list of previous bids that remain in effect, in order to reduce the size of the problem that the computer will face at the next iteration of step 152. The process then loops to step 144.

If the auction should not continue, the process goes to step 160, in which a computer outputs a final message, including the allocation of items among bidders and the payments of the bidders. In one preferred embodiment, the auction server recalls its calculation of the provisionally-winning bids at the most recent execution of step 152 and outputs this in a final message as the determined allocation of items among bidders and the payments of the bidders. The auction server outputs this final message through its network interface and transmits it via the network. The bidder and auctioneer computers or terminals then receive the final message through their network interfaces and display the information to bidders and the auctioneer through their user interfaces. The process then ends.

Detail Elements Concerning Bidders Changing Flexible Bid Information

Figure 14A:
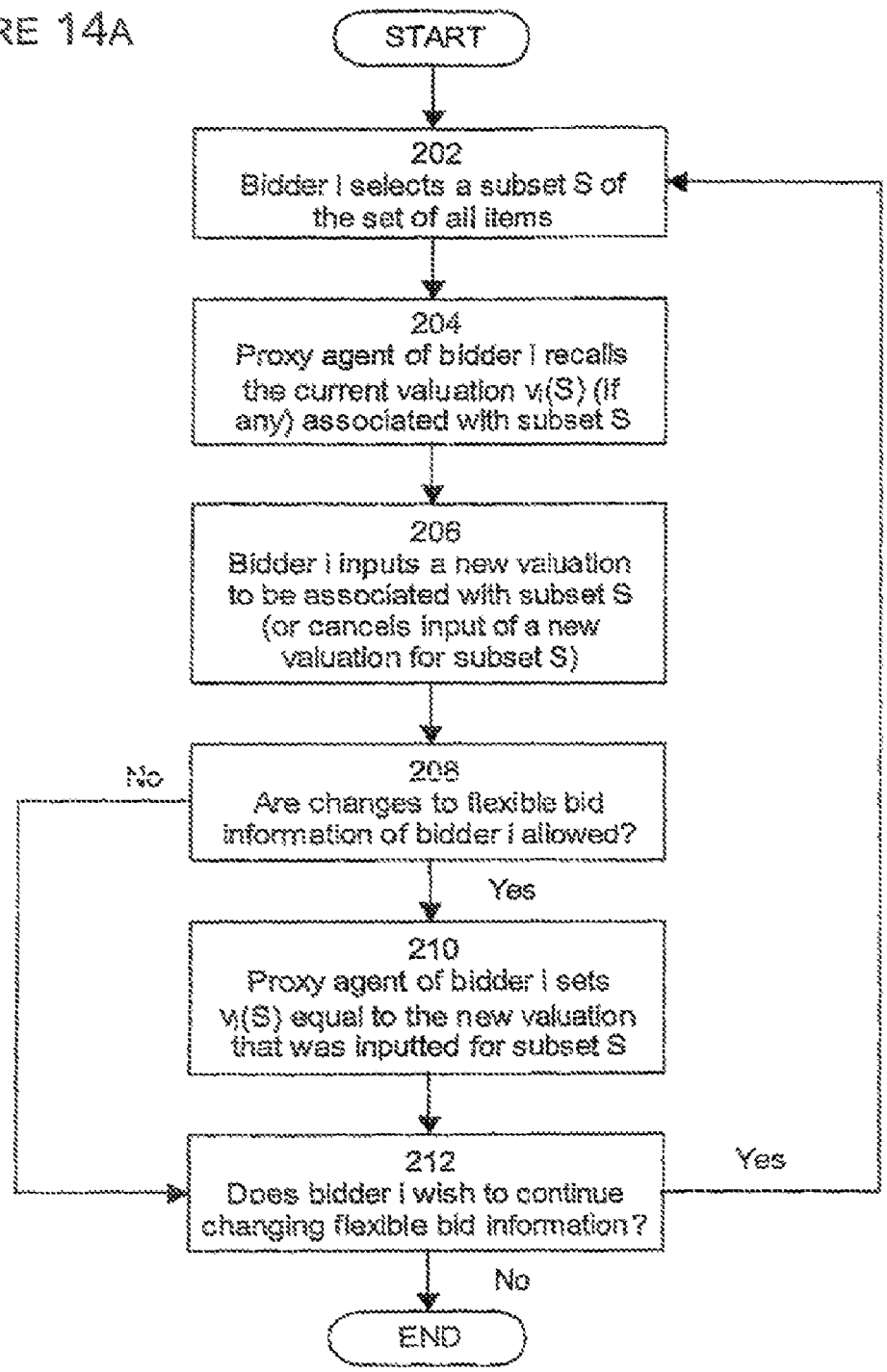

FIG. 14*a* is a flow diagram illustrating an exemplary process by which a bidder may enter flexible bid information into a computer database or change existing flexible bid information. Thus, FIG. 14*a* illustrates, in greater detail, step 146 of FIG. 13. The flexible bid information of FIG. 14*a* concerns the bidder's valuations for various items in the auction.

The process starts with step 202, in which bidder i selects a subset $S \subset \Omega$ of the set of all items being auctioned. In one preferred embodiment, bidder i enters his (or her) selection of subset S through the user interface of his bidder computer or terminal, which then (if necessary) outputs his selection through its network interface and transmits it via the network. The proxy agent of bidder i (if located on another computer) then receives the selection of subset S through its network interface for use in the next step. In step 204, the proxy agent of bidder i recalls the current valuation, $v_i(S)$ (if any), currently associated with subset S. In one preferred embodiment, the proxy agent of bidder i queries its database to obtain the current valuation $v_i(S)$, and then (if necessary) outputs the current valuation $v_i(S)$ through its network interface and transmits it via the network. The bidder computer or terminal of bidder i then receives the current valuation $v_i(S)$ through its network interface (if the proxy agent is located on a different computer) and displays it on its user interface. In step 206, bidder i inputs a new valuation to be associated with subset S (or cancels input of a new valuation for subset S). As before, in one preferred embodiment, bidder i enters the new valuation through the user interface of his bidder computer or terminal, which then (if necessary) outputs the new valuation through its network interface and transmits it via the network. The proxy agent of bidder i (if located on another computer) then receives the new valuation through its network interface for use in the following steps. In step 208, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 210, where the proxy agent of bidder i sets $v_i(S)$ equal to the new valuation that was inputted for subset S in step 206. If changes to the flexible bid information are not allowed, or following step 210, the process goes to step 212, in which it is determined whether bidder i wishes to continue changing his flexible bid information. In one preferred embodiment, the bidder computer or terminal of bidder i displays this as a question through its user interface, bidder i responds to this question through its user interface, and bidder i's response is transmitted to any other components of the system requiring his response through the network. If bidder i wishes to continue changing his flexible bid information, the process loops back to step 202; otherwise, the process ends.

FIG. 14b is a flow diagram illustrating another exemplary process by which a bidder may enter flexible bid information into a computer database or change his existing flexible bid information. Thus, FIG. 14b illustrates, in greater detail, step 146 of FIG. 13. The flexible bid information of FIG. 14b may concern the bidder's valuations for various items in the auction or may concern a budget limit or parameter.

The process starts with step 252, in which bidder i indicates whether he wishes to change his valuation of a subset, or whether he wishes to change his budget limit or parameter. If bidder wishes to change his flexible bid information for a valuation of a subset, then the process goes to step 254, in which bidder i selects a subset $S \subset \Omega$ of the set of all items being auctioned. In one preferred embodiment, bidder i enters his selection of subset S through the user interface of his bidder computer or terminal, which then (if necessary) outputs his selection through its network interface and transmits it via the network. The proxy agent of bidder i (if located on another computer) then receives the selection of subset S through its network interface for use in the next step. In step 256, the proxy agent of bidder i recalls the current valuation, $v_i(S)$ (if any), currently associated with subset S. In one preferred embodiment, the proxy agent of bidder i queries its database to obtain the current valuation $v_i(S)$, and then (if necessary) outputs the current valuation $v_i(S)$ through its network interface and transmits it via the network. The bidder computer or terminal of bidder i then receives the current valuation $v_i(S)$ through its network interface (if the proxy agent is located on a different computer) and displays it on its user interface. In step 258, bidder i inputs a new valuation to be associated with subset S (or cancels input of a new valuation for subset S). As before, in one preferred embodiment, bidder i enters the new valuation through the user interface of his bidder computer or terminal, which then (if necessary) outputs the new valuation through its network interface and transmits it via the network. The proxy agent of bidder i (if located on another computer) then receives the new valuation through its network interface for use in the following steps. In step 260, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 262, where the proxy agent of bidder i sets $v_i(S)$ equal to the new valuation that was inputted for subset S in step 258. If changes to the flexible bid information are not allowed, or following step 262, the process goes to step 272.

If bidder i wishes to change his flexible bid information for a budget limit or parameter, then the process goes to step 264, in which the proxy agent of bidder i recalls the current budget limit or parameter. In one preferred embodiment, the proxy agent of bidder i queries its database to obtain the current budget limit or parameter, and then (if necessary) outputs the current budget limit or parameter through its network interface and transmits it via the network. The bidder computer or terminal of bidder i then receives the current budget limit or parameter through its network interface (if the proxy agent is located on a different computer) and displays it on its user interface. In step 266, bidder i inputs a new budget limit or parameter (or cancels input of a new budget limit or parameter). In one preferred embodiment, bidder i enters the new budget limit or parameter through the user interface of his bidder computer or terminal, which then (if necessary) outputs the new budget limit or parameter through its network interface and transmits it via the network. The proxy agent of bidder i (if located on another computer) then receives the new budget limit or parameter through its network interface for use in the following steps. In step 268, a computer determines whether changes to the flexible bid information of bidder i are allowed. In one preferred embodiment, the proxy agent of bidder i merely refers to a variable located in the memory of the same computer on which the proxy agent of bidder i resides. If this variable equals one, then changes to the flexible bid information of bidder i are allowed; and if this variable equals zero, then changes to the flexible bid information of bidder i are not allowed. If changes to the flexible bid information of bidder i are allowed, the process continues with step 270, where the proxy agent of bidder i sets the budget limit or parameter equal to the new value that was inputted in step 266. If changes to the flexible bid information are not allowed, or following step 270, the process goes to step 272.

In step 272, it is determined whether bidder i wishes to continue changing his flexible bid information. In one preferred embodiment, the bidder computer or terminal of bidder i displays this as a question through its user interface, bidder i responds to this question through its user interface, and bidder i's response is transmitted to any other components of the system requiring his response through the network. If bidder i wishes to continue changing his flexible bid information, the process loops back to step 252; otherwise, the process ends.

Detail Elements Concerning Bid Submission by Proxy Agents

Figure 15A:
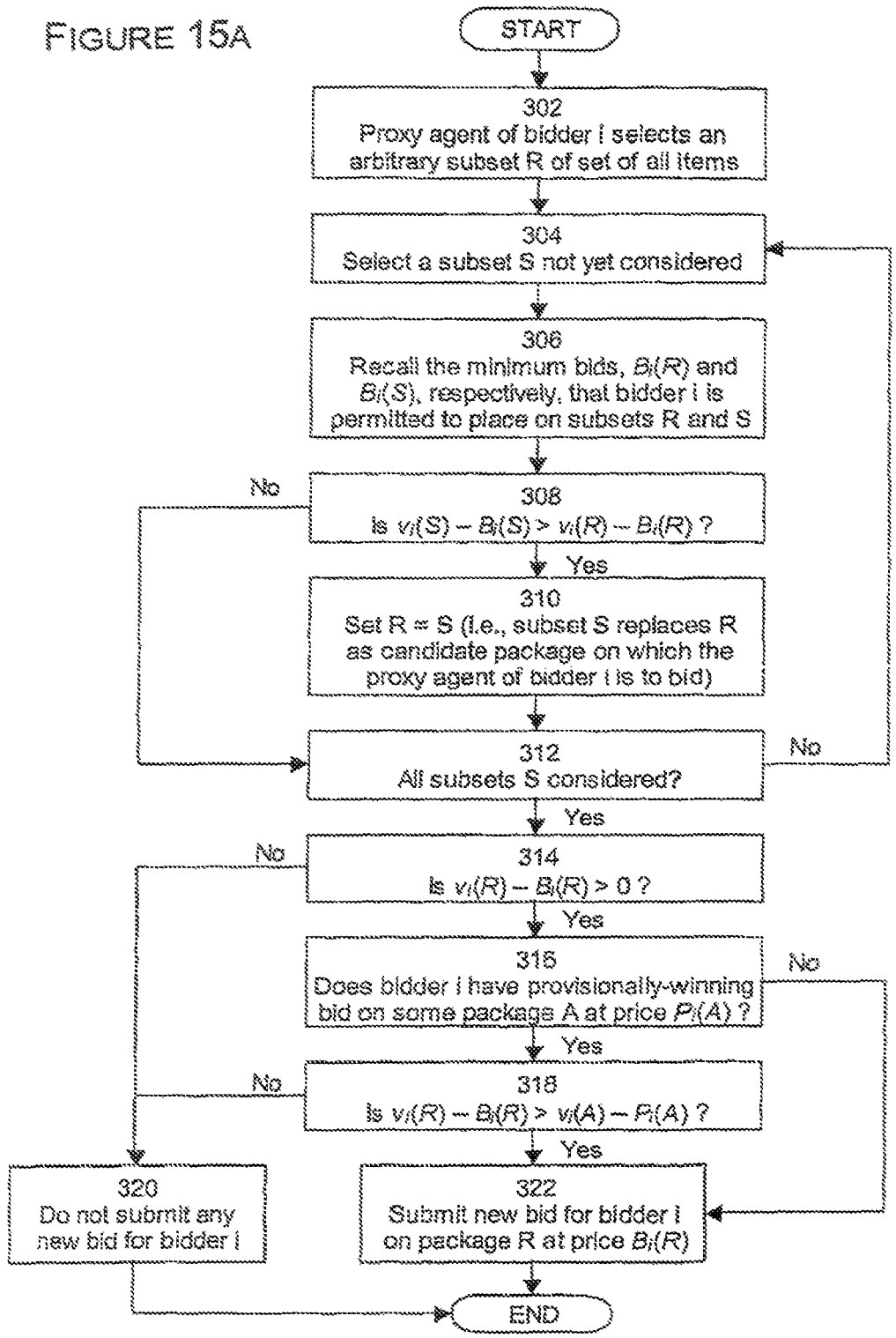

FIG. 15a is a flow diagram illustrating an exemplary process by which a proxy agent may submit new bids based on a bidder's flexible bid information and the current auction information. Thus, FIG. 15a illustrates, in greater detail, step 148 of FIG. 13. The flexible bid information of FIG. 15a concerns the bidder's valuations for various items in the auction.

The process starts with step 302, in which the proxy agent of bidder i selects an arbitrary subset $R \subset \Omega$ of the set of all items being auctioned. Subset R is treated as the candidate package on which bidder i is to bid (until a better subset is found). The process goes to step 304, in which the proxy agent of bidder i selects a subset $S \subset \Omega$ that has not yet been considered. At step 306, the proxy agent recalls the minimum bids, $B_i(R)$ and $B_i(S)$, that bidder i is permitted to place on subsets R and S, respectively. In one preferred embodiment, the proxy agent of bidder i queries a database as to the values of $B_i(R)$ and $B_i(S)$. (If the proxy agent of bidder i and the database containing the values of $B_i(R)$ and $B_i(S)$ are located on different computers, then this communication occurs through the network interfaces of the respective computers and via the network.) In another preferred embodiment, the proxy agent of bidder i outputs the query through the network interface of the computer on which it is located and transmits the query via the network. The auction server then receives the query through its network interface (if located on another computer). The auction server then determines the values of $B_i(R)$ and $B_i(S)$ by calculations on data in the state of the auction system. The auction server then outputs the values of $B_i(R)$ and $B_i(S)$ through its network interface and transmits them via the network (if necessary). The proxy agent of bidder i then receives the values of $B_i(R)$ and $B_i(S)$ through the network interface of the computer on which it is located (if the proxy agent is located on a different computer), making it available for later steps. One exemplary calculation for determining the values of $B_i(R)$ and $B_i(S)$ is for the auction server to take the previous high prices bid for R and S and to multiply each by a positive constant. A second exemplary calculation for determining the value of $B_i(R)$ is for the auction server to solve the following problem: what is the minimum bid (R, P) that could be submitted by bidder i such that, if provisionally-winning bids were calculated (see step 152 or 164, above) with the extra bid (R, P) included, then (R, P) would be a provisionally-winning bid? (An analogous calculation would then determine $B_i(S)$.) The process then goes to step 308, in which a computer determines whether $v_i(S)-B_i(S)>v_i(R)-B_i(R)$. In one preferred embodiment, the proxy agent of bidder i merely refers to variables $v_i(R)$ and $v_i(S)$, located in the memory of the same computer on which the proxy agent of bidder i resides, and performs this determination. If $v_i(S)-B_i(S)>v_i(R)-B_i(R)$, then the process goes to step 310, where a computer sets R=S (i.e., subset S replaces subset R as the candidate package on which the proxy agent of bidder i is to bid). If $v_i(S)-B_i(S) \leq v_i(R)-B_i(R)$, or after step 310, the process continues to step 312, in which a computer determines whether all subsets $S \subset \Omega$ have been considered. If not all subsets $S \subset \Omega$ have been considered, the process loops back to step 304.

If all subsets $S \subset \Omega$ have been considered, the process goes to step 314, in which a computer determines whether $v_i(R)-B_i(R)>0$, that is, whether bidder i would receive positive surplus from a winning bid of (R, $B_i(R)$). If $v_i(R)-B_i(R)$ is determined not to be greater than zero, the process jumps to step 320, in which the proxy agent does not place any new bids on behalf of bidder i, and the process ends. If $v_i(R)-B_i(R)$ is determined to be greater than zero, the process continues to step 316, in which the proxy agent of bidder i determines whether bidder i currently has a provisionally-winning bid on some package A at price $P_i(A)$. In one preferred embodiment, the proxy agent of bidder i merely refers to variables, representing the current provisionally-winning bids of bidder i, located in the memory of the same computer on which the proxy agent of bidder i resides, and performs this determination. If bidder i does not currently have a provisionally-winning bid, the process skips to step 322. If bidder i does currently have a provisionally-winning bid on some package A at price $P_i(A)$, the process goes to step 318, in which a computer determines whether $v_i(R)-B_i(R)>v_i(A)-P_i(A)$, that is, whether bidder i would receive greater positive surplus from a winning bid of (R, $B_i(R)$) than from a winning bid of (A, $P_i(A)$). If $v_i(R)-B_i(R)$ is determined not to be greater than $v_i(A)-P_i(A)$, the process continues to step 320, in which the proxy agent does not place any new bids on behalf of bidder i, and the process ends. If $v_i(R)-B_i(R)$ is determined to be greater than $v_i(A)-P_i(A)$, the process continues to step 322.

At step 322, the proxy agent submits a new bid on behalf of bidder i for package R at price $B_i(R)$. In one preferred embodiment, the proxy agent of bidder i outputs the bid (R, $B_i(R)$) through the network interface of the computer on which it is located and transmits the submitted bid via the network. The auction server then receives the submitted bid through its network interface (if located on another computer), and utilizes the submitted bid in subsequent steps (for example, step 150 or step 162). After step 322, the process ends.

In another embodiment of the present invention, FIG. 15a may be modified so that the proxy agent of bidder i submits two or more new bids, if bidder i would be indifferent among these bids. Step 308 would be expanded so that a computer determines whether $v_i(S)-B_i(S)=v_i(R)-B_i(R)$. In that event, step 310 would maintain both R and S as candidate packages on which the proxy agent of bidder i is to bid, and step 322 would have the proxy agent submit bids both of (R, $B_i(R)$) and (S, $B_i(S)$).

In other embodiments of the present invention, FIG. 15a is easily modified so that the proxy agent of bidder i bids on behalf of bidder i in a reverse auction or procurement auction. In one such embodiment, Step 306 is modified so that the bids, $B_i(R)$ and $B_i(S)$, are maximum bids that bidder i is permitted to place on subsets R and S, respectively. Step 308 is modified so that a computer determines whether $B_i(S)-v_i(S)>B_i(R)-v_i(R)$, since $B_i(R)$ and $B_i(S)$ now represent payments that the bidder is willing to accept, while $v_i(R)$ and $v_i(S)$ now represent costs of the bidder. Step 314 is modified so that a computer determines whether $B_i(R)-v_i(R)>0$, since this now determines whether bidder i would receive positive surplus from a winning bid of (R, $B_i(R)$). Step 318 is modified so that a computer determines whether $B_i(R)-v_i(R)>B_i(A)-v_i(A)$, since this now determines whether bidder i would receive greater positive surplus from a winning bid of (R, $B_i(R)$) than from a winning bid of (A, $P_i(A)$).

FIG. 15b is a flow diagram illustrating another exemplary process by which a proxy agent may submit new bids based on a bidder's flexible bid information and the current auction information. Thus, FIG. 15b illustrates, in greater detail, step 148 of FIG. 13. The flexible bid information of FIG. 15b concerns the bidder's valuations for various items in the auction and a budget limit or parameter.

The process starts with step 352, in which the proxy agent of bidder i selects a subset $R \subset \Omega$ of the set of all items being auctioned such that the minimum bid, $B_i(R)$, that bidder i is permitted to place on subset R is less than or equal to the budget limit or parameter of bidder i. (The proxy agent of bidder i recalls the minimum bid for subset R in the same way as described in step 306 above. If no subset R exists such that the minimum bid, $B_i(R)$, is within bidder i's budget limit or parameter, then the process jumps all the way to step 372 and does not submit any new bid for bidder i.) Subset R is treated as the candidate package on which bidder i is to bid (until a better subset is found). The process goes to step 354, in which the proxy agent of bidder i selects a subset $S \subset \Omega$ that has not yet been considered. At step 356, the proxy agent recalls the minimum bids, $B_i(R)$ and $B_i(S)$, that bidder i is permitted to place on subsets R and S, respectively. In one preferred embodiment, the proxy agent of bidder i queries a database as to the values of $B_i(R)$ and $B_i(S)$. (If the proxy agent of bidder i and the database containing the values of $B_i(R)$ and $B_i(S)$ are located on different computers, then this communication occurs through the network interfaces of the respective computers and via the network.) In another preferred embodiment, the proxy agent of bidder i outputs the query through the network interface of the computer on which it is located and transmits the query via the network. The auction server then receives the query through its network interface (if located on another computer). The auction server then determines the values of $B_i(R)$ and $B_i(S)$ by calculations on data in the state of the auction system. The auction server then outputs the values of $B_i(R)$ and $B_i(S)$ through its network interface and transmits them via the network (if necessary). The proxy agent of bidder i then receives the values of $B_i(R)$ and $B_i(S)$ through the network interface of the computer on which it is located (if the proxy agent is located on a different computer), making it available for later steps. One exemplary calculation for determining the values of $B_i(R)$ and $B_i(S)$ is for the auction server to take the previous high prices bid for R and S and to multiply each by a positive constant. A second exemplary calculation for determining the value of $B_i(R)$ is for the auction server to solve the following problem: what is the minimum bid (R, P) that could be submitted by bidder i such that, if provisionally-winning bids were calculated (see step 152 or 164, above) with the extra bid (R, P) included, then (R, P) would be a provisionally-winning bid? (An analogous calculation would then determine $B_i(S)$.)

The process then goes to step 358, in which a computer determines whether $B_i(S)$ is less than or equal to the budget limit or parameter of bidder i. If $B_i(S)$ is greater than bidder i's budget limit or parameter, then the process skips to step 364. If $B_i(S)$ is less than or equal to bidder i's budget limit or parameter, then the process continues to step 360, where a computer determines whether $v_i(S)-B_i(S)>v_i(R)-B_i(R)$. In one preferred embodiment, the proxy agent of bidder i merely refers to variables $v_i(R)$ and $v_i(S)$, located in the memory of the same computer on which the proxy agent of bidder i resides, and performs this determination. If $v_i(S)-B_i(S)$ $v_i(R)-B_i(R)$, then the process skips to step 364. If $v_i(S)-B_i(S)>v_i(R)-B_i(R)$, then the process continues with step 362, where a computer sets R=S (i.e., subset S replaces subset R as the candidate package on which the proxy agent of bidder i is to bid), and then proceeds to step 364. At step 364, a computer determines whether all subsets $S \subset \Omega$ have been considered. If not all subsets $S \subset \Omega$ have been considered, the process loops back to step 354.

If all subsets $S \subset \Omega$ have been considered, the process goes to step 366, in which a computer determines whether $v_i(R)-B_i(R)>0$, that is, whether bidder i would receive positive surplus from a winning bid of (R, $B_i(R)$). If $v_i(R)-B_i(R)$ is determined not to be greater than zero, the process jumps to step 372, in which the proxy agent does not place any new bids on behalf of bidder i, and the process ends. If $v_i(R)-B_i(R)$ is determined to be greater than zero, the process continues to step 368, in which the proxy agent of bidder i determines whether bidder i currently has a provisionally-winning bid on some package A at price $P_i(A)$. In one preferred embodiment, the proxy agent of bidder i merely refers to variables, representing the current provisionally-winning bids of bidder i, located in the memory of the same computer on which the proxy agent of bidder i resides, and performs this determination. If bidder i does not currently have a provisionally-winning bid, the process skips to step 374. If bidder i does currently have a provisionally-winning bid on some package A at price $P_i(A)$, the process goes to step 370, in which a computer determines whether $v_i(R)-B_i(R)>v_i(A)-P_i(A)$, that is, whether bidder i would receive greater positive surplus from a winning bid of (R, $B_i(R)$) than from a winning bid of (A, $P_i(A)$). If $v_i(R)-B_i(R)$ is determined not to be greater than $v_i(A)-P_i(A)$, the process continues to step 372, in which the proxy agent does not place any new bids on behalf of bidder i, and the process ends. If $v_i(R)-B_i(R)$ is determined to be greater than $v_i(A)-P_i(A)$, the process continues to step 374.

At step 374, the proxy agent submits a new bid on behalf of bidder i for package R at price $B_i(R)$. In one preferred embodiment, the proxy agent of bidder i outputs the bid (R, $B_i(R)$) through the network interface of the computer on which it is located and transmits the submitted bid via the network. The auction server then receives the submitted bid through its network interface (if located on another computer), and utilizes the submitted bid in subsequent steps (for example, step 150 or step 162). After step 374, the process ends.

In another embodiment of the present invention, FIG. 15b may be modified so that the proxy agent of bidder i submits two or more new bids, if bidder i would be indifferent among these bids. Step 360 would be expanded so that a computer determines whether $v_i(S)-B_i(S)=v_i(R)-B_i(R)$. In that event, step 362 would maintain both R and S as candidate packages on which the proxy agent of bidder i is to bid, and step 374 would have the proxy agent submit bids both of (R, $B_i(R)$) and (S, $B_i(S)$).

Core Outcomes and Bidder-Optimal Core Outcomes

It can be shown that outcomes of particular proxy auctions are elements of the "core", relative to the submitted bids, and Nash equilibrium outcomes of particular proxy auction games are "bidder-optimal core outcomes". We begin by defining these terms.

We define the coalitional game (L,w) that is associated with the trading model. The set of players is $L=\{0, 1, \ldots, n\}$, with player 0 being the seller and players $1, \ldots, n$ being the bidders. The set of feasible allocations is X, for example, $$X = \left\{ (Q^i)_{i=1}^n : Q^i \geq 0 \text{ and } \sum_{i=1}^n Q^i \leq \overline{Q} \right\}.$$

The coalitional value function is defined for coalitions $S \subset L$ as follows:

$$w(S) = \begin{cases} \max_{Q \in X} \sum_{i \in S} v^i(Q^i), & \text{if } 0 \in S, \\ 0, & \text{if } 0 \notin S. \end{cases}$$

In this notation, if bidder i submitted the bid $(Q^i, P^i)$ in the proxy auction, then $v^i(Q^i)=P^i$. The value of a coalition is the maximum total value that the players can create by trading among themselves. If the seller is not included in the coalition, that value is zero.

The core of a game with player set L and coalitional value function w( ) is defined as follows:

$$\text{Core}(L, w) = \left\{ \pi : w(L) = \sum_{i \in L} \pi^i, w(S) \le \sum_{i \in S} \pi^i \text{ for all } S \subset L \right\}.$$

Thus, the core is the set of profit allocations that are feasible for the coalition of the whole and unblocked by any coalition.

A payoff vector in the core is bidder optimal if there is no other core allocation that all bidders prefer. More precisely, let $\pi \in \text{Core}(L,w)$. We say that $\pi$ is bidder optimal in the core if there is no $\hat{\pi} \in \text{Core}(L,w)$ with $\hat{\pi} \ne \pi$ and $\hat{\pi}^i \ge \pi^i$ for every bidder i=1, ..., m.

The above definition of the core assumes "transferable utility", i.e., bidders have quasilinear utility. In the event that utility is non-transferable, we should instead use the non-transferable-utility (NTU) core. An allocation Q is in the NTU core if: (1) it is feasible, (2) it is individually rational for each bidder and for the seller, and (3) there exists no coalition S and allocation $\hat{Q}$ feasible for coalition S such that $\hat{Q}$ is strictly preferred to Q for all players i in coalition S. It can also be shown that, in situations where utility is non-transferable, outcomes of particular proxy auctions are elements of the NTU core, relative to the submitted bids.

Figure 16:
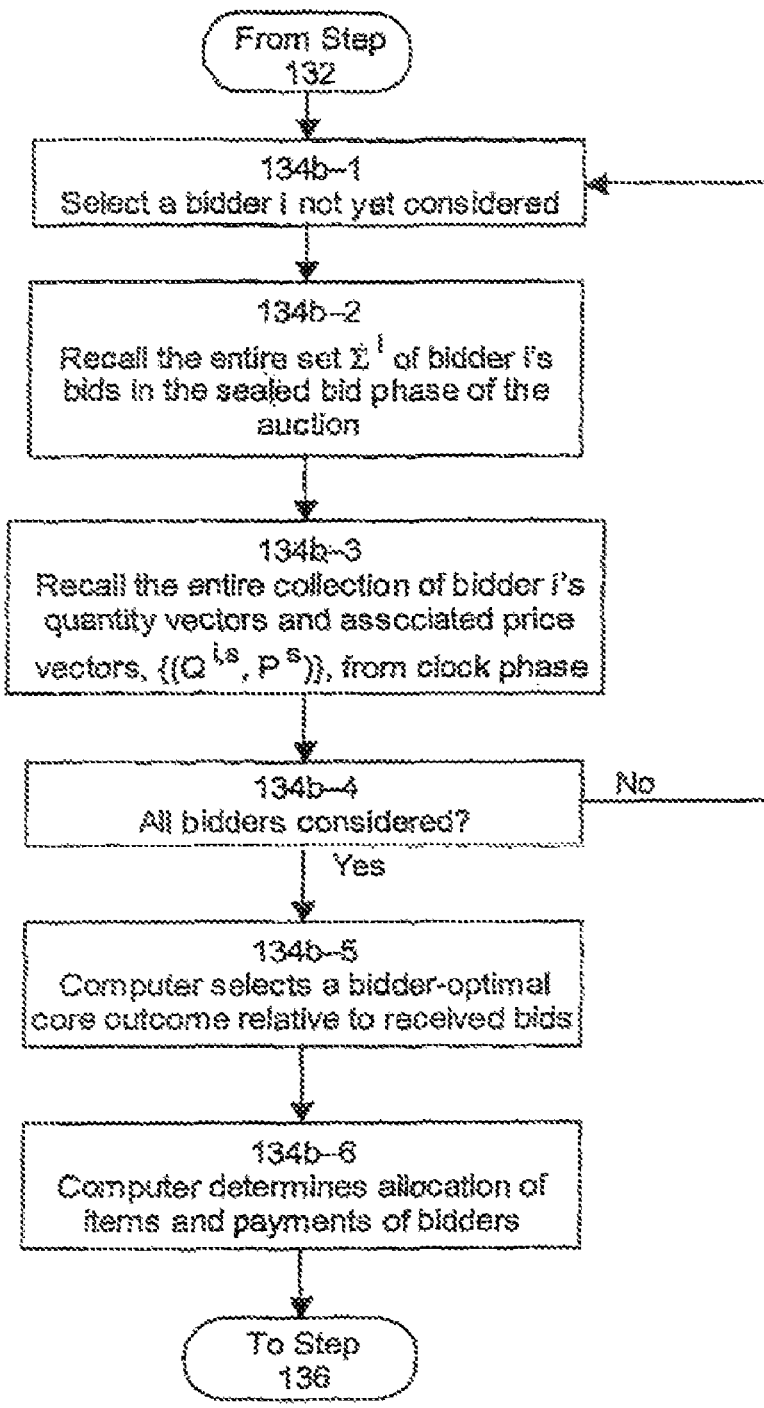
FIG. 16 is a flow diagram illustrating, in greater detail, an element of the flow diagram of FIG. 5.

FIG. 16 is a flow diagram of an exemplary subprocess of step 134 of FIG. 5, for an auction with m types of items. The process of FIG. 16 begins with step 134b-1, in which a bidder i who has not yet been considered is selected. In step 134b-2, a computer recalls the entire set $\Sigma^i$ of bids that were received from bidder i in the sealed bid phase of the auction and entered in step 132 of FIG. 5. If necessary, each bid $(S^i, P^i)$ in $\Sigma^i$ is converted into the quantity vector notation, $(Q^i, P^i)$, where $Q^i \equiv (Q_1^i, \ldots, Q_m^i)$ and $Q_k^i$ denotes the quantity of items of type k in the set $S^i$ of items. Meanwhile, $P^i$ identifies a price for the entire package identified by $Q^i$. The process continues to step 134b-3, where the entire collection of bidder i's quantity vectors and associated price vectors, $\{(Q^{i,s}, P^s)\}$, from the earlier phase of the auction are recalled and converted into package bids. Recall that $(Q^{i,s}, P^s)$ is converted into a package bid $(Q^{i,s}, \hat{P}^{i,s})$ by calculating:

$$\hat{P}^{i,s} = \sum_{k=1}^{m} P_k^s Q_k^{i,s}.$$

The process then continues to step 134b-4, where it is determined whether all bidders have been considered. If not, the process loops back to step 134b-1.

If all bidders have been considered, the process goes to step 134b-5, where a computer selects a bidder-optimal core outcome relative to received bids. In one preferred embodiment, a computer there selects a bidder-optimal core outcome, relative to the received bids in the dynamic auction phase and the later phase of the auction. In a second preferred embodiment, a computer there selects a bidder-optimal core outcome, relative to the received bids in the later phase of the auction only. In each of these embodiments, there may be multiple bidder-optimal core outcomes—in that event, a computer applies a tie-breaking rule for determining which bidder-optimal core outcome to select.

After selecting a bidder-optimal core outcome relative to received bids, the process continues to step 134b-6, where the allocation of items and payments of bidders implied by the selected bidder-optimal core outcome is determined. After the allocation and payments have been determined, the process goes to step 136 of FIG. 5, where a computer outputs a final message, including the allocation of items and payments of bidders.

Auction-Like Optimization Problems and Machine-Generated Bids

In the course of this application, a method and apparatus for a hybrid auction including an earlier, dynamic auction phase, and a later, package auction phase, has been described. The method and apparatus that have been described allow users to participate in various auctions with a level of attention that varies from continuous, down to the input of information into a proxy agent on a single occasion. It should also be apparent that the required level of attention by the "auctioneer" may vary from continuous to essentially zero—aside from setting the rules for initiating the auction. Thus for all intents and purposes, once the basic auction description is selected and the users input desired information, the auction implemented by the invention can be essentially automatic, i.e., devoid of human interaction.

Because in the past auctions have generally been considered to be processes engaged in by persons, the feature of an automatic auction may be, by itself, considered relatively new. There are, however, many other automatic systems which interact in a way which is entirely analogous to an auction and to which the present invention could be applied. Hence, the present invention can be applied to improve the efficiency of computers which are used to operate the automatic systems, by economizing on the collection of informational inputs needed for the system and to speed the computational of optimal resource assignments. At the same time, many optimization problems encountered in the field of operations research have similar mathematical structures to the problem of determining the winners of an auction with package bidding. Hence, the present invention can be applied to improve the efficiency of computer systems which are used to solve the similar optimization problems, by enabling the computations to be implemented on a system with parallel processing or generally by speeding the computation of solutions.

For example, the air conditioning plant in an office building can allocate cool air among individual offices in the building via a dynamic auction. Periodically, the central computer of the air conditioning system serves the role of the "auction computer" in an auction, while computers interfaced with the thermostats in each suite of offices serve the role of "bidder computers." Each bidder computer is programmed to send back bids consisting of a desired quantity of cooled air based on: the current temperature reading of the thermostat, the desired temperature in the office, and the use (if any) to which the office is currently being put. In addition, it is desirable for the auction-like automatic system to allow package bidding, in the same way that it is desirable for a conventional auction system for geographically-defined spectrum licenses to allow package bidding. (Cooling an individual office requires less cooled air if the adjacent offices are also being cooled, just as the value of a New York-region spectrum license may be enhanced by owning a Washington-region spectrum license or a Boston-region spectrum license.) Based on the parameters to which it has been programmed, the central computer of the air conditioning system then provides the results of the auction in its allocation of cooled air among the bidding offices.

In another context, a communications, transportation or energy transmission network faces the technical problem of how to allocate its scarce network resources. The optimization problem in allocating its network resources (e.g., bandwidth, switches, etc.) has a very similar structure to the auction problem. Moreover, package bidding is again well suited to the problem, since a network provider attempting to connect point A to point B needs to utilize various networks links and switches in combination. Hence, the present invention can be usefully applied to improving the solution to this technical problem.

In another context, computational resources on a distributed computer system can be allocated via a dynamic auction. Whenever a new job requiring a given quantity of CPU time enters the system, an auction is conducted. Each member of the distributed computer system indicates the quantity of CPU time which it can make available at a given priority level or a given price. In this case, the "auctioneer computer" selects and allocates the resources to be applied to the new job in accordance with some programmed schedule and hence in this fashion provides the results of the auction.

The several examples described herein are exemplary of the invention, whose scope is not limited thereby but rather is indicated in the attached claims.

The invention claimed is:

1. A computer readable medium having recorded thereon a plurality of instructions which direct a computer to perform a series of steps, said series of steps implementing a method for conducting an auction of a plurality of items including receiving bids and determining an allocation of at least one of the items, the auction including a dynamic auction phase followed by a later phase, the later phase comprising a package auction, the series of steps including:
   a) implementing the dynamic auction phase, said phase comprising:
      a1) receiving bids from at least one bidder, said bids including at least an indicator of at least one of the items;
      a2) determining whether the dynamic auction phase of the auction should continue, based on received bids;
      a3) outputting auction information; and
      a4) repeating a1)-a3) if the dynamic auction phase of the auction is determined to continue;
   b) changing from the dynamic auction phase to the later phase, following a determination not to continue the dynamic auction phase; and
   c) implementing the later phase of the auction, the later phase comprising a package auction, said later phase comprising:
      c1) receiving bids from at least one bidder, said bids including at least an indicator of a package of items and an associated price for the package; and
      c2) determining an allocation of at least one of the items to one of the bidders based on received bids.

2. A computer readable medium as recited in claim 1 wherein each bid received in step a1) is a package bid including at least an indicator of a package of items and an associated price for the package.

3. A computer readable medium as recited in claim 2 which further includes constraining bids by an activity rule in the dynamic auction phase.

4. A computer readable medium is recited in claim 3 which further includes constraining bids by a revealed-preference activity rule in the dynamic auction phase.

5. A computer readable medium as recited in claim 1 wherein said step a1) includes transmitting a price vector to bidders prior to receiving said bids.

6. A computer readable medium as recited in claim 5 which further includes constraining bids by an activity rule in the dynamic auction phase.

7. A computer readable medium as recited in claim 6 which further includes constraining bids by a revealed-preference activity rule in the dynamic auction phase.

8. A computer readable medium as recited in claim 2 wherein the determining in the dynamic auction phase is based on solving a winner determination problem.

9. A computer readable medium as recited in claim 5 wherein the determining in the dynamic auction phase is based on comparing a sum of quantity vectors with an available quantity.

10. A computer readable medium as recited in claim 2 wherein the receiving in the dynamic auction phase includes the receiving of intra-round bids.

11. A computer readable medium as recited in claim 5 wherein the receiving in the dynamic auction phase includes the receiving of intra-round bids.

12. A computer readable medium as recited in claim 1 wherein the later phase comprises a sealed bid package auction.

13. A computer readable medium as recited in claim 12 wherein the determining in the later phase further includes determining a payment for each winning bidder.

14. A computer readable medium as recited in claim 13 wherein the determined allocation of items and payments is a core outcome relative to the received bids in the later phase.

15. A computer readable medium as recited in claim 13 wherein the determined allocation of items and payments is a core outcome relative to the received bids in the dynamic auction phase and the later phase.

16. A computer readable medium as recited in claim 13 wherein the determined allocation of items and payments is a bidder-optimal core outcome relative to the received bids in the later phase.

17. A computer readable medium as recited in claim 13 wherein the determined allocation of items and payments is a bidder-optimal core outcome relative to the received bids in the dynamic auction phase and the later phase.

18. A computer readable medium as recited in claim 12 which further includes constraining bids in the later phase by an activity rule.

19. A computer readable medium as recited in claim 12 which further includes constraining bids in the later phase by a relaxed revealed-preference activity rule.

20. A computer readable medium as recited in claim 1 wherein the later phase comprises a dynamic package auction.

21. A computer readable medium as recited in claim 20 wherein the determining in the later phase further includes determining a payment for each winning bidder.

22. A computer readable medium as recited in claim 21 wherein the determined allocation of items and payments is a core outcome relative to the received bids in the later phase.

23. A computer readable medium as recited in claim 21 wherein the determined allocation of items and payments is a core outcome relative to the received bids in the dynamic auction phase and the later phase.

24. A computer readable medium as recited in claim 21 wherein the determined allocation of items and payments is a bidder-optimal core outcome relative to the received bids in the later phase.

25. A computer readable medium as recited in claim 21 wherein the determined allocation of items and payments is a bidder-optimal core outcome relative to the received bids in the dynamic auction phase the later phase.

26. A computer readable medium as recited in claim 20 which further includes constraining bids in the later phase by an activity rule.

27. A computer readable medium as recited in claim 20 which further includes constraining bids in the later phase by a relaxed revealed-preference activity rule.

28. A computer readable medium as recited in claim 12 wherein the later phase comprises a proxy auction.

29. A computer readable medium as recited in claim 28 which further includes constraining bids in the later phase by an activity rule.

30. A computer readable medium as recited in claim 28 which further includes constraining bids in the later phase by a relaxed revealed-preference activity rule.

31. A computer readable medium as recited in claim 20 wherein the later phase comprises a proxy auction.

32. A computer readable medium as recited in claim 31 which further includes constraining bids in the later phase by an activity rule.

33. A computer readable medium as recited in claim 31 which further includes constraining bids in the later phase by a relaxed revealed-preference activity rule.

34. A computer readable medium as recited in claim 12 wherein the determining in the later phase is based on solving a winner determination problem.

35. A computer readable medium as recited in claim 20 wherein the determining in the later phase is based on solving a winner determination problem.

36. A computer readable medium as recited in claim 28 wherein the determining in the later phase is based on solving a winner determination problem.

37. A computer readable medium as recited in claim 31 wherein the determining in the later phase is based on solving a winner determination problem.

38. A system, including a first set of one or more computers and a second set of one or more computers, the computers of the second set located remotely from the computers of the first set, the computers of said system interconnected by a communication system, said system for conducting an auction of a plurality of items wherein the computers receive bids and determine an allocation of at least one of the items, the auction including a dynamic auction phase followed by a later phase, the later phase comprising a package auction, the system comprising:
  a) means for implementing the dynamic auction phase, said means for implementing the dynamic auction phase comprising;
    a1) means for receiving bids from at least one bidder including at least one computer of the second set of computers, said bids including at least an indicator of at least one of the items;
    a2) means for determining whether the dynamic auction phase of the auction should continue, based on received bids, including at least one computer of the first set of computers;
    a3) means for outputting auction information; and
    a4) means for repeating a1)-a3) if the dynamic auction phase of the auction is determined to continue;
  b) means for changing from the dynamic auction phase to the later phase, following a determination not to continue the dynamic auction phase; and
  c) means for implementing the later phase of the auction, the later phase comprising a package auction, said means for implementing said later phase comprising:
    c1) means for receiving bids from at least one bidder including at least one computer of the second set of computers, said bids including at least an indicator of a package of items and an associated price for the package; and
    c2) means for determining an allocation of at least one of the items to one of the bidders, based on received bids, including at least one computer of the first set of computers.

39. A system as recited in claim 38 wherein the means for receiving bids of a1) receives a package bid including at least an indicator of a package of items and an associated price for the package.

40. A system as recited in claim 39 wherein the means for receiving bids includes means to constrain said bids by an activity rule.

41. A system as recited in claim 40 wherein the means for receiving bids includes means to constrain bids by a revealed-preference activity rule.

42. A system as recited in claim 38 which further includes means for transmitting a price vector to bidders and means for enabling the means for receiving bids to receive said bids only after said price vector has been transmitted.

43. A system as recited in claim 42 which includes means to constrain bids by an activity rule in the dynamic auction phase.

44. A system as recited in claim 43 wherein the means to constrain bids constrains the bids by a revealed-preference activity rule.

45. A system as recited in claim 39 wherein the means for determining of a2) solves a winner determination problem.

46. A system as recited in claim 42 wherein the means for determining of a2) compares a sum of quantity vectors with an available quantity.

47. A system as recited in claim 39 wherein the means for receiving bids of a1) receives at least intra-round bids.

48. A system as recited in claim 42 wherein the means for receiving bids of a1) receives at least intra-round bids.

49. A system as recited in claim 38 wherein the means for implementing the later phase comprises means for implementing a sealed bid package auction.

50. A system as recited in claim 49 wherein the means for determining of c2) further includes means determining a payment for each winning bidder.

51. A system as recited in claim 50 wherein the means for determining produces a core outcome relative to the received bids of c1).

52. A system as recited in claim 50 wherein the means for determining produces a core outcome relative to the received bids of a1) and c1).

53. A system as recited in claim 50 wherein the means for determining produces a bidder-optimal core outcome relative to the received bids of c1).

54. A system as recited in claim 50 wherein the means for determining produces a bidder-optimal core outcome relative to the received bids of a1) and c1).

55. A system as recited in claim 49 which includes means to constrain bids received by the means for receiving of c1) by an activity rule.

56. A system as recited in claim 49 which includes means to constrain bids received by the means for receiving of c1) by a relaxed revealed-preference activity rule.

57. A system as recited in claim 38 wherein the means for implementing the later phase implements a dynamic package auction.

58. A system as recited in claim 57 wherein the means for determining in the later phase further includes means for determining a payment for each winning bidder.

59. A system as recited in claim 58 wherein the means for determining an allocation of items and payments determines a core outcome relative to the received bids in the later phase.

60. A system as recited in claim 58 wherein the means for determining an allocation of items and payments determines a core outcome relative to the received bids in the dynamic auction phase and the later phase.

61. A system as recited in claim 58 wherein the means for determining an allocation of items and payments determines a bidder-optimal core outcome relative to the received bids in the later phase.

62. A system as recited in claim 58 wherein the means for determining an allocation of items and payments determines a bidder-optimal core outcome relative to the received bids in the dynamic auction phase and the later phase.

63. A system as recited in claim 57 which further includes means for constraining bids in the later phase by an activity rule.

64. A system as recited in claim 57 which further includes means for constraining bids in the later phase by a relaxed revealed-performance activity rule.

65. A system as recited in claim 49 wherein the means for implementing the later phase implements a proxy auction.

66. A system as recited in claim 65 which further includes means for constraining bids in the later phase by an activity rule.

67. A system as recited in claim 65 which further includes means for constraining bids in the later phase by a relaxed revealed-preference activity rule.

68. A system as recited in claim 57 wherein the dynamic package auction implemented by the means for implementing the later phase comprises a proxy auction.

69. A system as recited in claim 68 which further includes means for constraining bids in the later phase by an activity rule.

70. A system as recited in claim 68 which further includes means for constraining bids in the later phase by a relaxed revealed-preference activity rule.

71. A system as recited in claim 49 wherein the means for determining of c2) solves a winner determination problem.

72. A system as recited in claim 57 wherein the means for determining of c2) solves a winner determination problem.

73. A system as recited in claim 65 wherein the means for determining of c2) solves a winner determination problem.

74. A system as recited in claim 68 wherein the means for determining of c2) solves a winner determination problem.

75. A method implemented in a system comprising a first set of one or more computers and a second set of one or more computers, the computers of the second set located remotely from the computers of the first set, the computers of said system interconnected by a communication system, said method for conducting an auction of a plurality of items wherein the computers receive bids and determine an allocation of at lease one of the items, the auction including a dynamic auction phase followed by a later phase, the later phase comprising a package auction, the method comprising:
  a) implementing the dynamic auction phase in the system, said dynamic auction phase comprising:
    a1) receiving bids from at least one bidder using at least one computer of the second set of computers, said bids including at least an indicator of at least one of the items;
    a2) determining whether the dynamic auction phase of the auction should continue, based on received bids, using at least one computer of the first set of computers;
    a3) outputting auction information; and
    a4) repeating a1)-a3) if the dynamic auction phase of the auction is determined to continue;
  b) implementing the later phase of the auction in the system, the later phase comprising a package auction, said later phase comprising:
    b1) receiving bids from at least one bidder using at least one computer of the second set of computers, said bids including at least an indicator of a package of items and an associated price for the package; and
    b2) determining an allocation of at least one of the items to one of the bidders, based on received bids, using at least one computer of the first set of computers.

76. A method as recited in claim 75 wherein each bid received in step a1) is a package bid including at least an indicator of a package of items and an associated price for the package.

77. A method as recited in claim 76 which further includes constraining bids by an activity rule in the dynamic auction phase.

78. A method as recited in claim 77 which further includes constraining bids by a revealed-preference activity rule in the dynamic auction phase.

79. A method as recited in claim 75 wherein said step a1) includes transmitting a price vector to bidders prior to receiving said bids.

80. A method as recited in claim 79 which further includes constraining bids by an activity rule in the dynamic auction phase.

81. A method as recited in claim 80 which further includes constraining bids by a revealed-preference activity rule in the dynamic auction phase.

82. A method as recited in claim 76 wherein the determining in the dynamic auction phase is based on solving a winner determination problem.

83. A method as recited in claim 79 wherein the determining in the dynamic auction phase is based on comparing a sum of quantity vectors with an available quantity.

84. A method as recited in claim 76 wherein the receiving in the dynamic auction phase includes the receiving of intra-round bids.

85. A method as recited in claim 79 wherein the receiving in the dynamic auction phase includes the receiving of intra-round bids.

86. A method as recited in claim 75 wherein the later phase comprises a sealed bid package auction.

87. A method as recited in claim 86 wherein the determining in the later phase further includes determining a payment for each winning bidder.

88. A method as recited in claim 87 wherein the determined allocation of items and payments is a core outcome relative to the received bids in the later phase.

89. A method as recited in claim 87 wherein the determined allocation of items and payments is a core outcome relative to the received bids in the dynamic auction phase and the later phase.

90. A method as recited in claim 87 wherein the determined allocation of items and payments is a bidder-optimal core outcome relative to the received bids in the later phase.

91. A method as recited in claim 87 wherein the determined allocation of items and payments is a bidder-optimal core outcome relative to the received bids in the dynamic auction phase and the later phase.

92. A method as recited in claim 86 which further includes constraining bids in the later phase by an activity rule.

93. A method as recited in claim 86 which further includes constraining bids in the later phase by a relaxed revealed-preference activity rule.

94. A method as recited in claim 75 wherein the later phase comprises a dynamic package auction.

95. A method as recited in claim 94 wherein the determining in the later phase further includes determining a payment for each winning bidder.

96. A method as recited in claim 95 wherein the determined allocation of items and payments is a core outcome relative to the received bids in the later phase.

97. A method as recited in claim 95 wherein the determined allocation of items and payments is a core outcome relative to the received bids in the dynamic auction phase and the later phase.

98. A method as recited in claim 95 wherein the determined allocation of items and payments is a bidder-optimal core outcome relative to the received bids in the later phase.

99. A method as recited in claim 95 wherein the determined allocation of items and payments is a bidder-optimal core outcome relative to the received bids in the dynamic auction phase and the later phase.

100. A method as recited in claim 94 which further includes constraining bids in the later phase by an activity rule.

101. A method as recited in claim 94 which further includes constraining bids in the later phase by a relaxed-preference activity rule.

102. A method as recited in claim 86 wherein the later phase comprises a proxy auction.

103. A method as recited in claim 102 which further includes constraining bids in the later phase by an activity rule.

104. A method as recited in claim 102 which further includes constraining bids in the later phase by a relaxed revealed-preference activity rule.

105. A method as recited in claim 94 wherein the later phase comprises a proxy auction.

106. A method as recited in claim 105 which further includes constraining bids in the later phase by an activity rule.

107. A method as recited in claim 105 which further includes constraining bids in the later phase by a relaxed revealed-preference activity role.

108. A method as recited in claim 86 wherein the determining in the later phase is based on solving a winner determination problem.

109. A method as recited in claim 94 wherein the determining in the later phase is based on solving a winner determination problem.

110. A method as recited in claim 102 wherein the determining in the later phase is based on solving a winner determination problem.

111. A method as recited in claim 105 wherein the determining in the later phase is based on solving a winner determination problem.

* * * * *